US009435995B2

United States Patent
Le et al.

(10) Patent No.: US 9,435,995 B2
(45) Date of Patent: Sep. 6, 2016

(54) MEDICAL DEVICES WITH INTERNAL MOTORS

(75) Inventors: Anthony Van Le, San Jose, CA (US); Nicholas John Richardi, Manteca, CA (US); Clifford Jeffrey Lin, Milpitas, CA (US)

(73) Assignee: POINCARE SYSTEMS, INC., Menlo Park, CA (US)

( * ) Notice: Subject to any disclaimer, the term of this patent is extended or adjusted under 35 U.S.C. 154(b) by 312 days.

(21) Appl. No.: 13/006,390

(22) Filed: Jan. 13, 2011

(65) Prior Publication Data

US 2012/0182620 A1 Jul. 19, 2012

(51) Int. Cl.
| | |
|---|---|
| *G02B 27/10* | (2006.01) |
| *A61B 1/04* | (2006.01) |
| *A61B 1/00* | (2006.01) |
| *G02B 23/24* | (2006.01) |

(52) U.S. Cl.
CPC ....... *G02B 23/2476* (2013.01); *G02B 23/2423* (2013.01); *Y10T 74/1987* (2015.01)

(58) Field of Classification Search
USPC ......... 359/618–625; 600/113, 114, 122, 117, 600/160, 175, 177, 178
See application file for complete search history.

(56) References Cited

U.S. PATENT DOCUMENTS

| | | | |
|---|---|---|---|
| 4,274,704 A | 6/1981 | Zobel | |
| 5,720,706 A | 2/1998 | Takahashi et al. | |
| 6,371,909 B1 | 4/2002 | Hoeg et al. | |
| 6,579,286 B1 | 6/2003 | Maki et al. | |
| 6,902,528 B1* | 6/2005 | Garibaldi et al. | 600/118 |
| 7,413,543 B2 | 8/2008 | Banik et al. | |
| 2002/0120182 A1* | 8/2002 | Muessig et al. | 600/178 |
| 2005/0272976 A1 | 12/2005 | Tanaka et al. | |
| 2007/0208291 A1* | 9/2007 | Patel | 604/4.01 |
| 2009/0076330 A1* | 3/2009 | Ashida | 600/146 |
| 2009/0105541 A1 | 4/2009 | Reinschke et al. | |
| 2009/0112056 A1* | 4/2009 | Finlay | 600/102 |
| 2010/0191267 A1* | 7/2010 | Fox | 606/185 |

FOREIGN PATENT DOCUMENTS

| | | | | |
|---|---|---|---|---|
| JP | 2005-329079 | * | 5/2004 | ............... A61B 1/00 |

OTHER PUBLICATIONS

International Search Report and Written Opinion dated May 3, 2012 for International Application No. PCT/US2011/066880.

* cited by examiner

*Primary Examiner* — Joseph P Martinez
*Assistant Examiner* — Brandi Thomas
(74) *Attorney, Agent, or Firm* — Vista IP Law Group, LLP

(57) ABSTRACT

A medical device includes an elongate member having a proximal end, a distal end, a body extending between the proximal end and the distal end, and a lumen located within the body, and a rotor rotatably supported in the lumen, the rotor having an opening for allowing light to pass therethrough, wherein the rotor is rotatable about an axis that extends through the opening, wherein the elongate member further has a region for allowing an output light to exit therethrough.

52 Claims, 45 Drawing Sheets

MEDICAL DEVICES WITH INTERNAL MOTORS

FIELD

This application generally relates to medical imaging, and more specifically, to systems and methods for rotational scanning of internal bodily structures.

BACKGROUND

Imaging probes may be used to perform imaging at internal region of a human body. Optical coherence tomography (OCT) is an imaging technique that involves rotating a light beam to gather image signals of a target region. Imaging probe for performing OCT may involve using an external motor that is coupled to a proximal end of the probe for turning the probe. However, Applicant of the subject application determines that such configuration would not be desirable because turning the proximal end of the probe may cause twisting of the probe or the components therein, resulting in image distortion.

Thus, Applicant of the subject application determines that it would be desirable to have new devices and methods for performing OCT or other types of imaging.

SUMMARY

In accordance with some embodiments, a medical device includes an elongate member having a proximal end, a distal end, a body extending between the proximal end and the distal end, and a lumen located within the body, and a rotor rotatably supported in the lumen, the rotor having an opening for allowing light to pass theretherough, wherein the rotor is rotatable about an axis that extends through the opening, wherein the elongate member further has a region for allowing an output light to exit therethrough.

In accordance with some embodiments, a device includes a rotor having a proximal end, a distal end, and a body extending between the proximal and distal ends, wherein the rotor has an opening extending from the proximal end, the rotor being rotatable about an axis that extends through the opening, and wherein the rotor has a port with a port axis that forms an angle relative to the axis, the angle having a value that is larger than zero and less than 180°.

In accordance with other embodiments, a device includes a rotor having a proximal end, a distal end, and a body extending between the proximal and distal ends, wherein the rotor has an opening extending from the proximal end, the rotor being rotatable about an axis that extends through the opening, and wherein the opening is configured to allow light to pass therethrough.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
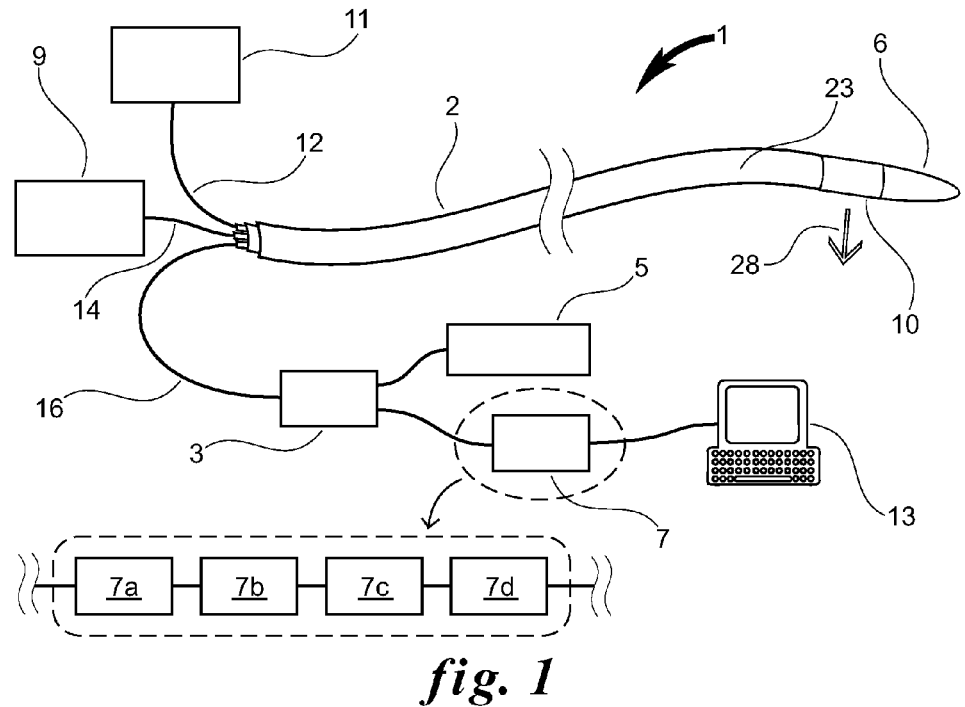
FIG. 1 illustrates an imaging probe in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Referring to FIG. 1, an imaging probe 1 is shown in accordance with some embodiments. The imaging probe 1 may have an outer dimension that is anywhere between 50 micron to 50 mm, and more preferably, between 0.5 mm to 10 mm, and even more preferable between 0.4 mm to 1.5 mm (such as 1 mm). Thus, the imaging probe 1 may be placed at different regions inside a body to obtain images. By means of non-limiting examples, the regions may include the aorta, colon, ear canal, esophagus, fallopian tube, blood vessel (vein, artery), passage way in a lung, etc. In other embodiments, the imaging probe 1 may have other outer dimensions that are different from the ranges described above.

In different embodiments, the imaging probe 1 may be configured to perform different types of imaging, such as optical coherence tomography (also known as optical frequency domain imaging), multiphoton imaging, confocal imaging, Raman spectroscopy, spectroscopy, scanning imaging spectroscopy, and Raman spectroscopic imaging. In other embodiments, the imaging probe 1 may perform other types of imaging.

The imaging probe 1 has an elongated tube 2 with a proximal end 4, a distal end 6, and a body 23 extending between the proximal end 4 and the distal end 6. The imaging probe 1 also has a transparent region 10 located between the proximal end 4 and the distal end 6 such that a focused light beam 28 can pass therethrough from inside the imaging probe 1 in a radial direction to perform an image scanning. The region 10 may have an arc or ring configuration, which allows the beam 28 to exit through the region 10 at different angular positions. The region 10 also allows light (e.g., light provided from the probe 1 and reflected from a tissue) from outside the imaging probe 1 to enter into the imaging probe 1. The region 10 may be completely transparent in some embodiments. In other embodiments, the region 10 may be partially transparent, as long as it can allow some light to pass therethrough in both directions. The imaging probe 1 also includes a fluid connection 12, an electrical connection 14, and an optical connection 16, all located at the proximal end 4.

The fluid connection 12 is configured to couple to a fluid source 11 (such as a saline filled syringe or IV bag) to provide for fluid for flushing the distal end of the imaging probe 1 during use. In such cases, the distal end of the imaging probe 1 may include a flush port in fluid communication with the fluid connection 12. The flush port may aim at the transparent region 10 of the imaging probe 1. In other embodiments, the fluid may be ringers lactate solution, radio-opaque fluid (such as Visopaque™,) or other agent. During imaging, there may be blood flow, and the blood cells may scatter the light, and/or may act as little particles that block the light beam, causing the image quality to drop down significantly. The flush port is advantageous because it allows the distal end of the imaging probe 1 to be cleaned during use. In other embodiments, the fluid connection 12 may be in fluid communication with a lumen in the imaging probe 1. In such cases, the fluid source 11 may provide fluid through the connection 12 to flush fluid to clear the lumen, and/or to partially or completely dilute blood to reduce light scattering caused by blood cells thereby allowing capture of higher quality images. In further embodiments, the fluid connection 12 may be connected to a suction device, which provides a vacuum suction for aspiration to suck materials (e.g., fluid, object, etc.) out of the lumen. The fluid connection 12 is illustrated as being on the probe 1, but in other embodiments, the fluid connection 12 may be on a sheath that surrounds the probe 1.

In the illustrated embodiments, the imaging probe 1 is a part of an imaging system that includes a module 3 comprising of an interferometer, a laser source 5, a processing module 7, and a user interface 13. In other embodiments, any one or a combination of the components 3, 5, 7, and 13 may be considered component(s) of the imaging probe 1. The module 3 is optically coupled to the imaging probe 1 through the optical connection 16 during use. The laser source 5 is configured to provide a broadband input light to the module 3. In the illustrated embodiments, the input light is in an infrared range. In some embodiments, the input light has a center wavelength that is anywhere between 100 nm and 11000 nm, and more preferably, anywhere between 1000 nm and 2000 nm, and even more preferably anywhere between 1100 nm and 1600 nm (such as 1310 nm). In other embodiments, the input light may have other wavelengths. The module 3 passes the input light to a fiber optic that transmits the input light to the inside of the imaging probe 1. The input light is processed optically (e.g., focused, collimated, reflected, etc.) inside the imaging probe 1, and the processed input light is output through region 10 of the imaging probe 1 as an output light. In the illustrated embodiments, the output light has a wavelength that is anywhere between 100 nm and 11000 nm, and more preferably anywhere between 500 nm and 1500 nm, and even more preferably anywhere between 12100 nm and 1400 nm (such as 1310 nm). In other embodiments, the output light may have other wavelengths. It should be noted that the term "light" or similar terms (such as "light beam") is not limited to non-visible light, and may refer to any radiation in different wavelengths, which may or may not be visible.

The output light from the imaging probe 1 impinges onto a tissue within a patient, and is reflected from the tissue. The reflected light from the tissue is then captured by the probe 1 through region 10, is optically processed inside the imaging probe 1, and is then transmitted by fiber optic back to the module 3. The module 3 passes the light signal from the probe 1 to the processing module 7. The processing module 7 detects and processes the signal, and transmits it to the user interface 13. In the illustrated embodiments, the processing module 7 includes one or more photodetector(s) 7a, a signal amplifier or conditioner with an ant-alias filter 7b, an A/D converter 7c, and a Fast Fourier Transform (FFT) processor 7d. The photodetector(s) 7a is configured to detect light containing the depth encoded interferogram from module 3, and convert the light to electrical signal(s). The electrical signals are further conditioned and amplified by the component 7b to be suitable for use by the A/D converter 7c. Once the signal is converted from the analog domain to digital domain by the A/D converter 7c, the FFT processor 7d converts the depth encoded electrical interferogram signal via FFT to a depth resolved signal for each point scanned by the imaging probe 1. The FFT processor 7d maybe a discrete processing board, or maybe implemented by a computer. The user interface 13 may be a computer (as illustrated), a hand-held device, or any of other devices that is capable of presenting information to the user. The user interface 13 reconstructs the image from the FFT processor 7d and display a result (e.g., an image) of the processing in a screen for the user's viewing.

The delivering of output light by the imaging probe 1, and the receiving of reflected light by the imaging probe 1, may be repeated at different angles circumferentially around the probe 1, thereby resulting in a circumferential scan of tissue that is located around the imaging probe 1. In some embodiments, one or more components within the distal end of the probe 1 are configured to rotate at several thousand times per minute, and the associated electronics for processing the light signals are very fast, e.g., has a sample rate of 180,000,000 times a second. In other embodiments, the one or more components within the distal end of the probe 1 may rotate at other speeds that are different from that described previously. Also, in other embodiments, the associated electronics for processing the light signals may have a data processing speed that is different from that described previously.

The electrical connection 14 may be used to control functions of the imaging probe 1, as well a providing power to magnetic coils to turn a rotor located distally in the probe 1. In some embodiments, the electrical connection 14 may be connected to one or more sensors at the end distal end of the probe 1 to sense position, velocity, acceleration, jerk, etc., of a rotor that is located distally in the probe 1.

The imaging system also includes a control 9 electrically coupled to the imaging probe 1 through the electrical connection 14. In some embodiments, the control 9 may be used to control a positioning of one or more optical components located inside the imaging probe 1. For example, in some embodiments, the control 9 may have a manual control for allowing a user to control a turning (e.g., amount of turn, speed of turn, angular position, etc.) of a beam director (e.g., a mirror or a prism) which directs the light beam 28 to exit through the region 10 at different angles.

In other embodiments, the control 9 may having a manual control for allowing a user to move one or more lens inside the imaging probe 1 so that a focusing function may be performed. In further embodiments, the control 9 may have a switch which allows a user to select between manual focusing, or auto-focusing. When auto-focusing is selected, the imaging system will perform focusing automatically.

In still further embodiments, the control 9 may also includes one or more controls for allowing a user to operate the imaging probe 1 during use (e.g., to start image scanning, stop image scanning, etc.).

In further embodiments, the imaging probe 1 is flexible and is steerable using the control 9. In such cases, the imaging probe 1 may include a steering mechanism for steering the distal end 6 of the imaging probe 1. For example, the steering mechanism may include one or more wires coupled to the distal end 6 of the imaging probe 1, wherein tension may be applied to any one of the wires using the control 9. In particular, the control 9 may include a manual control that mechanically couples to the wire(s). During use, the user may operate the manual control to apply tension to a selected one of the wires, thereby resulting in the distal end 6 bending in a certain direction.

Figure 1A:
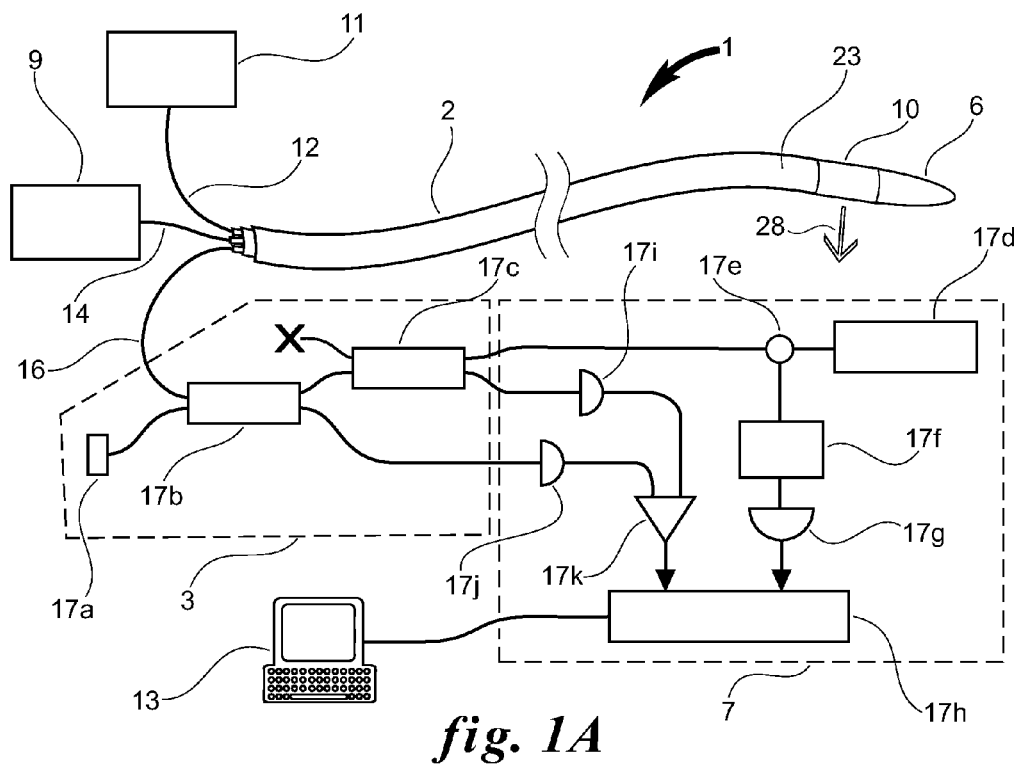
FIG. 1A illustrates an imaging probe in accordance with other embodiments.

The imaging probe 1 may be implemented using different devices and/or techniques. FIG. 1A illustrated an example of how the components 3, 7 of the imaging probe 1 may be implemented in accordance with some embodiments. In the illustrated embodiments, the module 3 includes fiber optic couplers 17b and 17c forming an interferometer. Reference mirror 17a is connected to reference arm of the interferometer, while the sample arm of the interferometer is connected to the imaging probe 1 through connection 16. Light from laser 17d is transmitted to a splitter 17e, which divides a portion of the light from the laser 17d for transmission to the module 3, while the other portion of the light is diverted to a reference clock interferometer 17f. At the module 3, the light from the laser 17d is received at the coupler 17c, and is then transmitted to the coupler 17b, wherein part of the light is passed to the reference mirror 17a, and the rest is passed to the imaging probe 1. The light at the reference mirror 17a is reflected back to the coupler 17b, which divides the light so that a portion of it goes to the coupler 17c and to the photo detector 17i, and another portion of it goes to the photo detector 17j. The light delivered to the probe 1 exits from the region 10 of the imaging probe 1 and strikes a sample. The imaging probe 1 then detects the reflected light back from the sample, and optically communicates the reflected light through imaging probe 1 and module 3, where the path length difference creates an interferogram containing the depth encoded information which is detected by photo detectors 17i and 17j. In particular, the light from the sample is transmitted to the coupler 17b, which divides the light so that a portion of it goes to the coupler 17c and to the photo detector 17i, and another portion of it goes to the photo detector 17j. Photodetectors 17i and 17j are optically communicated to module 3 and are configured for providing balanced signal detection using differential amplifier 17k. Thus, for every light signal provided by the source 17d, the differential amplifier 17k receives a reflected from the reference mirror 17a, and another signal from the light sampled at the distal end of the probe 1. The signal from the differential amplifier 17k is then digitized by the A/D converter 17h. Reference clock interferometer 17b is optically communicated to photo detector 17g to covert the optical clocking signals to electrical signals. In the illustrated embodiments, the interferometer 17f may be implemented using a Fabry Perot interferometer or Mach-Zehnder interferometer. In other embodiments, the interferometer 17f may be implemented using other devices. The electrical clocking signals from 17g are used to provide the clocking signal in even wavenumber space for the A/D converter 17h, which digitizes the analog signals and converts them into the digital domain for further processing. In the illustrated embodiments, the user interface 13 includes a computer, which may be used to perform FFT on the signals from the A/D converter 17h. The computer then reconstructs one or more images for display at a screen of the user interface 13. In some embodiments, the user interface 13 reconstructs the images by placing the processed signals from FFT into a rectangular array, which is then mapped to polar coordinates representing the radial scan performed by the imaging probe 1. The data is then compressed logarithmically to compress the dynamic range of the signal such that it is easily perceived by the user, which is then displayed as an intensity mapped image showing the fully reconstructed image for the user to view. The computer may also be used to perform further signal processing and/or image processing, if desired. Alternatively FFT, signal processing, and/or image reconstruction may be performed using a separate module(s) or device(s). The image(s) at the user interface 13 may then be used for diagnostic and/or treatment purposes. It should be noted that the imaging probe 1 is not limited to the example illustrated, and that in other embodiments, the imaging probe 1 may have different configurations.

Figure 1B:
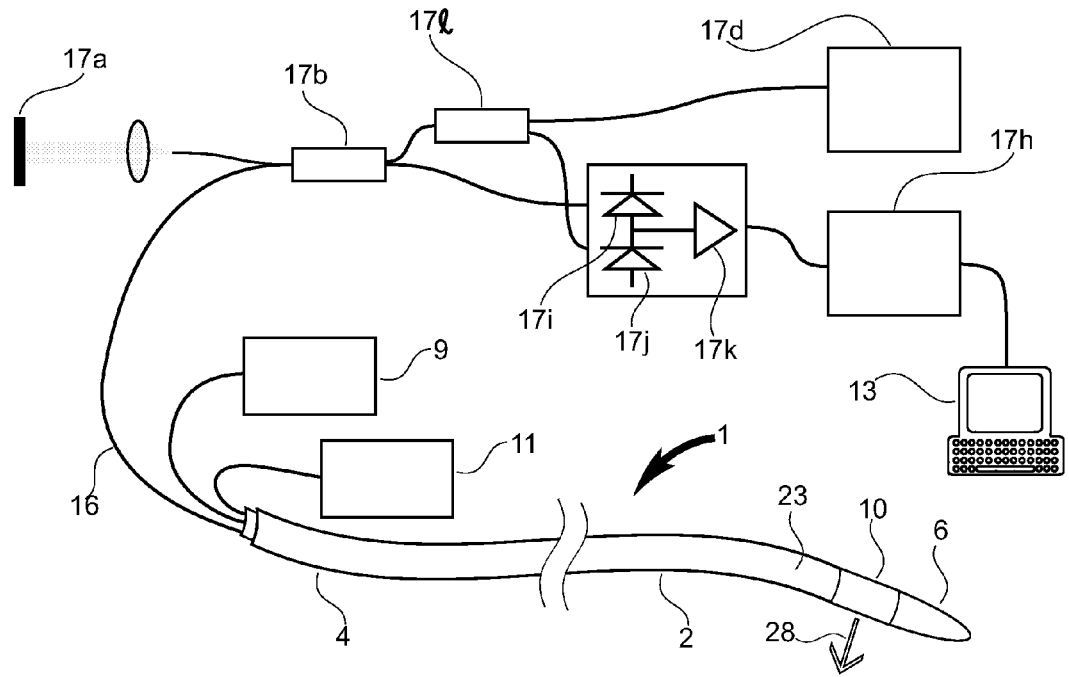
FIG. 1B illustrates an imaging probe in accordance with other embodiments.
Figure 1C:
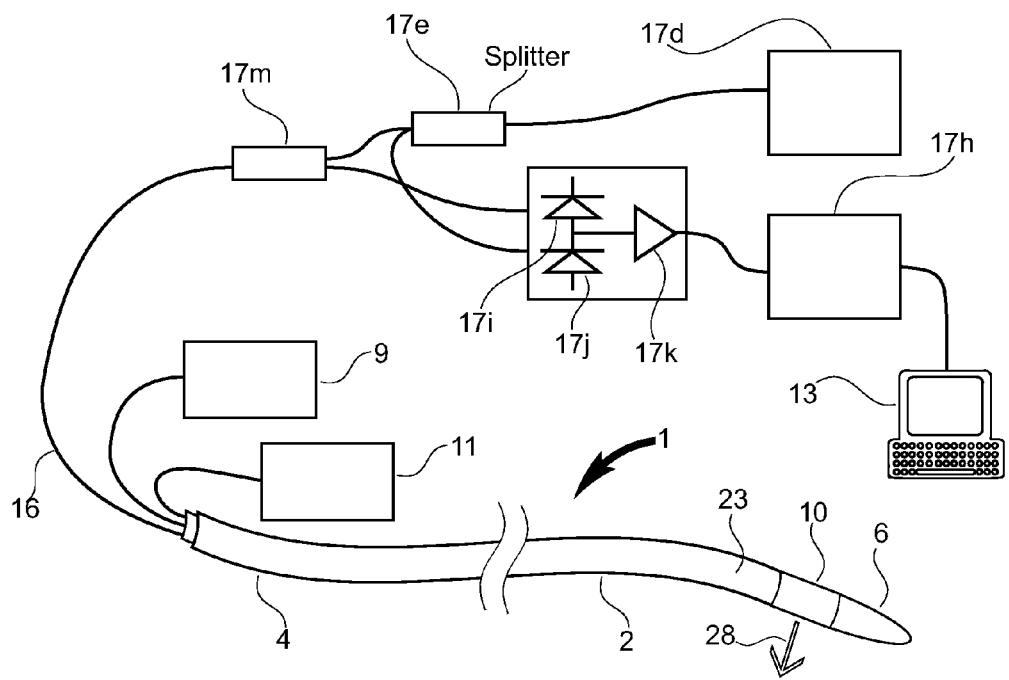
FIG. 1C illustrates an imaging probe in accordance with other embodiments.

It should be noted that the imaging system is not limited to the example described previously, and that in other embodiments, the imaging system may have other configurations. FIG. 1B illustrates another imaging system, which is similar to that shown in FIG. 1A, except that the coupler 17b and circulator 17l are used to form a Michelson interferometer, similarly having reference and sample arms whereby reference arm is optically communicated to the mirror 17a, and sample arm is optically communicated to the imaging probe 1. FIG. 1C illustrates another imaging system, which is similar to that shown in FIG. 1A, except that it includes a circulator 17m optically communicated to the imaging probe 1 to form a common path interferometer, whereby both reference and sample arm optical beam paths are combined, and where the reference mirror 17a is now present within the optical beam path within the imaging probe 1.

Figure 2:
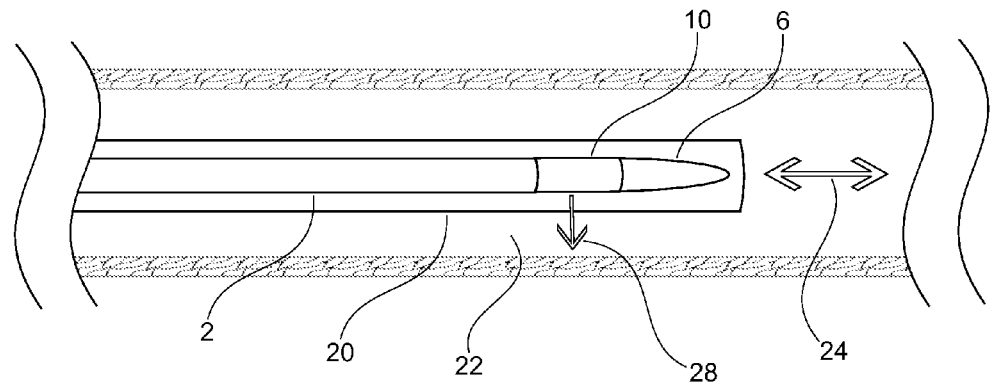
FIG. 2 illustrates an imaging probe that includes a sheath in accordance with some embodiments.

As shown in FIG. 2, in some embodiments, the imaging probe 1 of FIG. 1 may be placed within an elongated sheath 20. In some embodiments, part of the sheath 20 along its length may have a transparent region (similar to region 10 on the probe 1) so that light from the imaging probe 1 may exit through the transparent region of the sheath 20. In such cases, the length of the transparent region at the sheath 20 may be longer than the transparent region 10 at the imaging probe 1, so that when the probe 1 is placed at different positions relative to the sheath 20, light from the probe 1 can exit through the transparent region at the sheath 20. In other embodiments, the entire sheath 20 may be transparent. During use, the imaging probe 1 within the elongated sheath 20 can be placed in a narrow void or lumen 22 inside a patient to perform imaging using the focused light beam 28. The imaging probe 1 can be moved along the inside of the elongated sheath 20 (shown by arrow 24) to allow for imaging of the narrow void or lumen 22 along a preferred region. The sheath 20 is advantageous in that it prevents the probe 1 from rubbing against tissue during use. In other embodiments, the sheath 20 may not have any transparent region. In such cases, after the sheath 20 is desirably placed within the lumen 22 inside the body, the probe 1 can be deployed out of an opening at a distal end of the sheath 20.

Figure 3:
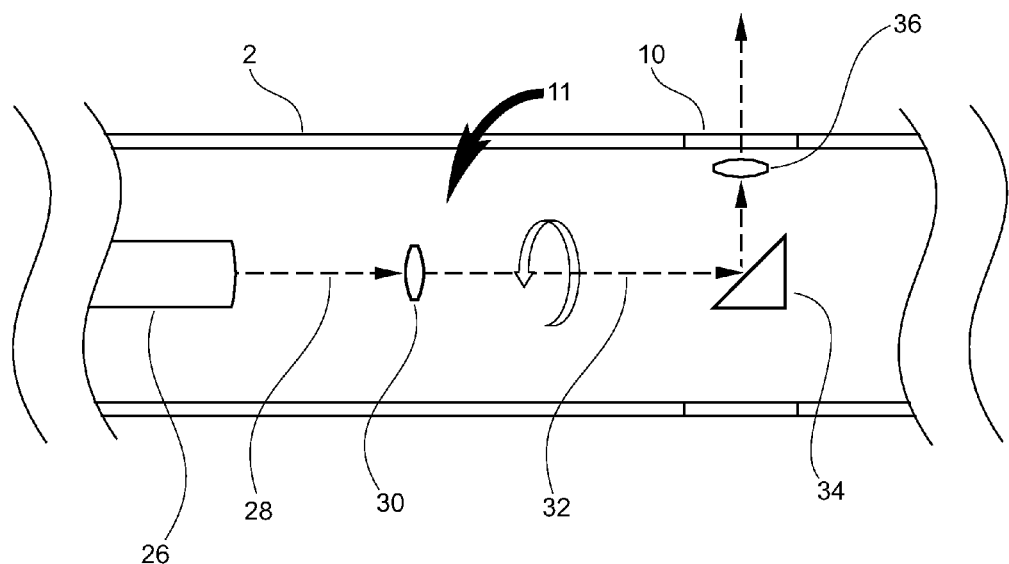
FIGS. 3-7 illustrate different optical components in different embodiments that may be used in any of the embodiments of the image probe described herein.

As discussed, the imaging probe 1 allows the light beam 28 to exit through the region 10 at different angles. Such may be accomplished by turning a beam director located inside the imaging probe 1. FIG. 3 illustrates an optical system 11 located within the imaging probe 1 in accordance with some embodiments, the optical system 11 includes an optical waveguide 26, a collimation lens 30, a beam director 34, and a focusing lens 36. Components of the optical system 11 may be placed anywhere between the proximal end 4 and the distal end 6 of the probe 1. The optical waveguide 26 is configured to provide a light beam 28, which is then optically processed by the collimation lens 30, the beam director 34, and the focusing lens 36. The processed light beam 28 then exits through the transparent region 10 of the imaging probe 1. The optical waveguide 26 may be an optical fiber, a hollow reflective capillary tube, a capillary tube with an inside diameter coated with at least one dielectric coating, a photonic crystalline fiber (also known as a Holley fiber), or any optical transmitter that is capable of transmitting light. The optical waveguide 26 aligns with the collimation lens 30, which collimates the diverging light from the waveguide 26. In some embodiments, the collimation lens 30 may be a plano convex lens that changes a diverging light to a collimated light having a parallel configuration. In other embodiments, the collimation lens 30 may be a bi-convex lens that not only changes a diverging light to have a parallel configuration, but also focuses the light.

Also, in the illustrated embodiments, the collimation lens 30 is aligned with the beam director 34. The beam director 34 may be an optical component that is capable of changing a path of a light. For example, the beam director 34 may be a mirror, or a prism. The beam director 34 is configured to direct (e.g., deflects) the light so that the light changes direction. In the illustrated embodiments, the light leaving the beam director 34 travels in a direction that is 90° from the original path of the light. In other embodiments, the light leaving the beam director 34 may travel in a direction that forms other angles relative to the original path. As shown in the figure, the beam director 34 is next to the transparent region 10 at a position along a longitudinal axis of the imaging probe 1. This allows light leaving the beam director 34 to exit through the transparent region 10. The light beam 28 is directed by the beam director 34 radially from the longitudinal axis of optical waveguide 26, and is optically communicated to the focusing lens 36, which focuses the light beam 28 to form an output light. As shown in the figure, the beam director 34 and the focusing lens 36 are configured to rotate about the axis 32 of the waveguide 26, so that the light beam 28 may exit through the region 10 at different angular positions.

The output light provided by the probe 1 impinges on tissue, and is reflected back towards the imaging probe 1. The reflected light enters through the transparent region 10, and is collimated by the focusing lens 36. The light is then directed by the beam director 34 towards the lens 30. Lens 30 then focuses the light, which is then transmitted to the optical waveguide 26. The optical waveguide 26 transmits the light to components 3 and 7 for processing the light signal. Thus, as illustrated in the above embodiments, the collimation lens 30 has bi-directional properties (i.e., collimation in one direction, and light-focusing in the other direction), and the focusing lens 36 also has bi-directional properties (i.e., light-focusing in one direction, and collimation in the other direction). Accordingly, as used in this specification, the term "collimation lens" is not limited to an optical device that only performs collimation, and may refer to any optical device that is capable of performing other functions, such as, light focusing. Similarly, as used in this specification, the term "focusing lens" is not limited to an optical device that only performs light focusing, and may refer to any optical device that is capable of performing other functions, such as, light collimation. Also, in any of the embodiments described herein, any of the optical components may have uni-directional property or bi-directional properties.

Figure 4:
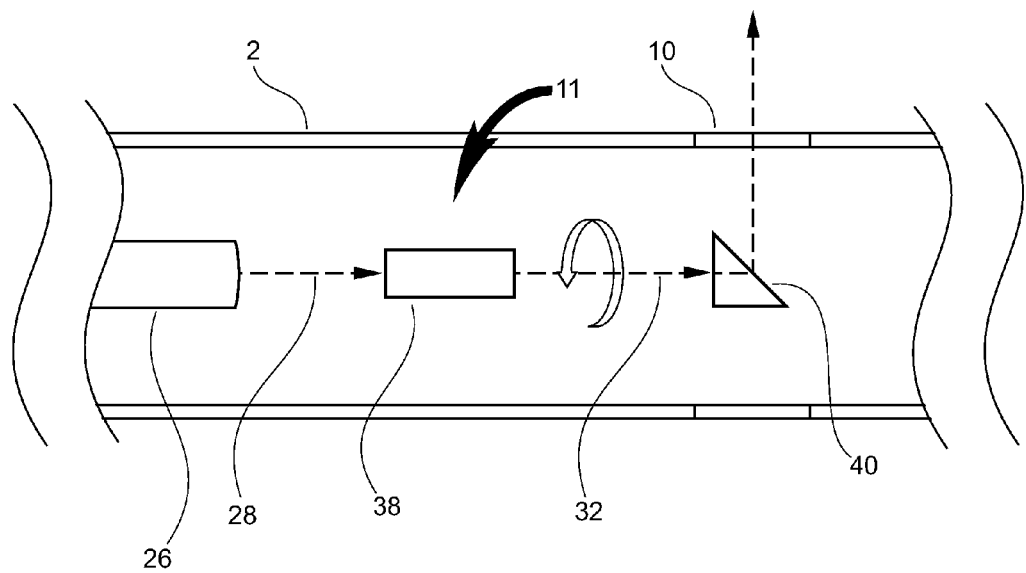

The optical system 11 is not limited to the example described previously, and may have other configurations in other embodiments. As shown in FIG. 4, in other embodiments, the optical system 11 may include an optical waveguide 26 that transmit the light beam 28 to an gradient index lens 38. The gradient index lens 38 may be configured to convert the diverging light beam 28 to a parallel light beam 28, and/or to focus the light beam 28. The gradient index lens 38 is advantageous in that it is configurable to provide a desired optical output. As shown in figure, the light beam 28 is received by a beam directing prism 40 (another example of the beam director 34), which directs at least some of the light beam 28 to exit from the region 10 at the imaging probe 1. The beam directing prism 40 is configured to rotate around the axis 32. Beam directing prism 40 directs light beam 28 radially outward from the axis of optical waveguide 26. In particular, the light beam 28 is directed by the beam director 34 radially from the longitudinal axis of optical waveguide 26. In some embodiments, the imaging probe 1 may further include a focusing lens (like the focusing lens 36 shown in FIG. 3). In such cases, the prism 40 is optically communicated to the focusing lens 36, which focuses the light beam 28 provided from the prism 40 to form an output light. In other embodiments, the imaging probe 1 of FIG. 4 may optionally further include the focusing lens 36 as similarly discussed with reference to FIG. 3.

Figure 5:
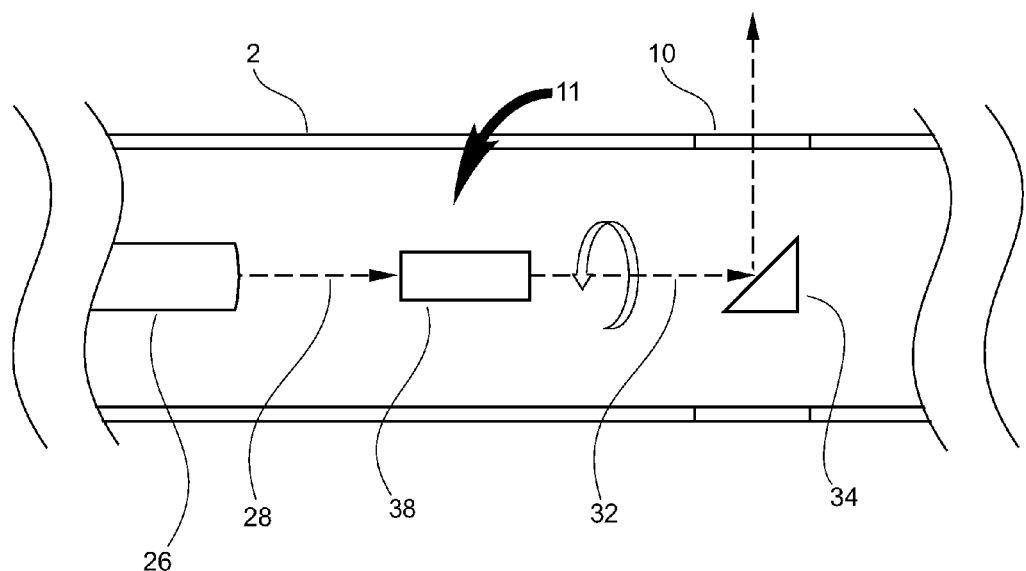

In other embodiments, instead of the prism 40, the beam director 34 of may be a mirror (FIG. 5). The embodiments of FIG. 5 may optionally include a focusing lens (like the focusing lens 36 of FIG. 3).

Figure 6:
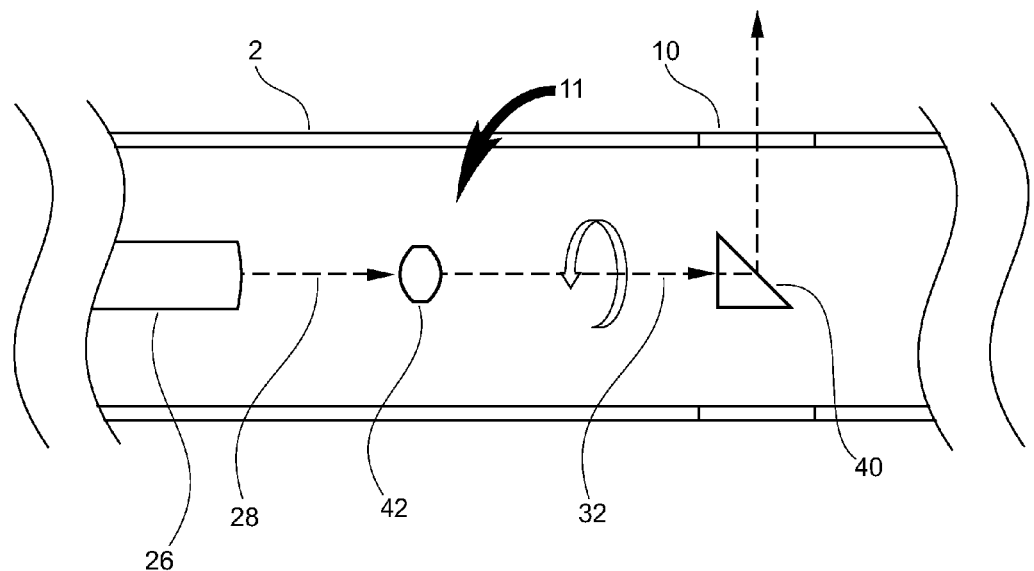

Also, in other embodiments, instead of the gradient index lens 38, the imaging probe 1 may include a finite conjugate lens 42 (FIG. 6). The finite conjugate lens 42 provides collimation and focusing of light using one lens. Alternatively, instead of the finite conjugate lens 42, two separate lenses may be used, wherein one is for collimation of light, and the other one is for focusing the light. The operation of the embodiments of FIG. 6 is similar to that described with reference to FIG. 4. In other embodiments, instead of the prism 40 shown, the imaging probe 1 of FIG. 6 may have a mirror as the beam director 34. Also, in other embodiments, the imaging probe 1 may optionally include a focusing lens (like the focusing lens 36 of FIG. 3).

Figure 7:
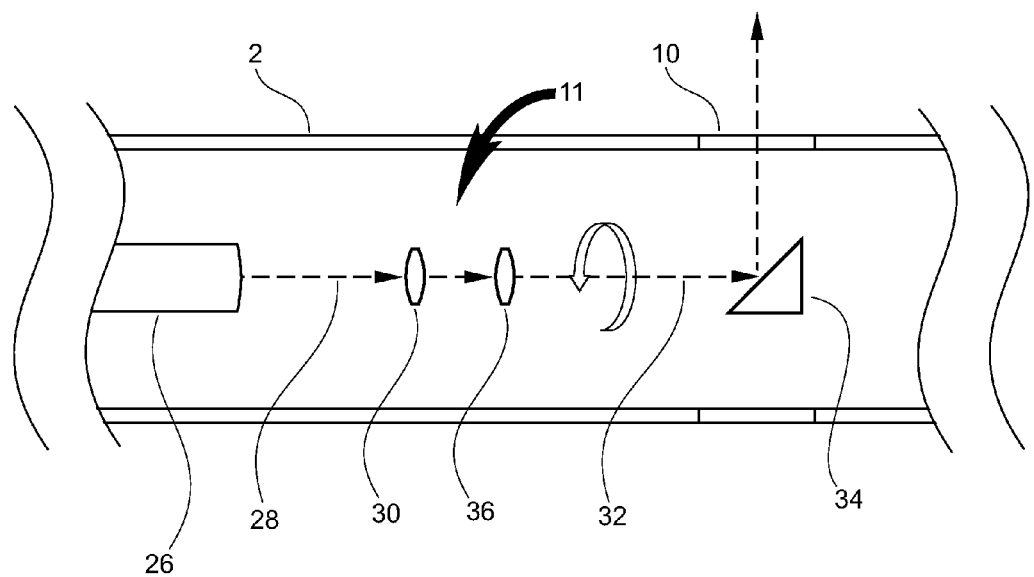

In further embodiments, instead of having the focusing lens 36 at the downstream side of the beam director 34, the focusing lens 36 may be placed upstream to the beam director 34 (FIG. 7). In such cases, the collimation lens 30 is configured to change a diverging light 28 to have a parallel configuration. The parallel light beam 28 reaches the focusing lens 36 and is focused by the focusing lens 36. The focused light beam 28 reaches the beam director 34 (illustrated as a mirror in the example), and is directed to exit through region 10 of the imaging probe 1. In other embodiments, the beam director 34 may be a prism. Also, in other embodiments, an additional focusing lens may be placed downstream from the beam director 34 to further focus the light beam 28 (such as that described with reference to FIG. 3).

It should be noted that the imaging probe 1 is not limited to the examples of the configuration of lenses described previously, and that the imaging probe 1 may have other types of lenses and/or other combination of optical components in other embodiments. For example, in other embodiments, in addition to, or instead of, any of the above optical components, the imaging probe 1 may include axicons, phase mask lenses, Fresnel lenses, aspheric lenses, or combination thereof, to process light in a desired manner (such as focusing, defocusing, collimation, filtering, etc.). Thus, in any of the embodiments of the imaging probe 1 described herein, the optical components may have different configurations (e.g., shape, size, location, arrangement, etc.). Also, in any of the embodiments of the imaging probe 1 described herein, any of the optical components may rely on different way(s) to process light other than refraction.

Figure 8:
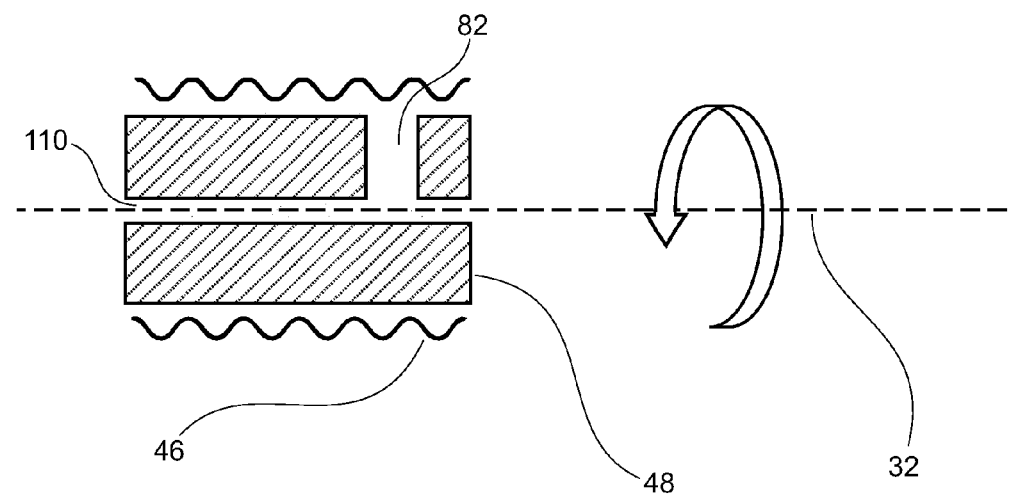
FIG. 8 illustrates a rotor with an opening that allows light to pass therethrough.

As shown in the side cross sectional view of FIG. 8, in any of the embodiments of the imaging probe 1 described herein, the turning of the beam director 34 about the axis 32 of the optical guide 26 may be accomplished using a rotor 48 and a magnetic coil 46. The magnetic coil 46 is coupled to a current source (not shown), which supplies a current to the coil 46 to make it electromagnetic. The rotor 48 may be made from a metal, or any material that reacts to a magnetic field. The beam director 34 (which is not shown for clarity) may be coupled directly or indirectly to the rotor 48, and therefore, will rotate together with the rotor 48. In other embodiments, the rotor 48 may be magnetic, which will also allow the rotor 48 to react to the magnetic coil 46. As shown in the figure, the rotor 48 has an opening 110, which allows light to travel therein. In some embodiments, the opening 110 may be configured (e.g., sized, shaped, etc.) to hold one or more optical components for optically processing the light. The operation of the rotor 48 will be described in further detail below.

Figure 9:
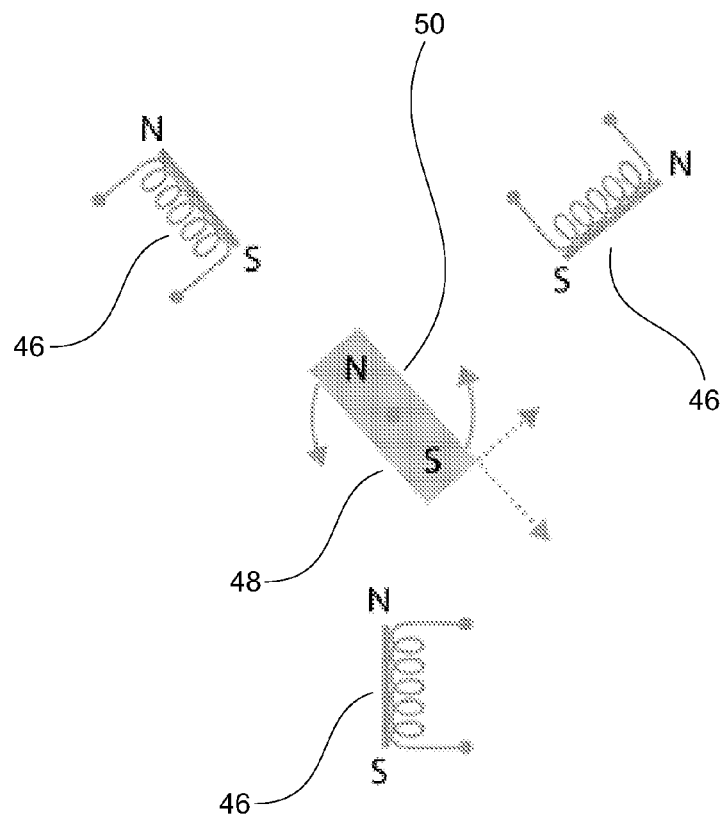
FIG. 9 illustrates conceptually how a rotor may be turned using magnetic coils.

In other embodiments, the turning of the rotor 48 may be accomplished using a plurality of coils 46 (FIG. 9). It should be noted that the orientation of the coils 46 is not limited to that shown in the figure, and that the orientation of the coils 46 may be different from that shown. Also, in other embodiments, instead of having three coils 46, the imaging probe 1 may have less than three coils 46 or more than three coils 46.

Figure 10:
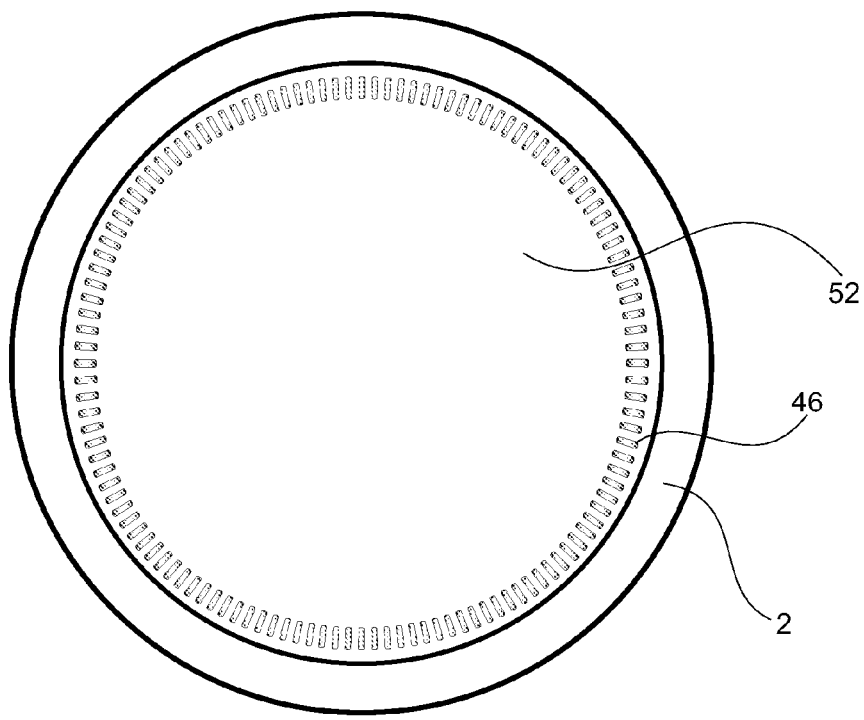
FIG. 10 illustrates a magnetic coil being placed inside an elongate member of an imaging probe.
Figure 11:
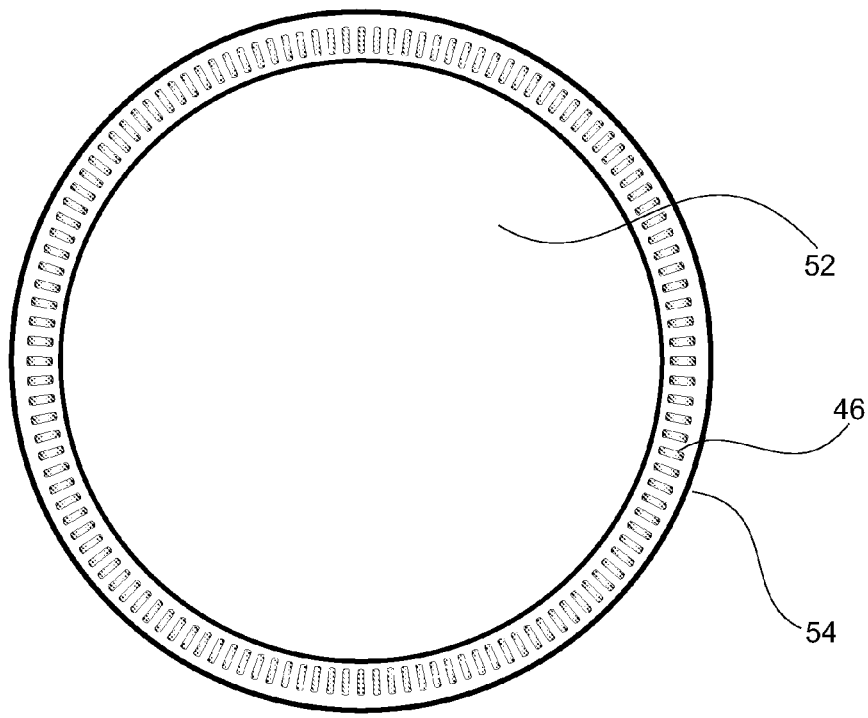
FIG. 11 illustrates a magnetic coil being placed inside a wall of an elongate member.
Figure 12:
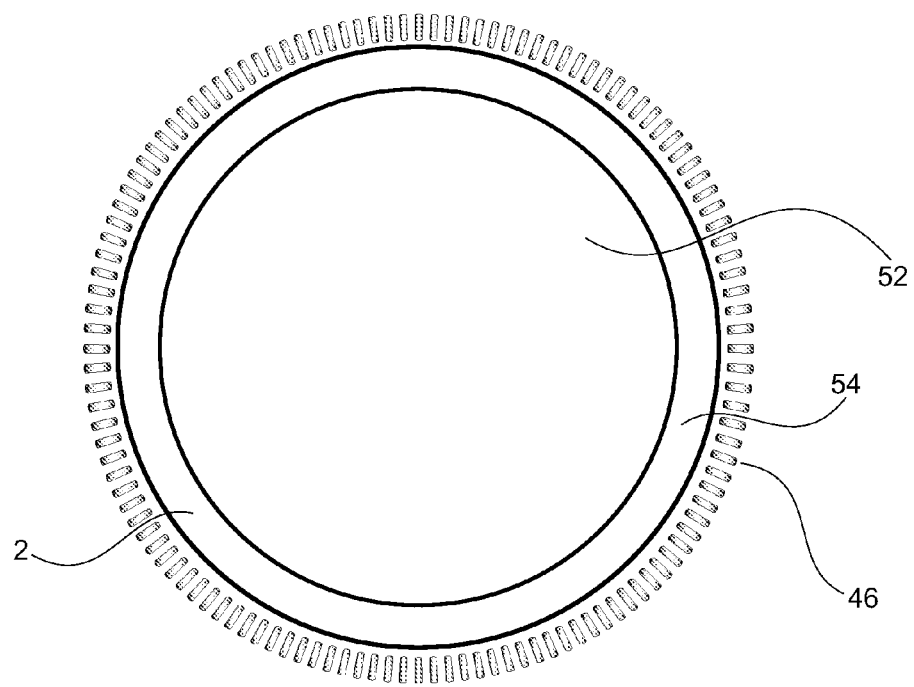
FIG. 12 illustrates a magnetic coil being placed outside an elongate member.

In any embodiments of the imaging probe 1 described herein, the magnetic coil 46 may be coupled to the elongated tube 2 of the imaging probe 1 in different manners. For example, in some embodiments, the magnetic coil 46 may be placed within the inside lumen 52 of the elongated tube 2 (FIG. 10). In other embodiments, the magnetic coil 46 may be placed within a wall 54 of the elongated tube 2 (FIG. 11). In further embodiments, the magnetic coil 46 may be placed circumferentially outside the elongated tube 2 (FIG. 12).

Figure 13:
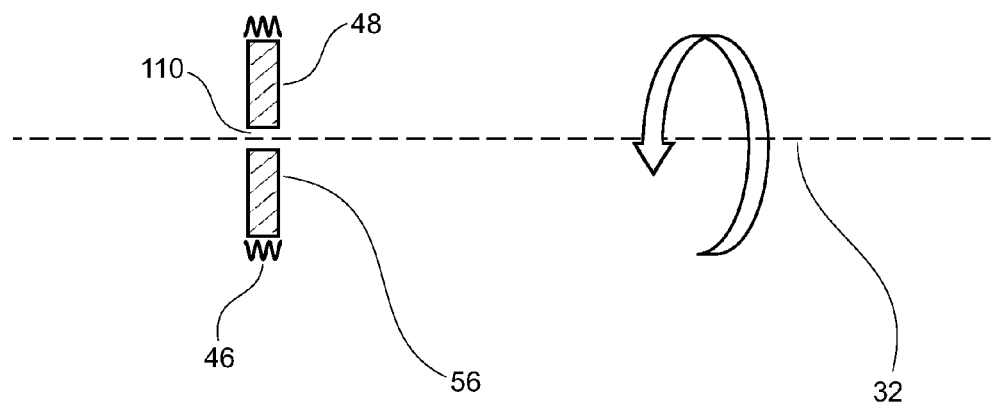
FIGS. 13-18 illustrate different magnetic coil configurations for turning a rotor in an imaging probe in different embodiments.
Figure 14:
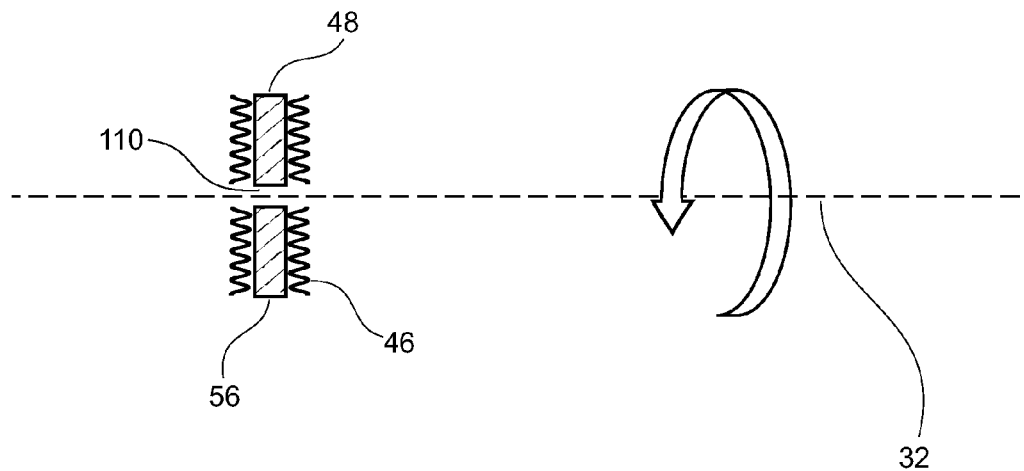

In any of the embodiments of the imaging probe 1 described herein, instead of having a block-like configuration (like that shown in FIG. 8), the rotor 48 may be a disk 56 that is mechanically coupled to the beam director 34. In such cases, the magnetic coil 46 may be placed circumferentially next to the outer side of the disk 56 (FIG. 13). The beam director 34 (which is not shown for clarity) may be coupled directly or indirectly to the disk 56, and therefore, will rotate together with the disk 56. During use, the disk 56 is mechanically responsive to a magnetic field provided by the coil 46, which rotates about the axis 32. Alternatively, the imaging probe may have a plurality of coils 46 disposed on both sides or end faces of the disk 56 (FIG. 14). In some cases, the coils 46 on both sides of the disk 56 may align each other. Alternatively, the set of coils 46 on one side of the disk 56 may form a staggered configuration with the set of coils 46 on the other side of the disk 56. In other embodiments, instead of having the coils 46 on both sides of the disk 56, the imaging probe 1 may have coils 46 on only one side of the disk 56.

Figure 15:
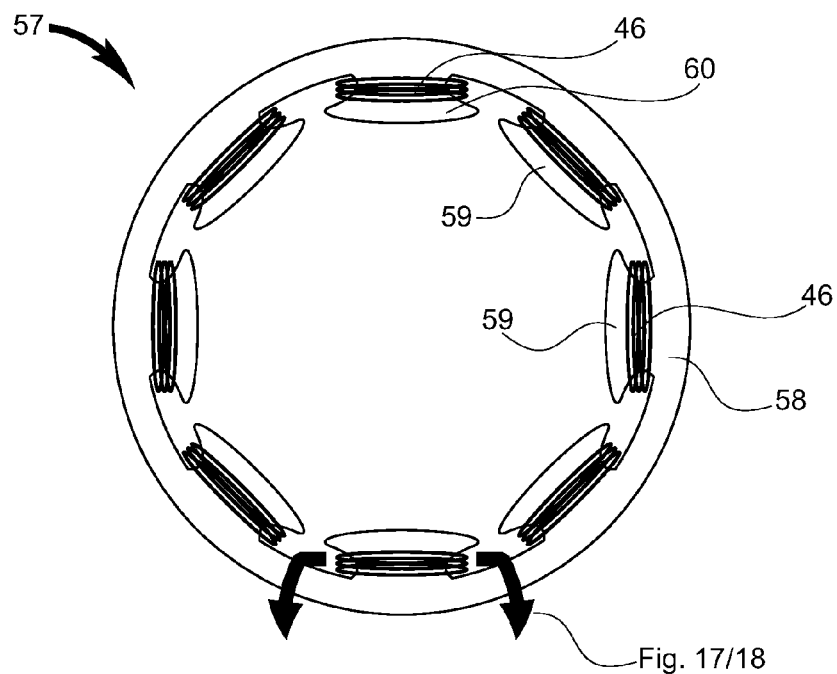
Figure 16:
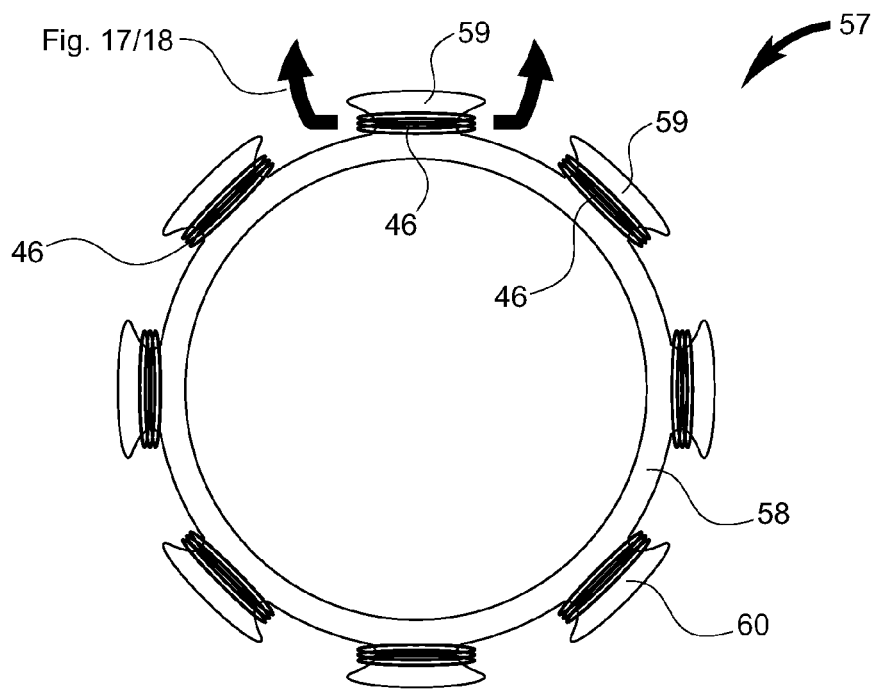

In any of the embodiments of the imaging probe 1 described herein, the turning of the rotor 48 may be accomplished using a plurality of coils 46 that are disposed circumferentially around the rotor 48. FIG. 15 illustrates a coil assembly 57 having a support structure 58 with a ring configuration. The support structure 58 has a plurality of tabs 59, each of which may carry one or more coils 46. In the illustrated embodiments, the tabs 59 are located next to the inner side of the ring structure 58. Alternatively, the tabs 59 may be located next to the outer side of the ring structure 58 such that the coils 46 are located circumferentially at the outer side of the ring structure 58 (FIG. 16). In some embodiments, the support structure 58 may be placed in the lumen of the imaging probe 1. In other embodiments, the support structure 58 may be placed in a wall of the tubular body 2 of the imaging probe 1. In further embodiments, the support structure 58 may be placed outside the body 2 of the imaging probe 1. In still further embodiments, the ring portion of the support structure 58 may be at least partially embedded in the wall of the tubular body 2, while the coils 46 are located in the lumen of the tubular body 2.

Figure 17:
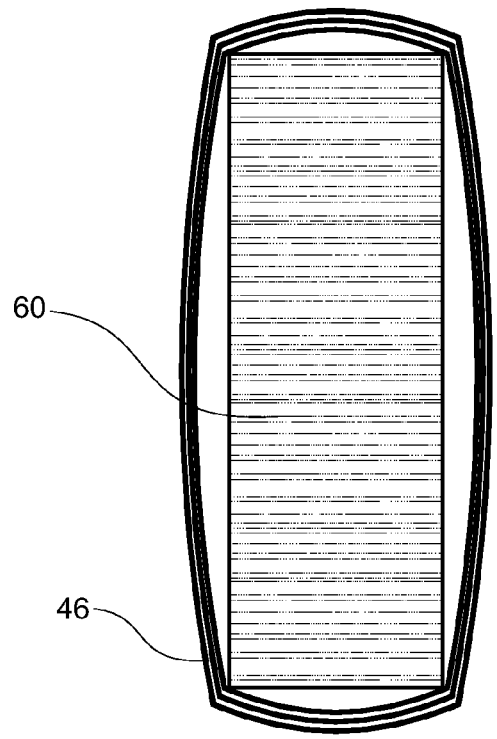
Figure 18:
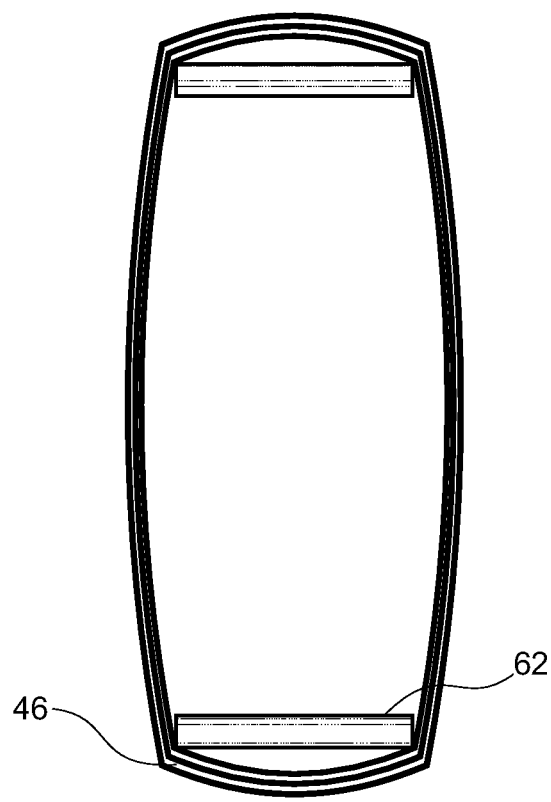

As shown in FIG. 17, each of the tabs 59 may have a solid block configuration. The solid block 60 acts as a flux concentrator to increase the local magnetic flux intensity, and direct the magnetic field towards magnetically responsive rotor 48 during use. The block 60 may also act as a coil former, wherein the shape of the coil 46 may be formed by wounding the coil 46 around the block 60. In other embodiments, each tab 59 may be implemented using a pair of arms 62 (FIG. 18). In such cases, each magnetic coil 46 may be wound around the pair of arms 62. The arms 62 may also be used to form the shape of the coil 46 by wounding the coil 46 around the arms 62).

Figure 19:
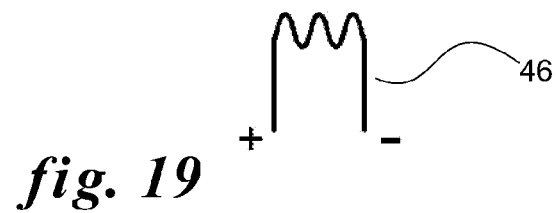
FIGS. 19-24 illustrate different magnetic coil configurations that may be used in any of the embodiments of the imaging probe described herein.
Figure 20:
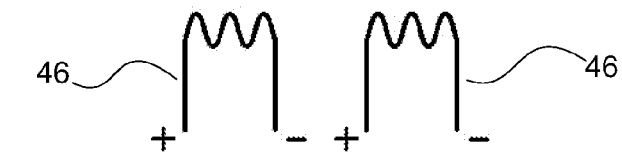
Figure 21:
Figure 22:
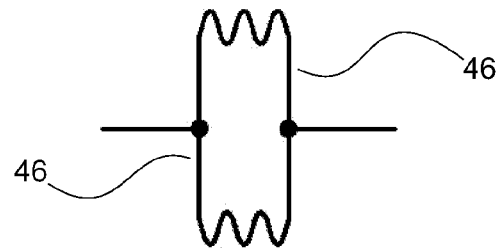
Figure 23:
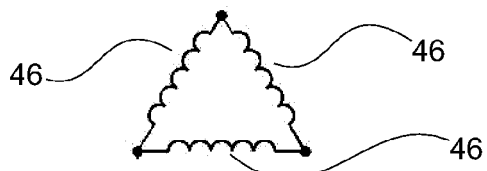
Figure 24:
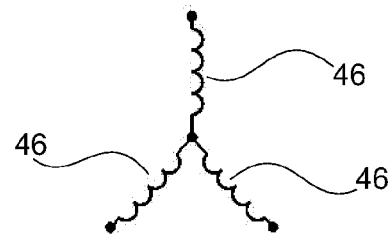

In any of the embodiments of the imaging probe 1 described herein, the coil(s) 46 that provide the magnetic field to cause the rotor 48 to rotate may have different configurations. For example, in some embodiments, the imaging probe 1 may include a single coil 46 having ends connected to a power source (FIG. 19). In other embodiments, the imaging probe 1 may have a plurality of coils 46 that are independently connected to a power source, or to different respective power sources (FIG. 20). Although two coils 46 are shown, in other embodiments, the probe 1 may include more than two coils 46. In further embodiments, the plurality of coils 46 may be connected in series (FIG. 21). Although two coils 46 are shown, in other embodiments, the probe 1 may include more than two coils 46 connected in series. In further embodiments, the plurality of coils 46 may be connected in parallel (FIG. 22). Again, although two coils 46 are shown, in other embodiments, the probe 1 may include more than two coils 46 connected in parallel. In still further embodiments, three magnetic coils 46 may be connected in a delta configuration (FIG. 23). In further embodiments, three magnetic coils 46 may be connected in a Wye configuration (FIG. 24).

Figure 25:
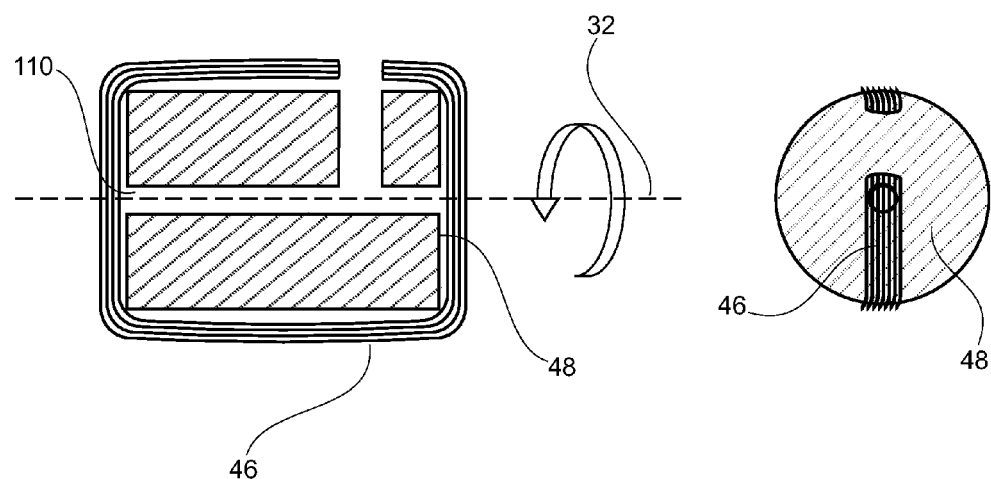
FIG. 25 illustrates a rotor and a magnetic coil that may be used in any of the embodiments of the imaging probe described herein.

As discussed, the rotor 48 of the imaging probe 1 may have a block configuration. FIG. 25 illustrates a rotor 48 having a block configuration in some embodiments. The rotor 48 includes the opening 110 for allowing light provided from the optical guide 26 to travel therein. The coil 46 is disposed around the rotor 48, and the coil 46, when energized with power, is configured to provide a magnetic field to cause the rotor 48 to rotate about the axis 32.

Figure 26:
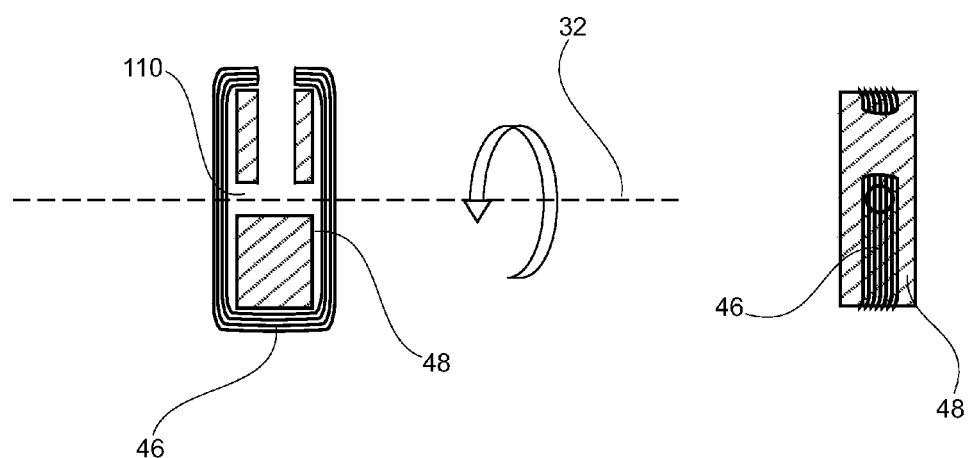
FIG. 26 illustrates another rotor and magnetic coil that may be used in any of the embodiments of the imaging probe described herein.

Also as discussed, the rotor 48 of the imaging probe 1 may have a disk configuration. FIG. 26 illustrates a rotor 48 having a disk configuration in some embodiments. The rotor 48 includes the opening 110 for allowing light provided from the optical guide 26 to travel therein. The coil 46 is disposed around the rotor 48, and the coil 46, when energized with power, is configured to provide a magnetic field to cause the rotor 48 to rotate about the axis 32.

Figure 27A:
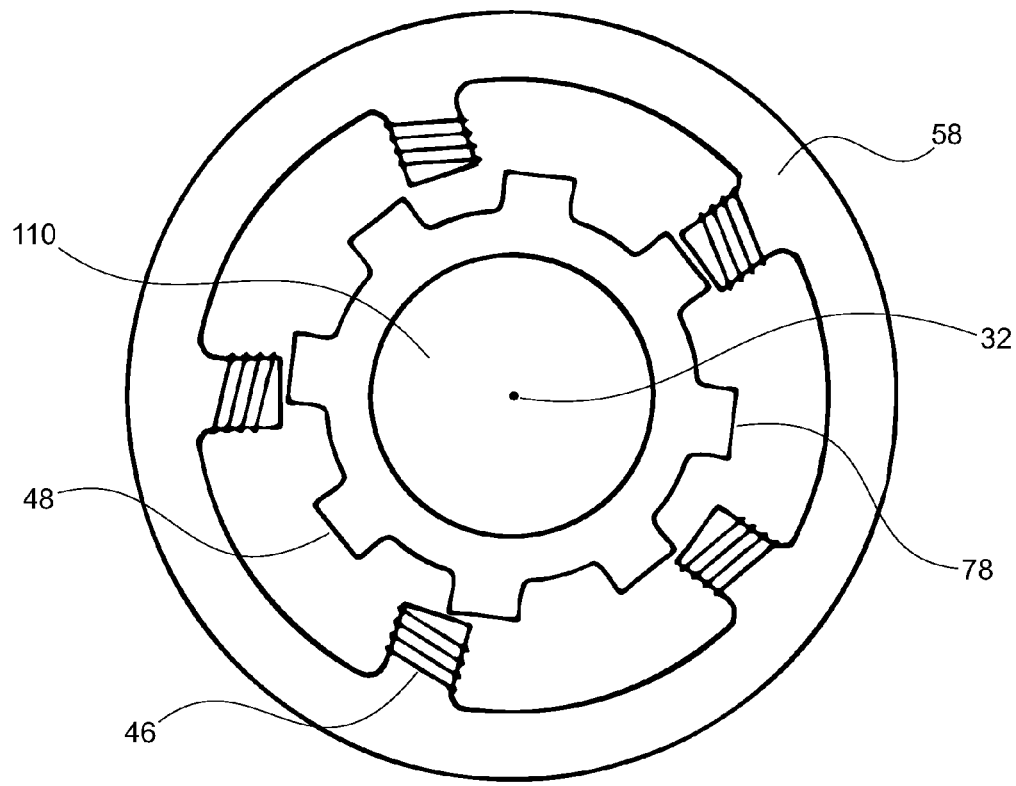
FIG. 27A illustrates another rotor and magnetic coil that may be used in any of the embodiments of the imaging probe described herein.
Figure 27B:
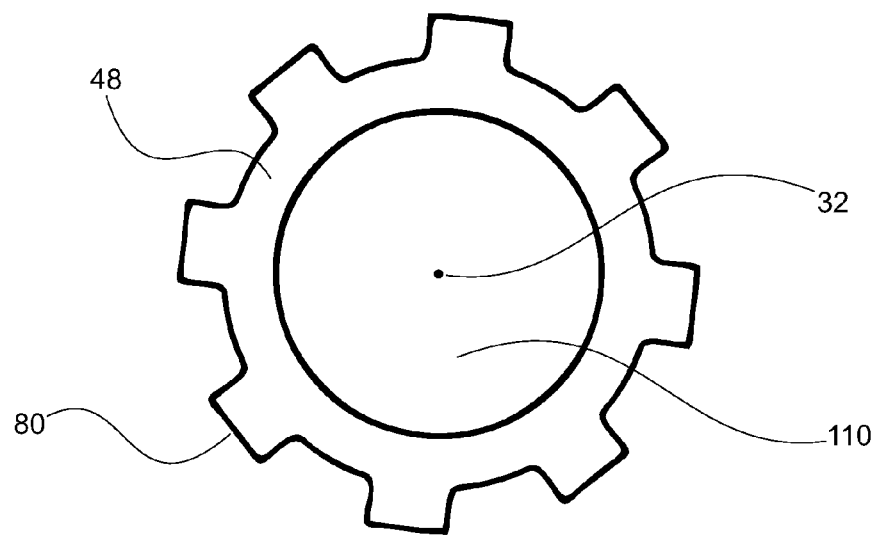
FIG. 27B illustrates the rotor of FIG. 27A in accordance with some embodiments.

It should be noted that the rotor 48 should not be limited to have the examples of configurations described previously, and that in other embodiments, the rotor 48 may have different configurations. FIGS. 27A and 27B illustrate a rotor 48 having a plurality of teeth 78 disposed circumferentially around the rotor 48. The teeth 78 may be formed by making cutouts 88 along a surface of the rotor 48. Alternatively, the teeth 78 may be attached to the rotor 48 using a connector or a suitable adhesive. The rotor 48 is surrounded by a plurality of coils 46 that are carried by the support structure 58. The support structure 58 is similar to that described with reference to FIG. 15. During use, the coils 46 may be energized to generate respective magnetic fields, which attract the raised teeth 78 to thereby turn the rotor about the axis 32. As shown in the figures, the rotor 48 also includes the opening 110 for allowing light to travel therein.

Figure 28:
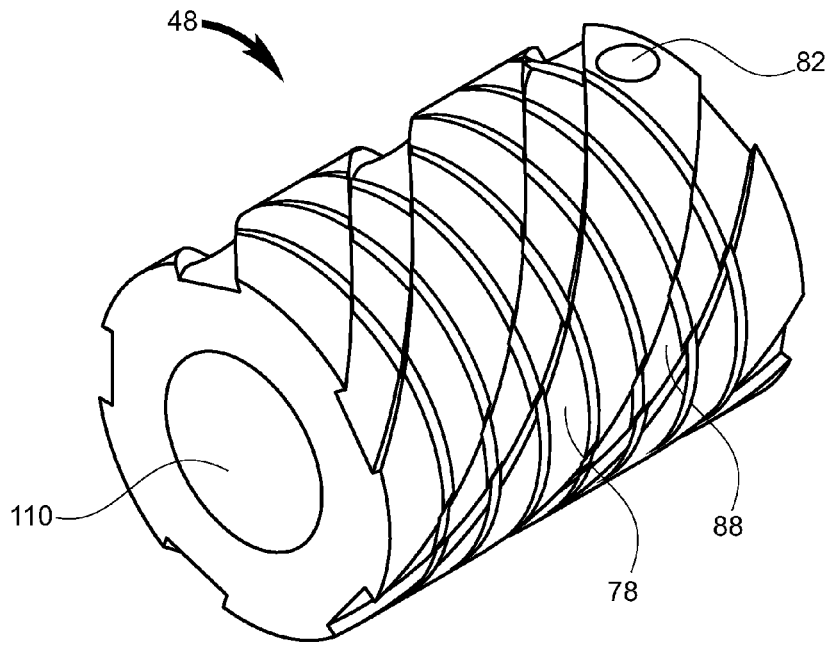
FIG. 28 illustrates a rotor that may be used in any of the embodiments of the imaging probe described herein.

In some embodiments, the teeth 78 of the rotor 48 may extend along the length of the rotor 48 and are parallel to the axis 32. In other embodiments, the teeth 78 of the rotor 48 may form respective spiral configurations along the length of the rotor 48 (FIG. 28). The spiral configuration is advantageous because it allows the turning of the rotor 48 to occur smoothly as each tooth 78 rotates from one coil 46 to an adjacent coil 46. As shown in the figure, the rotor 48 further includes a side port 82, which allows light to exit therethrough or to enter therein.

Figure 29:
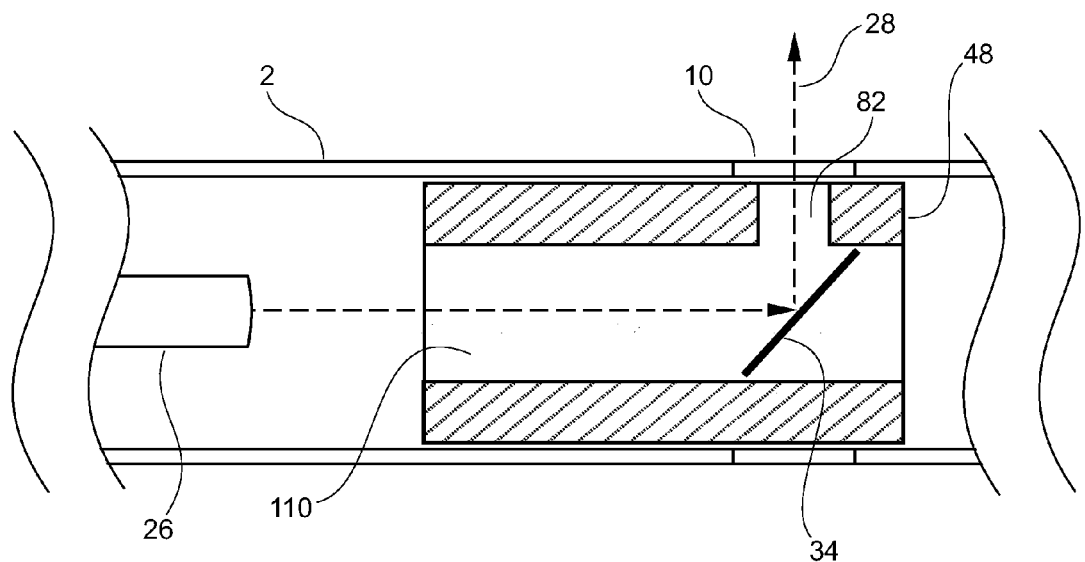
FIG. 29 illustrates a cross sectional side view of a rotor in accordance with some embodiments.

FIG. 29 illustrates a side cross sectional view of a rotor 48, particular showing the internal configuration of the rotor 48. The rotor 48 may be the rotor 48 of FIG. 28, or alternatively, any of the embodiments of the rotor 48 described herein. The coil(s) 46 for rotating the rotor 48 is not shown for clarity purpose. However, it should be understood that the imaging probe 1 of FIG. 29 may have any of the embodiments of the coil(s) 46 described herein. For example, the imaging probe 1 may have one or more coils 46 in the lumen of the imaging probe 1, in the wall of the imaging probe 1, or outside the imaging probe 1. As shown in the figure, the opening 110 is in communication with the port 82. During use the opening 110 receives light from the optical guide 26. The rotor 48 includes a beam director 34 (which may be a mirror, a prism, or another optical component that can direct a light) placed inside the opening 110. Thus, rotation of the rotor 48 will also cause rotation of the beam director 34. In the illustrated embodiments, the side port 28 of the rotor 48 is in alignment with the transparent region 10 of the imaging probe 1, which allows light exiting from the side port 28 to exit the region 10. Such configuration also allows light travelling into the imaging probe 1 through the region 10 to enter the side port 28 of the rotor 48.

Figure 30:
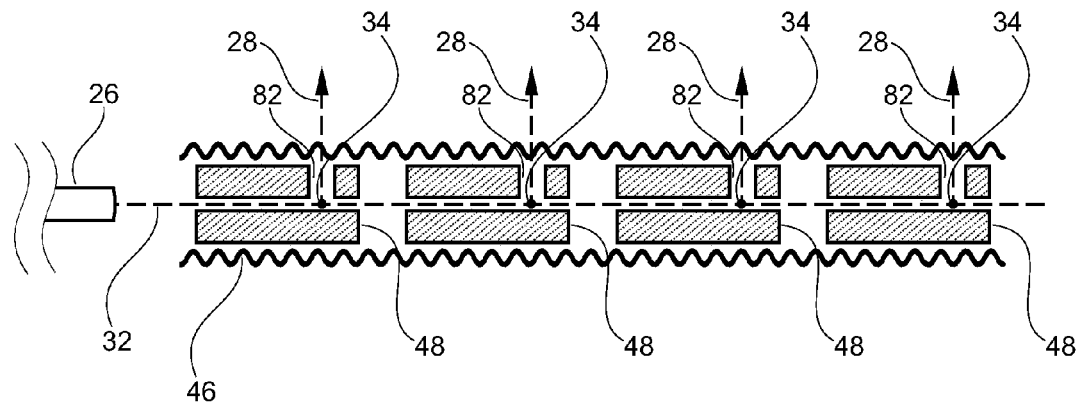
FIG. 30 illustrate a plurality of rotors that may be used in any of the embodiments of the imaging probe described herein.

In any of the embodiments of the imaging probe 1 described herein, the imaging probe 1 may include a plurality of rotors 48 (FIG. 30). As shown in the figure, the rotors 48 align relative to each other along the length of the imaging probe 1. Each of the rotors 48 has a beam director 34. In the illustrated embodiments, the beam director 34 may include a prism for providing an output light beam 28 while passing another light beam downstream. In other embodiments, the beam director 34 may include a beam splitter which convert an input light into two output light beams. In such cases, each beam director 34 may further include a mirror or prism for directing one of the two output light beams out of side port 82, while the other one of the two output light beams transmits downstream. During use, the multiple rotors 48 rotate around a common axis 32 of rotation to provide multiple radial scanning regions by providing different output beams 28. In the illustrated embodiments, the output beams 28 all face towards the same direction. In other embodiments, the output beams 28 may face different directions. For example, one of the beams 28 may face towards a first direction, and another one of the beams 28 may face towards a second direction that is opposite to the first direction (or at any of other angles relative to the first direction).

Figure 31:
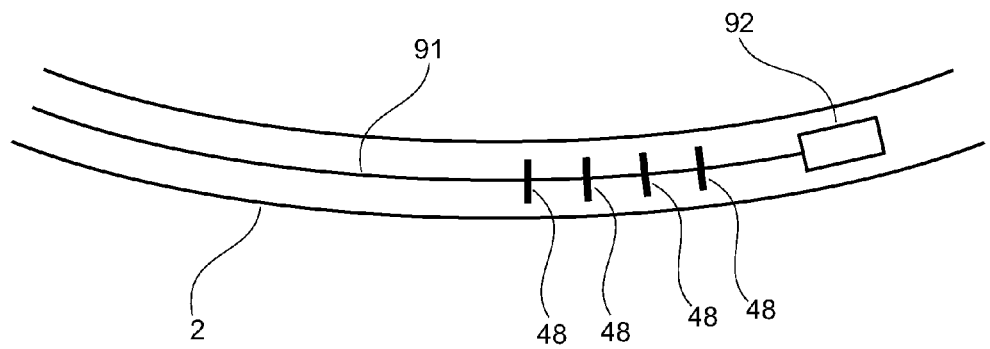
FIG. 31 illustrates a plurality of rotors with an optical system that may be used in any of the embodiments of the imaging probe described herein.

FIG. 31 shows another imaging probe 1 with multiple magnetically responsive disk rotors 48 that align relative to each other along the imaging probe 1. The imaging probe 1 includes a flexible shaft 91 that mechanically couples the rotors 48 together. The flexible shaft 91 may include fiber optics that optically couples to an optical assembly 92. The optical assembly 92 may include a laser source, and/or other optical component(s), such as optical lenses, beam directors, etc. In the illustrated embodiments, each rotor 48 may include a beam director 34, as similarly discussed with reference to FIG. 30.

Figure 32:
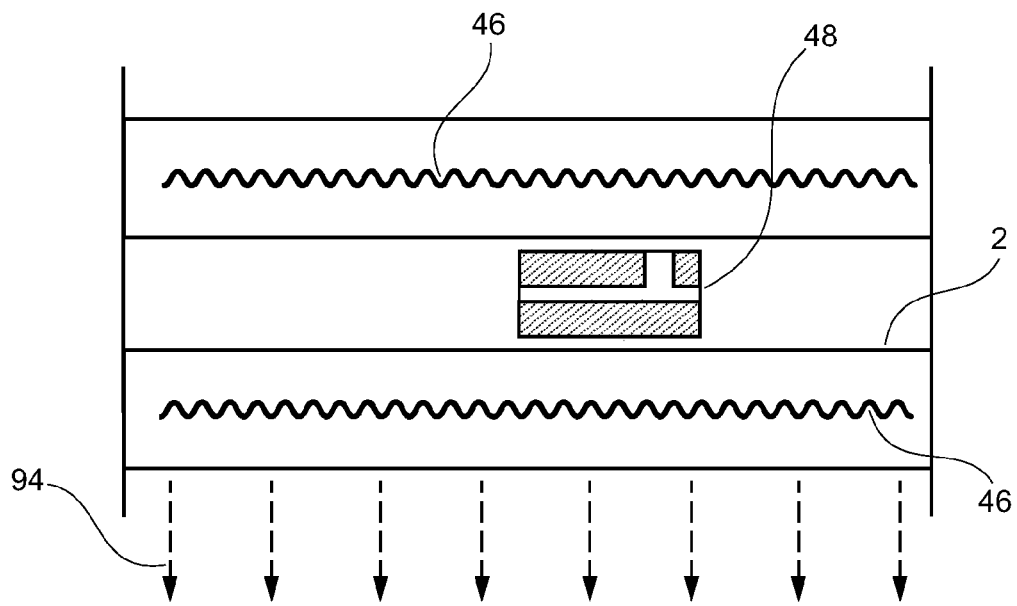
FIG. 32 illustrates that heat may be generated during an operation of an imaging probe.
Figure 33:
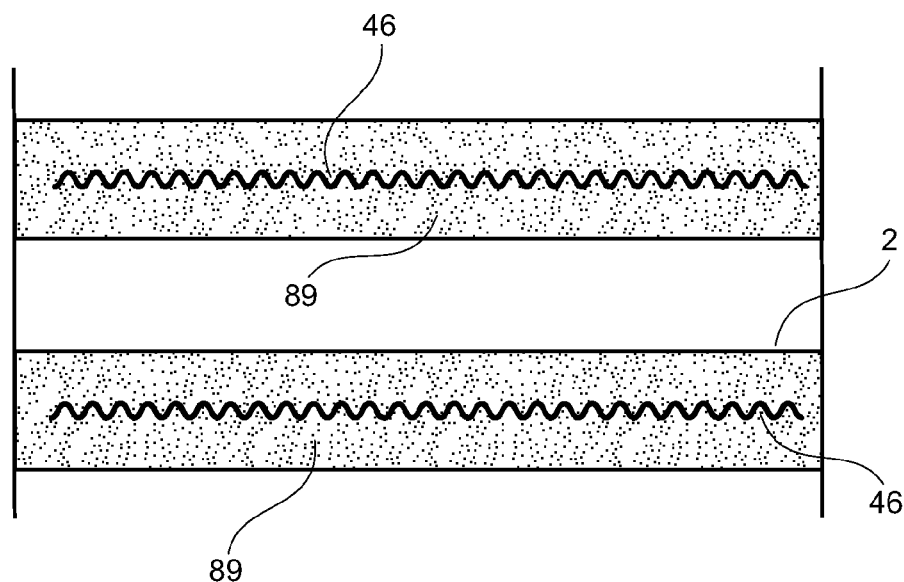
FIG. 33 illustrates a wall of a tubular body having thermally conductive particles for dissipating heat flux, which may be used in any of the embodiments of the imaging probe described herein.

In any of the embodiments described herein, operation of the imaging probe 1 may generate heat flux when the coil(s) 46 is energized with power. FIG. 32 shows the elongated tube 2 with a magnetic coil 46 in the lumen of the elongated tube 2 for rotating the rotor 48. As shown in the figure, heat flux 94 is being generated when the magnetic coil 46 is energized with power. As shown in FIG. 33, in some embodiments, the imaging probe 1 may include thermally conductive particles 89 embedded within the material of the elongated tube 2. The particles 89 may be made from any material that is thermally conductive, including but not limited to metal, carbon (such as carbon nanotubes), graphene, graphite, etc. During use, the particles 89 serve to increase thermal conductivity of the elongated tube 2 to dissipate heat flux generated by magnetic coils 46, thereby reducing an amount of heat delivered to surrounding tissue. The embedded metal particles in the may serve as heat conductors, which spread and/or transmit the heat away from the active coil area. In other embodiments, instead of metal particles that are embedded in the elongated tube 2, a metalized coating may be applied on the surface of the probe 1, wherein the coating may be in contact, or in close proximity to the coil 46 to optimize the heat transfer property. In other embodiments, conductive element such as a metallic tube or structure can be placed in contact, or close proximity, of the coil 46 to conduct heat away. In further embodiments, the probe 1 may have one or more lumens for transmitting a cooling fluid (gas or liquid) to carry heat away from the heated area. The lumen(s) may be channel(s) in the wall of the elongated tube 2. Alternatively, the lumen(s) may be tubing(s) that are housing in the lumen of the elongated tube 2.

In the above embodiments, the rotor 48 has been described as having an opening 110 for allowing light to pass therethrough. The opening 110 is aligned with the axis 32 of rotation. Thus, the rotor 48 needs to be rotatably supported inside the lumen of the imaging probe 1 while allowing light to pass through the opening 110. FIGS. 34-39 illustrate different techniques for rotatably supporting the rotor 48 inside the lumen 52 of the imaging probe 1 in different embodiments. In the different embodiments, the rotor 48 is rotatably supported relative to the imaging probe 1, while the opening 110 of the rotor 48 that aligns with the axis 32 of rotation provides a passage of light to pass therethrough.

Figure 34:
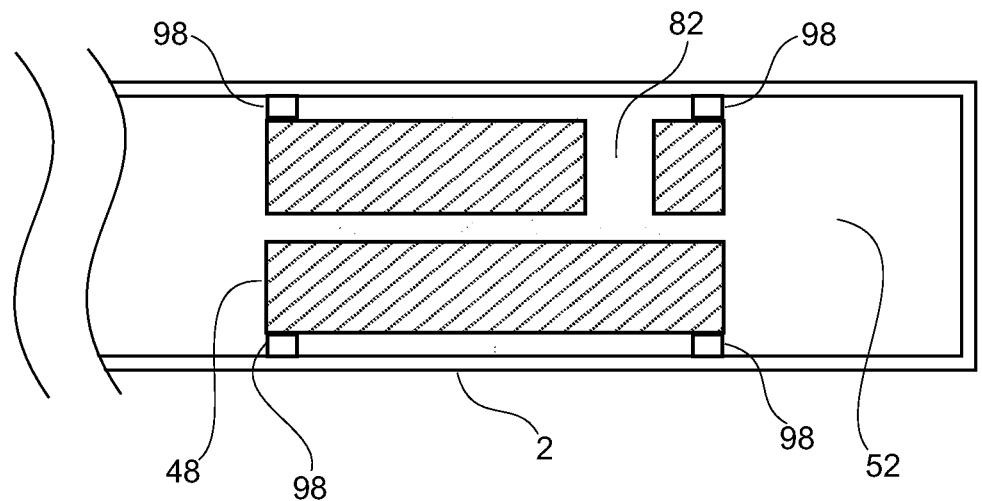
FIGS. 34-39 illustrate different techniques for rotatably supporting a rotor without using the opening of the rotor, wherein the different techniques may be implemented in any of the embodiments of the imaging probe described herein.

FIG. 34 shows an embodiment of the imaging probe 1 with the magnetically responsive rotor 48 being rotatably supported by low friction bearings 98 on the outside diameter of the rotor 48. As used in this specification, the term "low friction bearing", and similar terms, such as "bearing", may refer to any device or surface for allowing a component to easily slide there against, and by means of non-limiting examples, may include devices, such as bushings, jewel bearings, sleeve bearings, fluid bearings, etc. The low friction bearings 98 may be attached to elongated tube 2. In other embodiments, the low friction bearings 98 may be mechanically attached to an intermediate structure, and the intermediate structure is then mechanically attached to the elongated tube 2.

Figure 35:
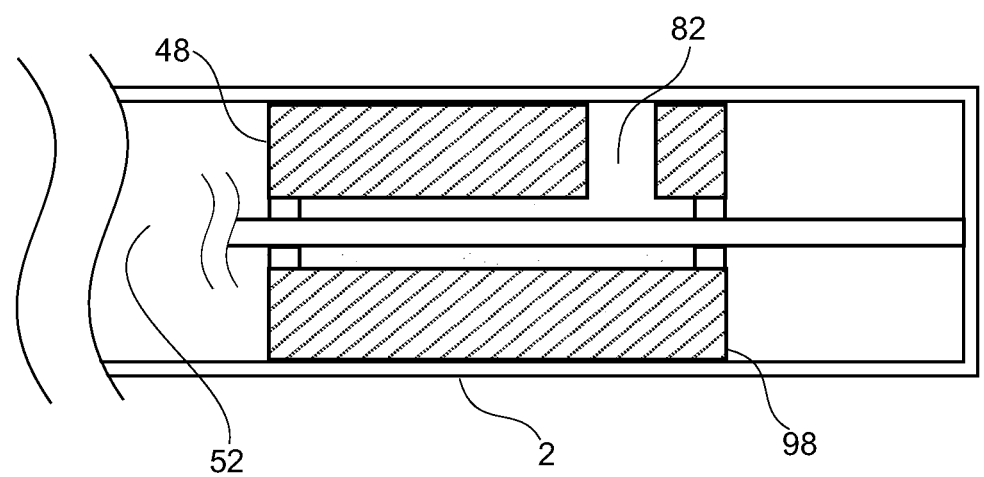

FIG. 35 shows another embodiment of the imaging probe 1 with the magnetically responsive rotor 48 being rotatably supported by low friction bearings 98 on the inside surface of the rotor 48. The low friction bearings 98 are mounted to a shaft 102 that is securely mounted to the elongated tube 2. In some embodiments, the shaft 102 may carry one or more optical components. In such cases, the shaft 102, or at least a portion of it, may be transparent, thereby allowing light to travel therein to exit therethrough (e.g., and exit from port 82). The transparent portion of the shaft 102 may also allow light entering the port 82 to reach the optical component(s) in the shaft 102.

Figure 36:
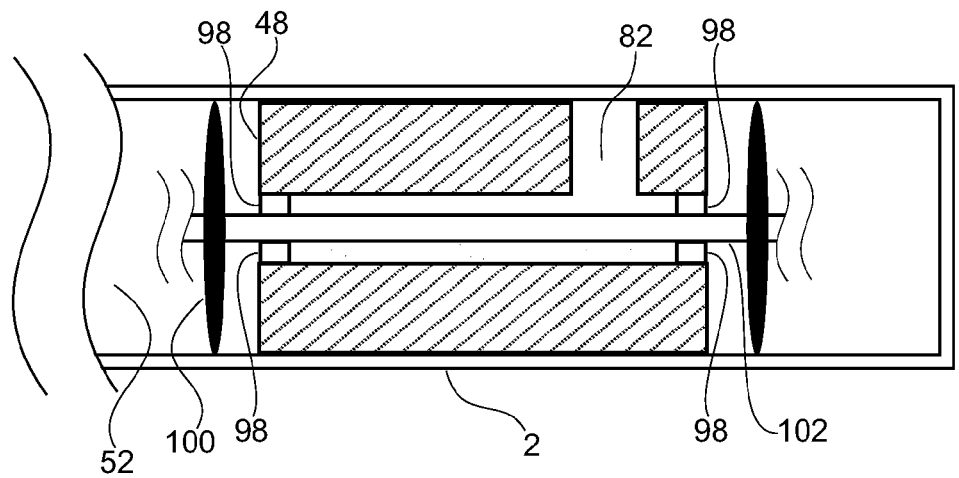

In other embodiments, instead of attaching the shaft 102 to an end of the imaging probe 1, the shaft 102 may be coupled to a side of the imaging probe 1. FIG. 36 shows another embodiment of the imaging probe 1, which is similar to that shown in FIG. 35, except that the shaft 102 is coupled to the side of the imaging probe 1 through an intermediate support structure 100. The support structure 100 may be mechanically attached to elongated tube 2 of the imaging probe 1.

Figure 37:
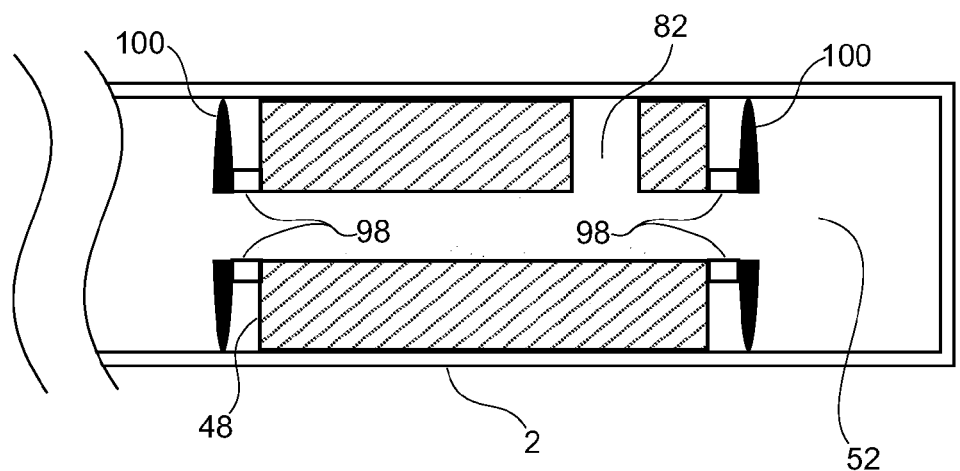

In further embodiments, the magnetically responsive rotor 48 may be rotatably supported in the lumen 52 of the imaging probe 1 by low friction bearings 98 on end faces of the rotor 48 (FIG. 37). The bearings 98 may be mounted to a support structure 100 that mechanically attaches to the elongated tube 2 of the imaging probe 1.

Figure 38:
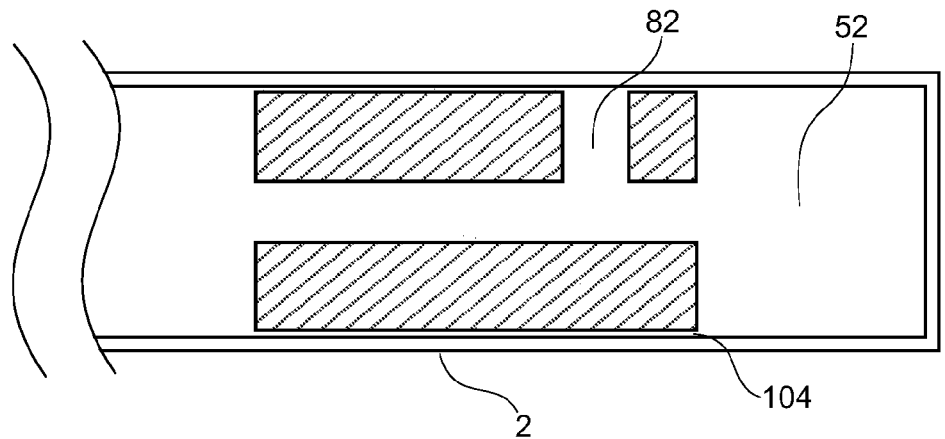

In still further embodiments, the magnetically responsive rotor 48 may be rotatably supported in the lumen 52 of the imaging probe 1 by an anti-friction interface 104 (FIG. 38). The interface 104 may be a low friction coater applied between the rotor 48 and the elongated tube 2. In other embodiments, the elongated tube 2 may be made from a material that provides the anti-friction feature.

Figure 39:
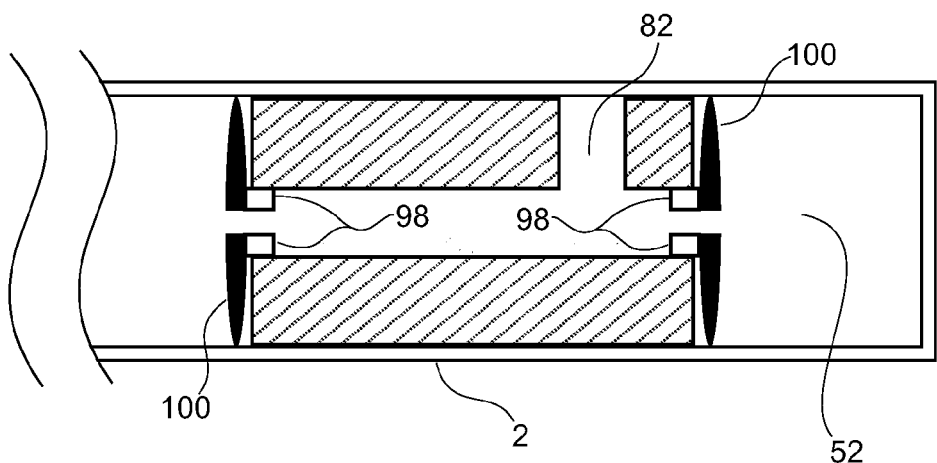

In still further embodiments, the magnetically responsive rotor 48 may be rotatably supported in the lumen 52 of the imaging probe 1 using low friction bearings 98 placed inside the opening 110 (FIG. 39). The bearings 98 may be mounted to a support structure 100, and the support structure 100 may be mechanically attached to elongated tube 2 of the imaging probe 1.

In any of the embodiments of the imaging probe 1 described herein, the rotor 48 may be rotatably supported on a cylindrical pin or structure, or on an optical waveguide (such as a fiber optic), or a bundle of optical fibers or optical waveguides arranged in a circular fashion. In such cases, the imaging probe 1 may have a low friction material interface between the optical fiber(s) and rotor 48. In other embodiments, the optical waveguide may be fixedly secured relative to the rotor 48. In such cases, the rotor 48 does not rotate relative to the optical waveguide, and instead, the optical waveguide may be rotatably supported in the lumen of the imaging probe 1. Furthermore, the rotor 48 may also use a part of the elongated tube 2 of the imaging probe 1 as a support and bearing surface. In such cases, either or both of the surfaces of the rotor 48 and the elongated tube 2 maybe coated with a low friction material. Also, in any of the embodiments described herein, the bearing(s) 98 of the imaging probe 1 may be implemented using low friction bushing(s), cartridge bearing(s), radial bearing(s), thrust bearing(s), knife edge bearing(s), air bearing(s), or jewel bearing(s), which may be placed inside or outside of the rotor 48 to allow friction free rotation. In further embodiments, the imaging probe 1 does not include any bearings for supporting the rotor 48. In such cases, the rotor 48 may spin relative to the inside wall of the elongated tube 2 without using any bearings.

Figure 40:
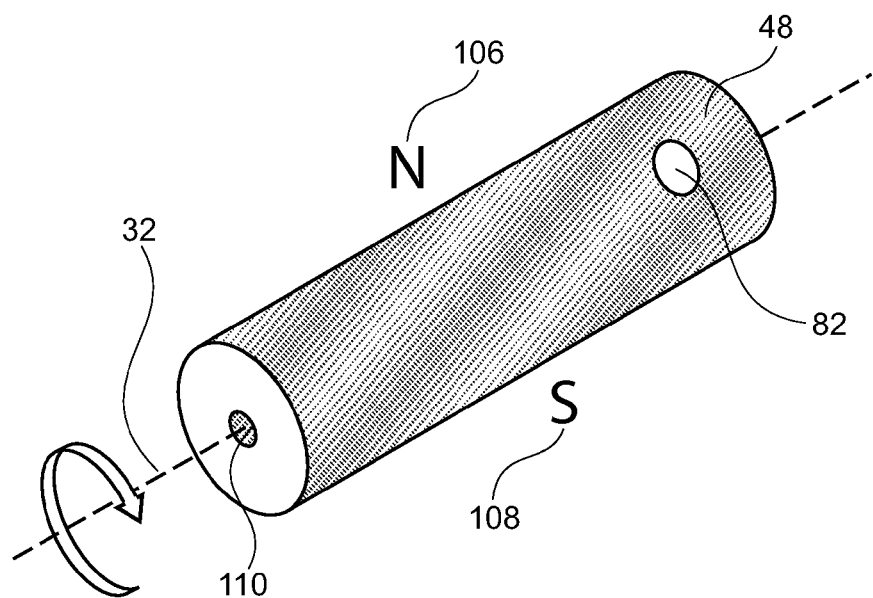
FIG. 40 illustrates a magnetic rotor in accordance with some embodiments, wherein the magnetic rotor may be used in any of the embodiments of the imaging probe described herein.
Figure 41:
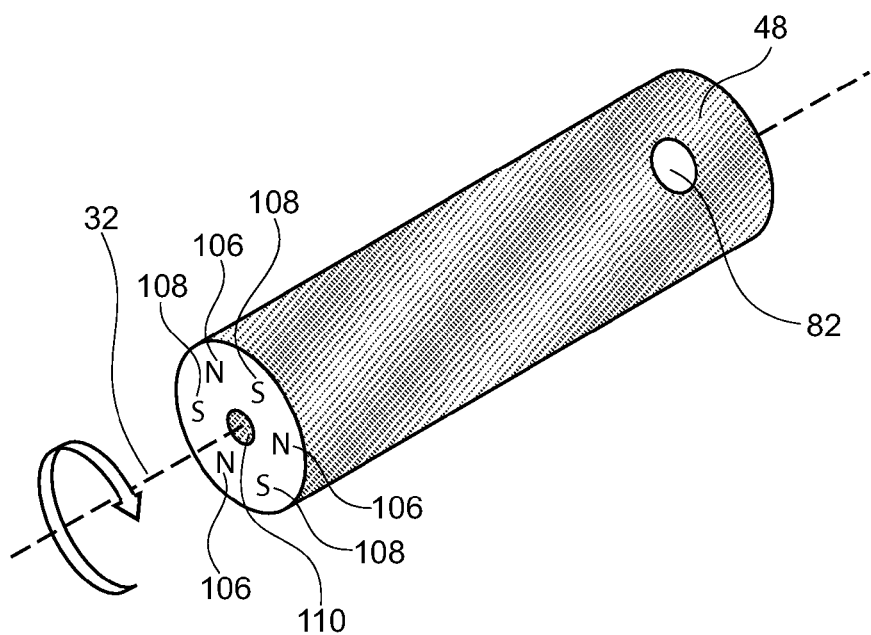
FIG. 41 illustrates another magnetic rotor in accordance with other embodiments, wherein the magnetic rotor may be used in any of the embodiments of the imaging probe described herein.

In any of the embodiments of the imaging probe 1 described herein, the rotor 48 may be magnetic. FIG. 40 illustrates a rotor 48 having a north pole 106 and a south pole 108 in a diametrically opposite configuration. The rotor 48 also has the opening 110 for allowing light to pass therethrough, and the side port 82, as similarly discussed. In the illustrated embodiments, the rotor 48 may be turned by delivering power to coils 46 (not shown) that are disposed next to the rotor 48. The polarity of the coils 46 may be electrically switched to thereby cause the rotor 48 to accelerate or decelerate. In further embodiments, instead of having a single pair of north-south poles 106, 108, the rotor 48 may have more than one pair of north-south poles 106, 108 (FIG. 41).

Figure 42:
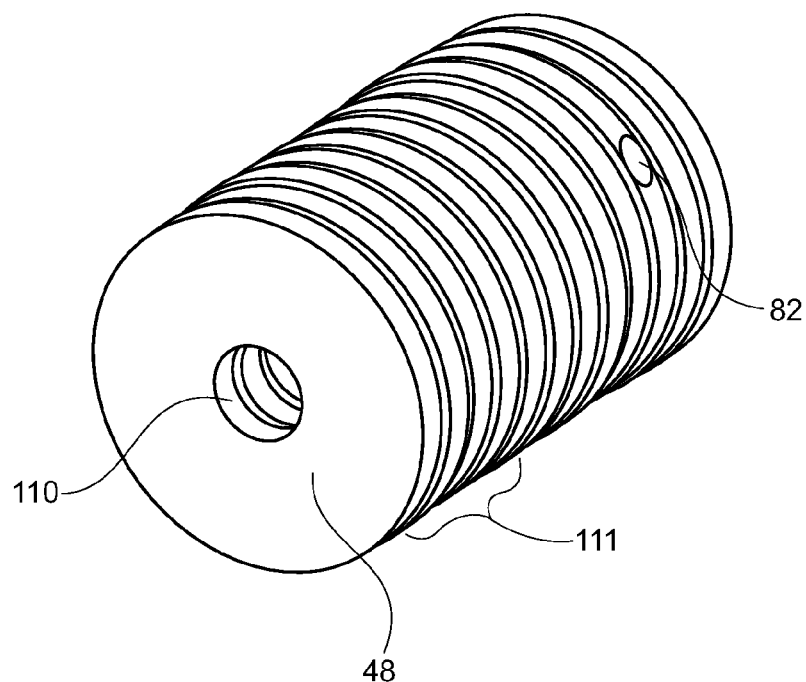
FIG. 42 illustrates a rotor in accordance with some embodiments, wherein the rotor may be used in any of the embodiments of the imaging probe described herein.
Figure 43:
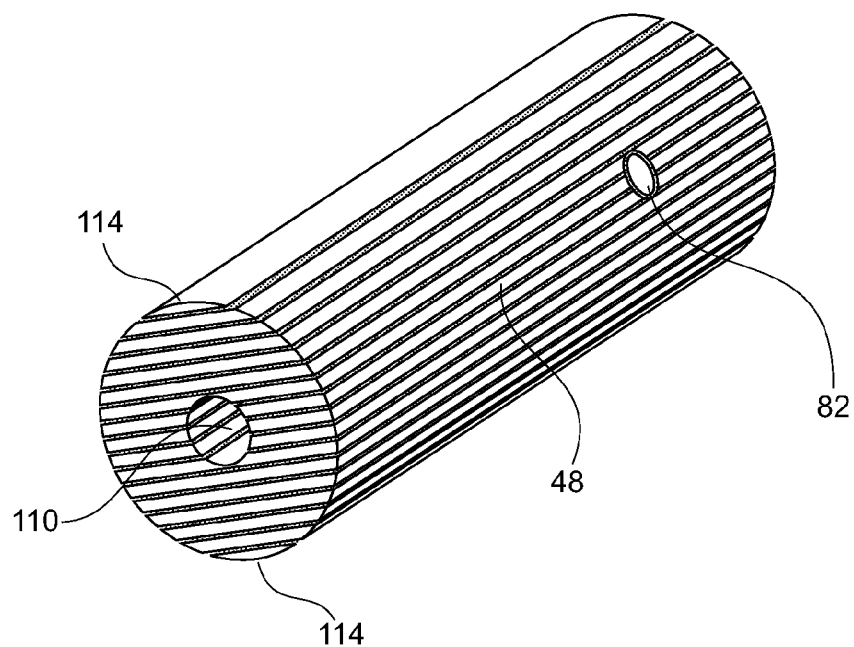
FIG. 43 illustrates a rotor in accordance with other embodiments, wherein the rotor may be used in any of the embodiments of the imaging probe described herein.

Various techniques may be used to construct embodiments of the rotor 48 described herein. FIG. 42 shows magnetically responsive disk stacked rotor 48 formed from multiple layers of disk magnets 111 which are mechanically attached together. Each disk magnets 111 has an opening, which collectively forms the opening 110 for the rotor 48. The optical beam exit port 86 is also formed at one of the disks 111. In other embodiments, the port 86 may be formed by more than one disks 111. FIG. 43 shows slab stacked laminated magnetically responsive rotor 48 having inner hole 110 and optical beam exit port 86. The rotor 48 is formed by a plurality of slabs 114 that are mechanically attached together.

Figure 44:
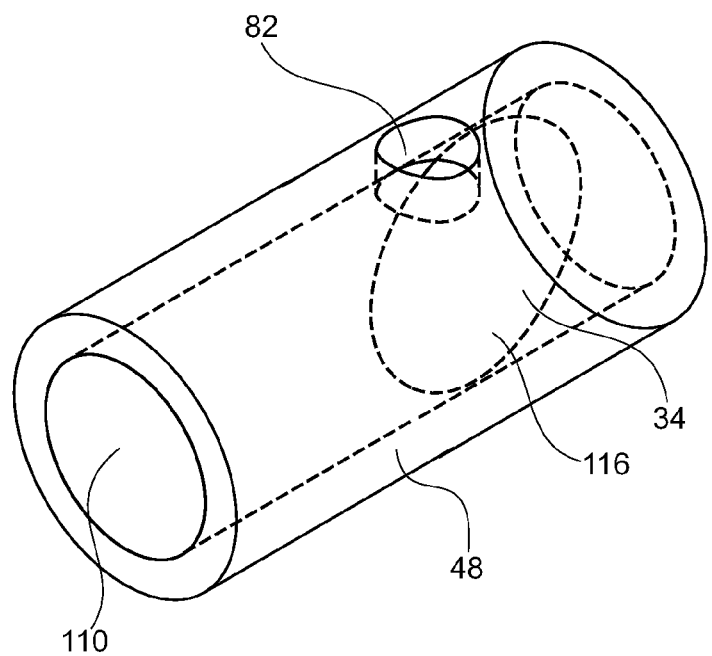
FIGS. 44-47 illustrate different techniques for constructing a rotor having a side port and an optical component, wherein the rotor may be used in any of the embodiments of the imaging probe described herein.
Figure 45:
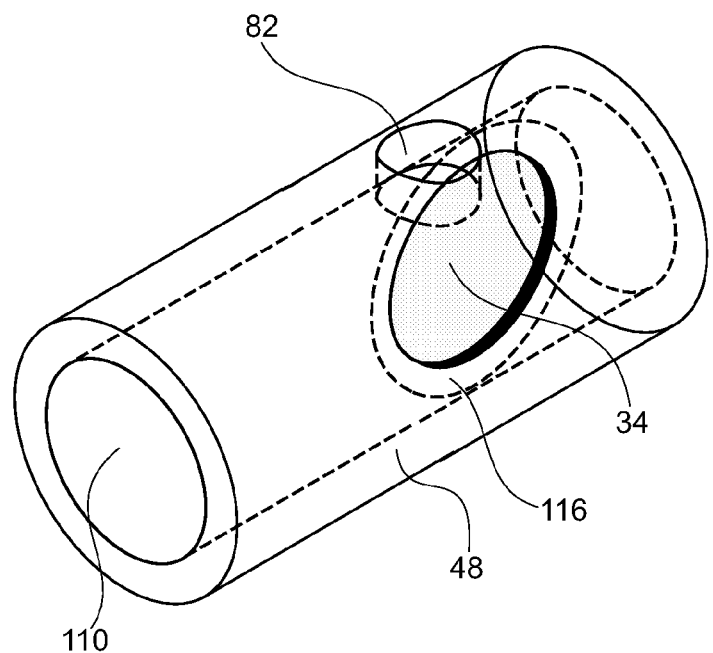

FIGS. 44 and 45 shows magnetically responsive rotor 48 with a slopped surface 116 on the inside of inner hole 110, with a beam director 34 disposed on the slopped surface 116 so that the beam director 34 is aligned with both the optical beam exit port 82 and the opening 110. The slopped surface 116 may be provided by placing a cylindrical insert with a slopped surface into the inner hole 110. In other embodiments, the slopped surface 116 may also be formed by machining, casting, or molding material into the inner hole 110. In such cases, the slopped surface 116 may be formed during the fabrication of the magnetically responsive rotor 48. The material for the beam director 34 may be mechanically coupled to the slopped surface 116 (e.g., by a connector or an adhesive), or may be deposited or coated onto the slopped surface 116.

Figure 46:
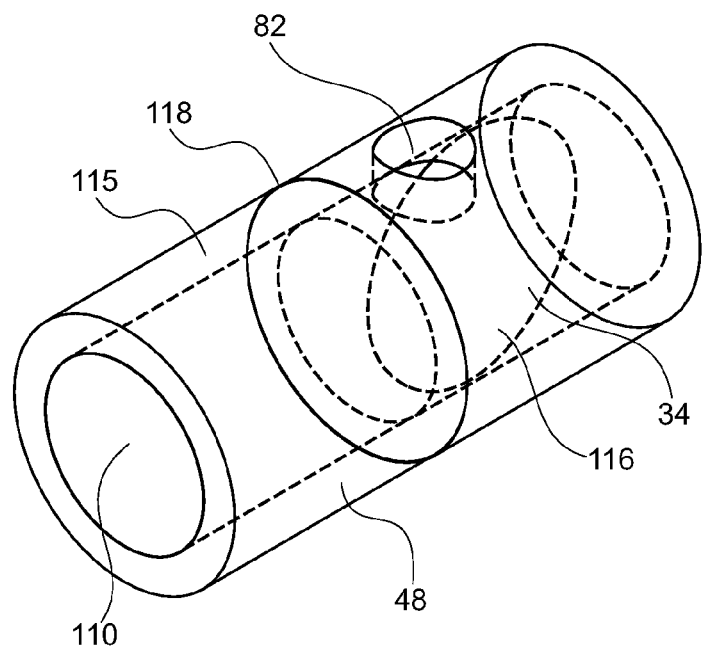
Figure 47:
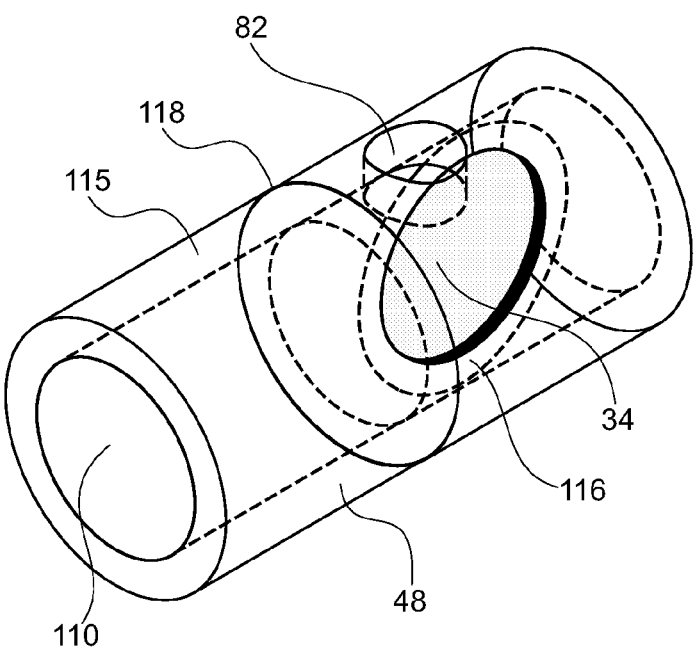

In other embodiments, the rotor 48 may be formed using two cylindrical structures. FIGS. 46 and 47 shows magnetically responsive rotor 48 being formed by a first cylindrical structure 115 and a second cylindrical structure 116 that are mechanically attached to each other. The rotor 48 also has a slopped surface 116 with a beam director 34, as similarly discussed with reference to FIG. 45. The cylindrical structures 115, 116 may be attached to each other using an adhesive to form a mechanical joint 118. In other embodiments, the cylindrical structures 115, 116 may be coupled to each other using one or more connectors. In further embodiments, one of the cylindrical structures 115, 116 may be formed first, and then the other one of the cylindrical structures 115, 116 are molded against the formed structure. In some embodiments, the cylindrical structure 115 may be made from a material (such as a metal) that responds to magnetic field, there forming a first portion of the rotor 48 for interacting with the coil(s) 46. The cylindrical structure 116 may be made from any material (which may or may not be reactive to magnetic field) to thereby form a second portion of the rotor 48 for housing one or more optical components.

Figure 48:
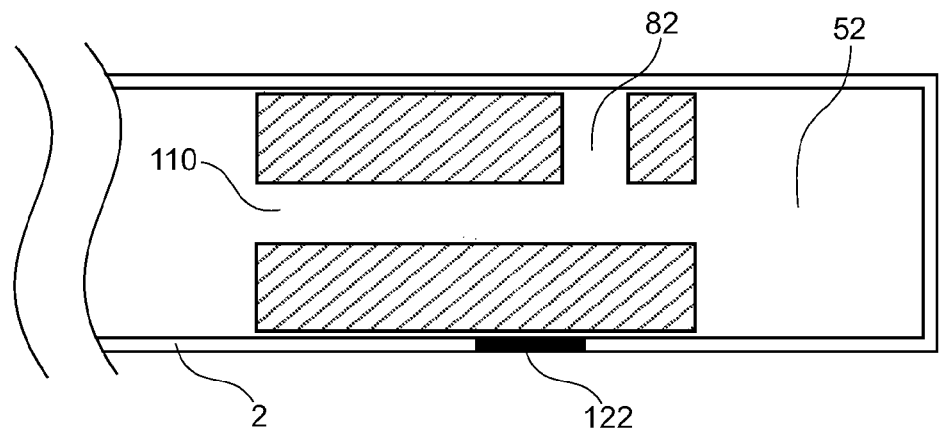
FIGS. 48-49 illustrate different techniques for implementing a sensor in any of the embodiments of the imaging probe described herein.
Figure 49:
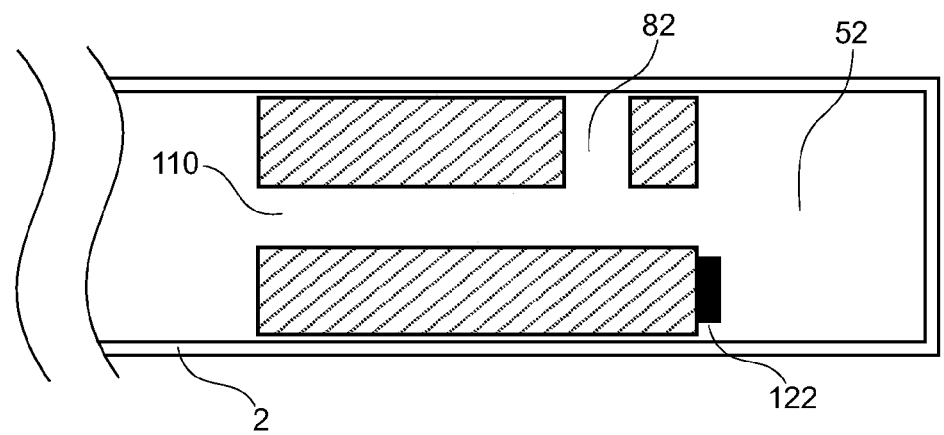

In any of the embodiments of the imaging probe 1 described herein, the imaging probe 1 may include one or more sensors 122 for sensing a position, velocity, acceleration, and/or jerk of the rotor 48. The sensor(s) 122 may be placed in a wall of the elongated tube 2 of the imaging probe 1 in close proximity to the rotor 48 (FIG. 48). In other embodiments, the sensor(s) 122 may be placed in the lumen 52 of the elongated tube 2. In further embodiments, the sensor(s) 122 may be coupled to the rotor 48 (FIG. 49). In any of the embodiments described herein, the sensor 122 may include an optical sensor, a capacitive sensor, a magnetic sensor, or an inductive sensor, placed close to the rotor 48, or attached to the rotor 48.

Figure 50:
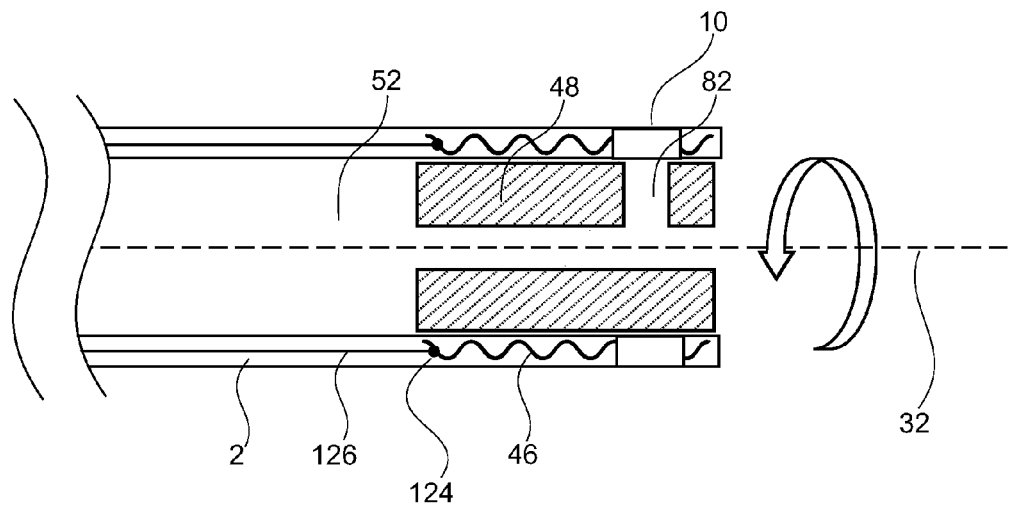
FIGS. 50-51 illustrate different techniques for providing power to a coil in any of the embodiments of the imaging probe described herein.

As discussed, during use of the imaging probe 1, power is delivered to the coil(s) 46 to create magnetic field for turning the rotor 48. Various techniques may be used to deliver power to the coil(s) 46. In some embodiments, the coil(s) 46 may be connected by an electrical joint connection 124 to an electrical conductor 126 embedded inside the wall of the elongated tube 2 of the imaging probe 1 (FIG. 50). The electrical conductor 126 is used to deliver power from a power source (e.g., a current source) to the coil(s) 46. Alternatively, the electrical conductor 126 may be place on inside lumen 52, or on the outside of elongated tube 2. Also, in other embodiments, the electrical joint connection 124 may not be needed. In such cases, the coil 46 and the electrical conductor 126 may be formed by one continuous wire.

Figure 51:
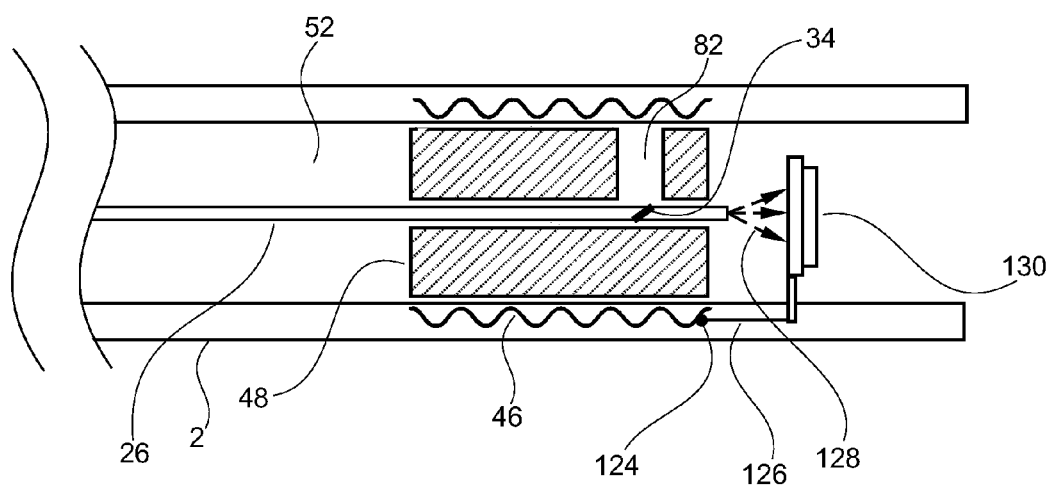

In other embodiments, the imaging probe 1 may further include a light sensitive array 130 distal to the rotor 48 (FIG. 51). The array 130 is configured to receive light exiting from the distal end of the rotor 48, and convert the light to energy. The energy is then delivered to the coil(s) 46 using an electrical conductor. In the illustrated embodiments, the rotor 48 has a prism as the beam director 34, which allows some of the light provided by the optical waveguide 26 to exit from the side port 82, and passes other light downstream towards the array 130. In other embodiments, the beam director 34 may be other optical devices, such as a beam splitter. In any of the embodiments described herein the array 130 may include a photodiode, or photovoltaic cell, or a similar device that is capable of converting optical energy to electrical energy.

Figure 52:
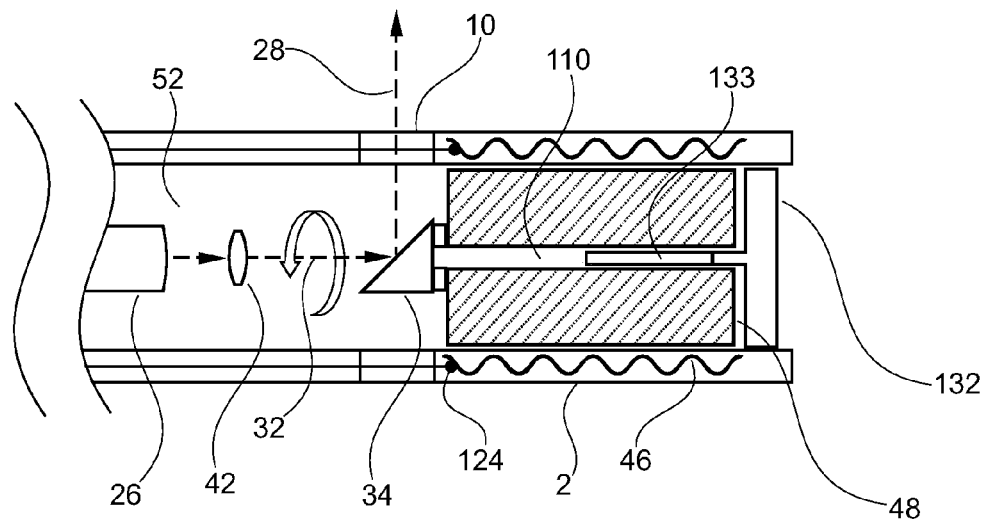
FIGS. 52-61 illustrate partial views of different imaging probes in different embodiments.

It should be noted that the rotor 48 is not limited to having a side port 82, and that in other embodiments, the rotor 48 may have a plurality of side ports 82. Also, in further embodiments, the rotor 48 may not have any side port (FIG. 52). In such cases, the beam director 34 may be coupled to the proximal end of the rotor 48. During use, the optical waveguide 26 provides the light beam 28, which is processed by the lens 42 (e.g., finite conjugate lens), and is directed by the beam director 34 to travel at an angle away from the axis 32 to exit from the region 10 of the imaging probe 1. Because the beam director 34 is mechanically coupled to the rotor 48, turning of the rotor 48 will also cause the beam director 34 to turn, thereby allowing the output beam 28 to exit at different angular positions. As shown in the figure, the imaging probe 1 may further include a shaft assembly 132 with a shaft 133 that is placed inside the opening 110 of the rotor 48. The shaft 133 provides support for the rotor 48, and rotatably supports the rotor 48 so that the rotor 48 can turn relative to the elongated tube 2 of the imaging probe 1.

Figure 53:
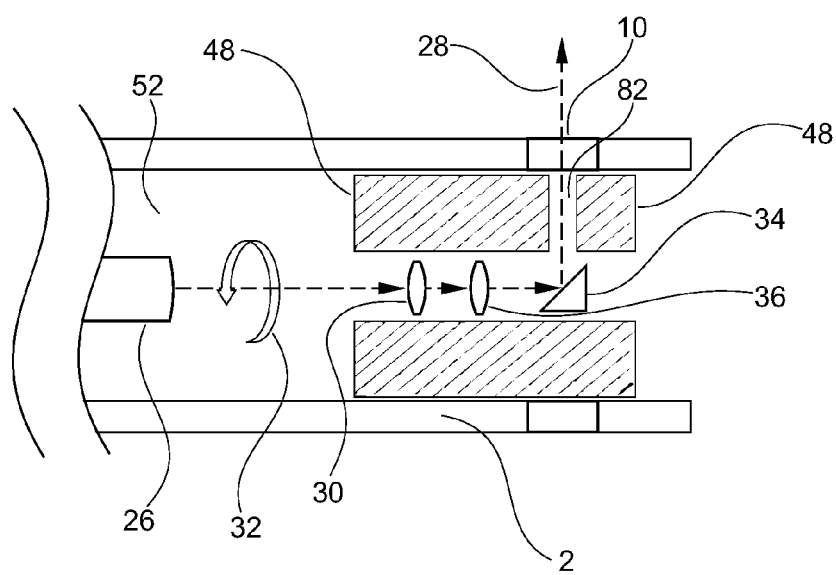

As discussed with reference to FIGS. 3-7, the imaging probe 1 may have different optical components in different embodiments. FIGS. 53-61 illustrate different embodiments of the imaging probe 1 that includes a rotor 48 with a side port 82, wherein imaging probe 1 also includes different optical components as similarly discussed with reference to FIGS. 3 and 5-7. FIG. 53 illustrates an imaging probe 1 having the optical system 11 of FIG. 7 in accordance with some embodiments. The beam director 34 and the lenses 30, 36 are mechanically coupled to the rotor 48 so that the turning of the rotor 48 will cause the beam director 34 and the lenses 30, 36 to turn as well. During use, the optical waveguide 26 provides a light beam 28 that is optically processed by the optical components 30, 36, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to module 3, and the light signals are then converted to electrical signals, and are signal processed by module 7, and the processed signals may be displayed in the user interface 13. A user may look at the information at the user interface 13 for medical diagnostic purpose and/or treatment purpose.

Figure 54:
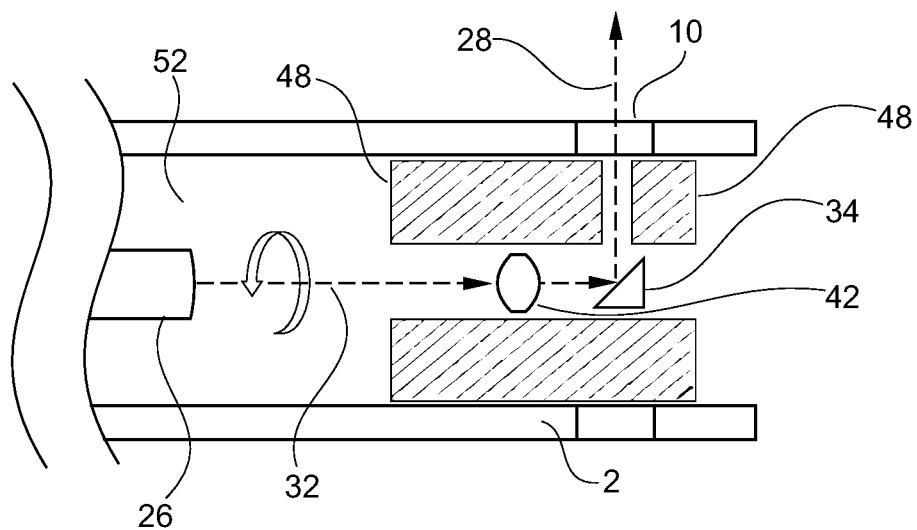

FIG. 54 illustrates an imaging probe 1 having an optical system 11 that is similar to that described with reference to FIG. 6 in accordance with some embodiments. The beam director 34 and the lens 42 are mechanically coupled to the rotor 48 so that the turning of the rotor 48 will cause the beam director 34 and the lens 42 to turn as well. The beam director 34 may be a mirror, or a prism as that described in FIG. 6. During use, the optical waveguide 26 provides a light beam 28 that is optically processed by the optical component 42, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 55:
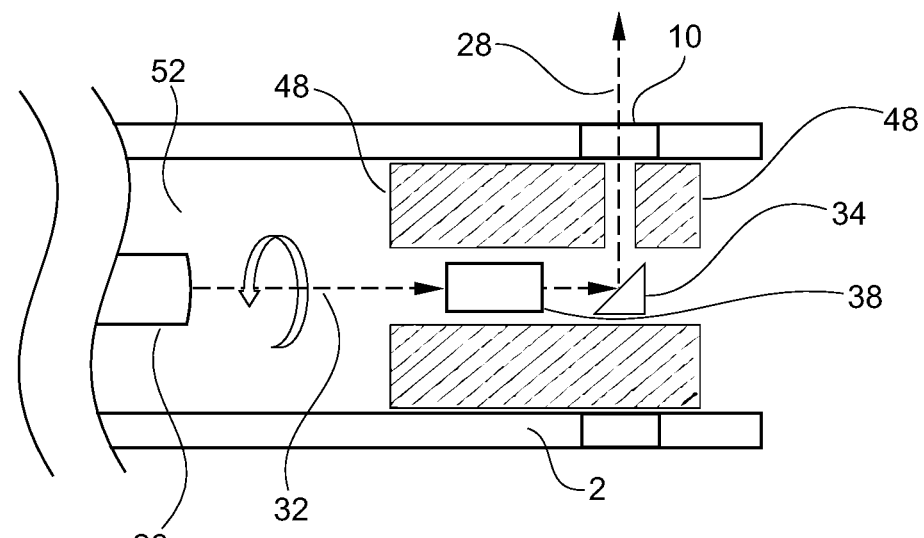

FIG. 55 illustrates an imaging probe 1 having the optical system 11 of FIG. 5 in accordance with some embodiments. The beam director 34 and lens 38 are mechanically coupled to the rotor 48 so that the turning of the rotor 48 will cause the beam director 34 and the lens 38 to turn as well. During use, the optical waveguide 26 provides a light beam 28 that is optically processed by the optical component 38, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 56:
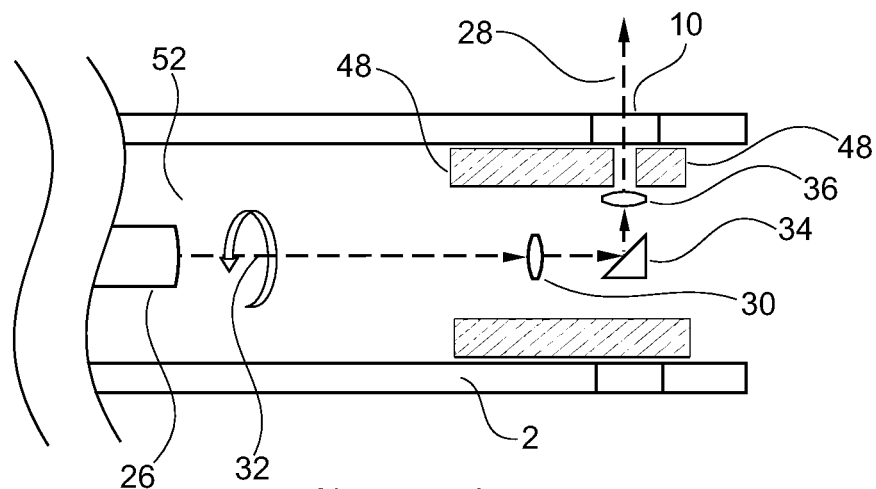

FIG. 56 illustrates an imaging probe 1 having the optical system 11 of FIG. 3 in accordance with some embodiments. The beam director 34 and lenses 30, 36 are mechanically coupled to the rotor 48 so that the turning of the rotor 48 will cause the beam director 34 and the lenses 30, 36 to turn as well. During use, the optical waveguide 26 provides a light beam 28 that is optically processed by the optical component 30, as similarly discussed. The light beam 28 is then directed by the beam director 34 towards the focusing lens 36 that focuses the light beam. The light beam then exits from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 57:
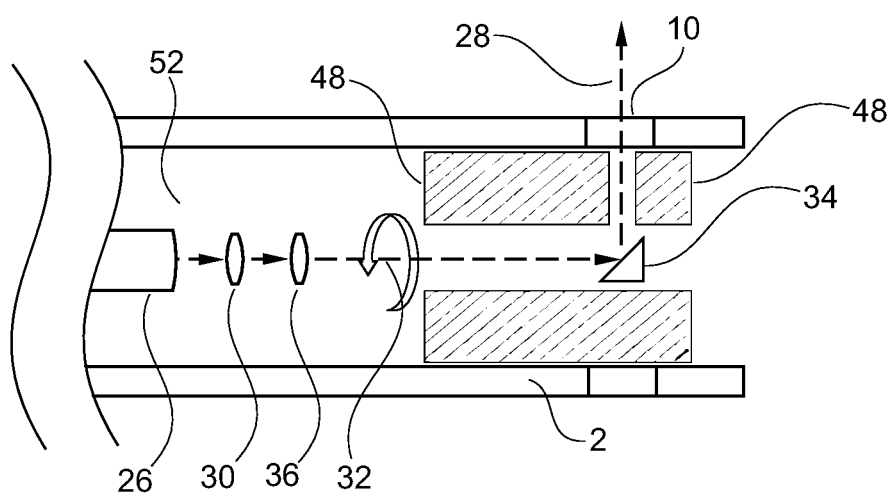

In any of the embodiments described herein, one or more of the optical components may be placed outside the rotor 48. FIG. 57 illustrates another imaging probe 1 in accordance with other embodiments. The imaging probe 1 is the same as that shown in FIG. 53, except that some of the optical components (e.g., the lens 30 and lens 36) are not carried by the rotor 48. Instead, the optical components are located outside the rotor 48. In some embodiments, the optical components that are not carried by the rotor 48 may be mechanically secured relative to the imaging probe 1, e.g., either directly or indirectly to internal portion(s) of the imaging probe 1. Also, in some embodiments, a light transmitter, such as a fiber optic, may be placed between any two optical components. For example, in other embodiments, the imaging probe 1 may include a fiber optic between the lens 30 and the lens 36, and/or between the lens 36 and the beam director 34. The operation of the imaging probe 1 is similar to that described previously.

Figure 58:
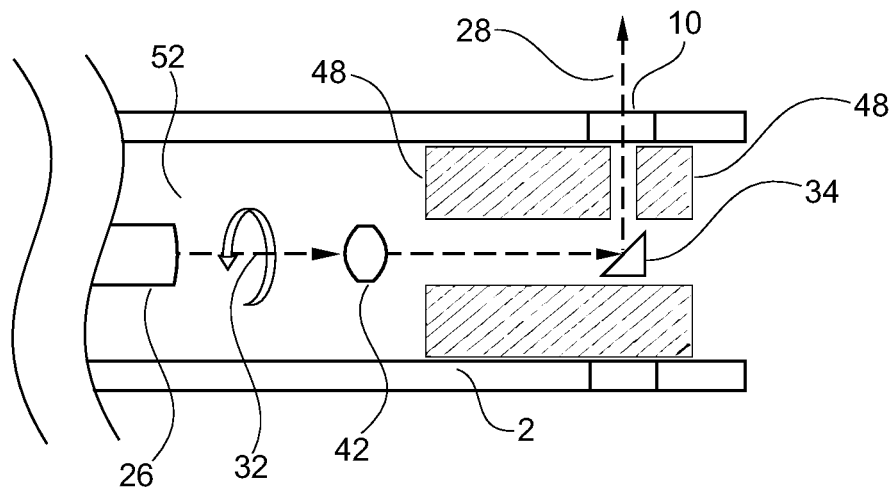

FIG. 58 illustrates another imaging probe 1 in accordance with other embodiments. The imaging probe 1 is the same as that shown in FIG. 54, except that the optical component (lens 42) is not carried by the rotor 48. Instead, the optical component 42 is located outside the rotor 48. In some embodiments, the optical component that is not carried by the rotor 48 may be mechanically secured relative to the imaging probe 1, e.g., either directly or indirectly to internal portion(s) of the imaging probe 1. Also, in some embodiments, a light transmitter, such as a fiber optic, may be placed between any two optical components. For example, in other embodiments, the imaging probe 1 may include a fiber optic between the lens 42 and the waveguide 26, and/or between the lens 32 and the beam director 34. The operation of the imaging probe 1 is similar to that described previously.

Figure 59:
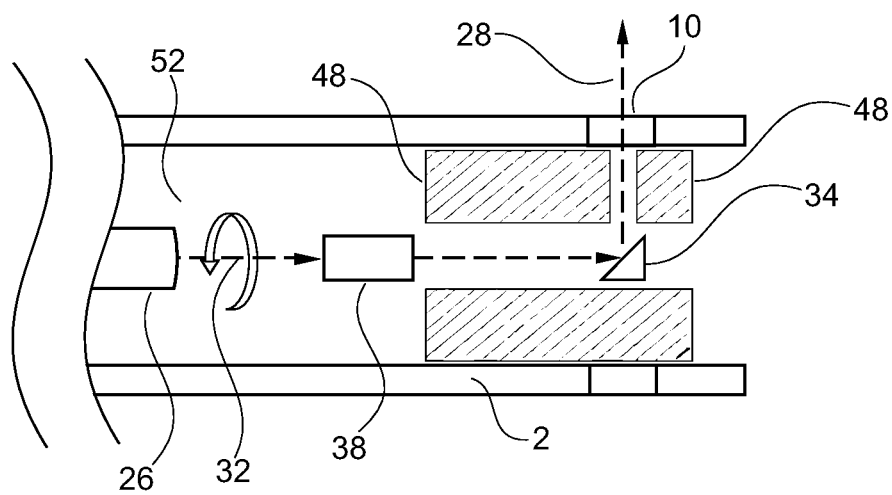

FIG. 59 illustrates another imaging probe 1 in accordance with other embodiments. The imaging probe 1 is the same as that shown in FIG. 55, except that the optical component (lens 38) is not carried by the rotor 48. Instead, the optical component 38 is located outside the rotor 48. In some embodiments, the optical component that is not carried by the rotor 48 may be mechanically secured relative to the imaging probe 1, e.g., either directly or indirectly to internal portion(s) of the imaging probe 1. Also, in some embodiments, a light transmitter, such as a fiber optic, may be placed between any two optical components. For example, in other embodiments, the imaging probe 1 may include a fiber optic between the lens 38 and the waveguide 26, and/or between the lens 38 and the beam director 34. The operation of the imaging probe 1 is similar to that described previously.

Figure 60:
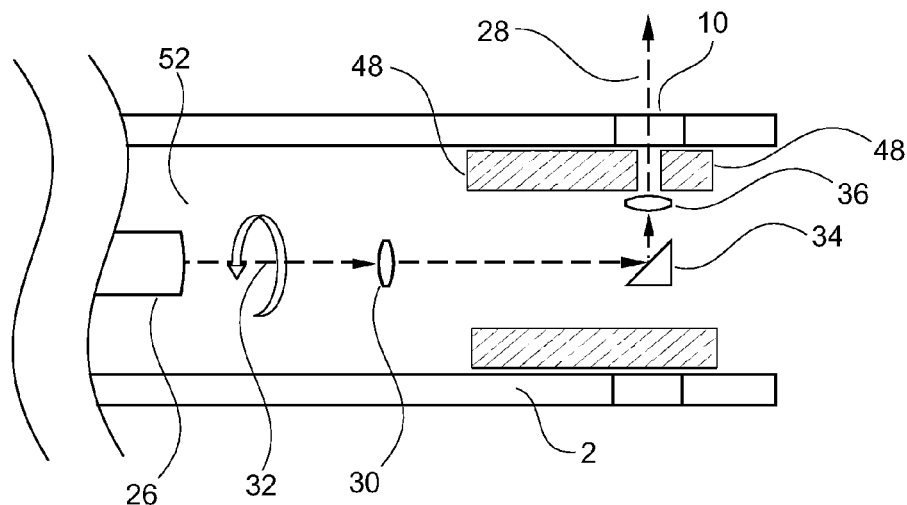

FIG. 60 illustrates another imaging probe 1 in accordance with other embodiments. The imaging probe 1 is the same as that shown in FIG. 56, except that the optical component (lens 30) is not carried by the rotor 48. Instead, the optical component 20 is located outside the rotor 48. In some embodiments, the optical component that is not carried by the rotor 48 may be mechanically secured relative to the imaging probe 1, e.g., either directly or indirectly to internal portion(s) of the imaging probe 1. Also, in some embodiments, a light transmitter, such as a fiber optic, may be placed between any two optical components. For example, in other embodiments, the imaging probe 1 may include a fiber optic between the lens 30 and the waveguide 26, and/or between the lens 30 and the beam director 34. The operation of the imaging probe 1 is similar to that described previously.

Figure 61:
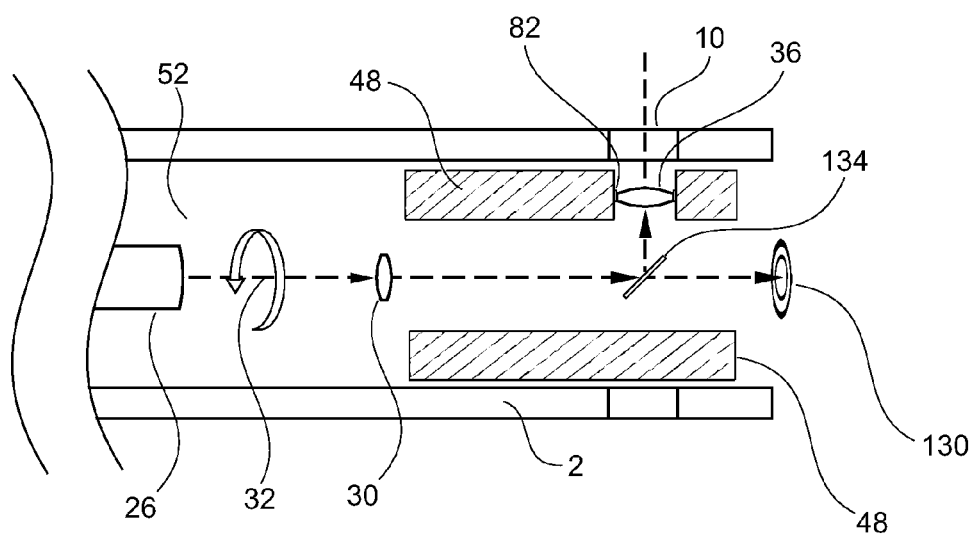

Also, in any of the embodiments described herein, the beam director 34 may be implemented using a beam splitter. FIG. 61 shows another imaging probe 1 in accordance with other embodiments. The imaging probe 1 is the same as that shown in FIG. 60, except that the beam director 34 shown to be a beam splitter 134. Such configuration allows the input light received from the waveguide 26 to be splitted into two light beams. One of the light beams is passed towards the side port 82 for exiting through the region 10 of the imaging probe 1. The other one of the light beams is passed downstream to a light sensitive array 130. The array 130 is configured to receive light, convert the light to energy, and transmit the energy to energize the coil(s) 46 (not shown for clarity). In the illustrated embodiments, both the beam splitter 134, and the focusing lens 36 are mechanically attached to the magnetically responsive rotor 48, which rotates around axis 32.

Figure 62:
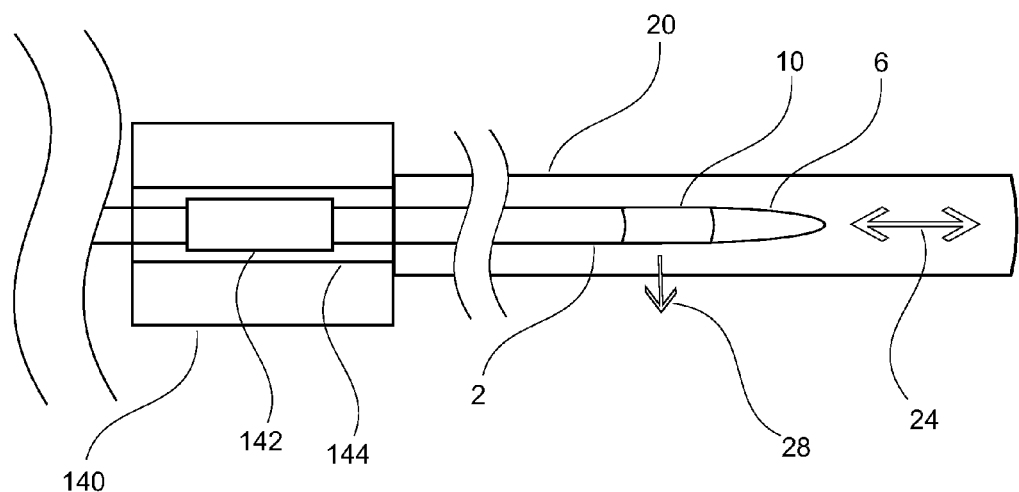
FIG. 62 illustrates an imaging probe and a sheath that are slidable relative to each other in accordance with some embodiments, wherein the imaging probe may be any of the embodiments of the imaging probe described herein.

As discussed with reference to FIG. 2, in any of the embodiments of the imaging probe 1 described herein, the imaging probe 1 may further include the sheath 20 disposed outside the elongated tube 2. FIG. 62 illustrates another embodiment of the imaging probe 1, particularly showing the imaging probe 1 having the sheath 20 that surrounds circumferentially around the elongated tube 2 of the imaging probe 1. The sheath 20 is the same as that described with reference to FIG. 2. In the illustrated embodiments, the imaging probe 1 further includes a positioner 140 having a first component 142 that attaches to the proximal end of the elongated tube 2, and a second component 144 that attaches to the proximal end of the sheath 20. The positioner 140 is configured to mechanically move the sheath 20 relative to the elongated tube 2, or vice versa. In some embodiments, the components 142, 144 may be implemented using respective gears. In other embodiments, the components 142, 144 may be other mechanical components that create relative movement between the sheath 20 and the elongated tube 2. In some embodiments, the control 9 may be operated to move the sheath 20 relative to the elongated tube 2, or vice versa. In other embodiments, the relative movement between the sheath 20 and the tube 2 may be created manually by manually operating the proximal ends of the sheath 20 and the tube 2.

In some embodiments, the positioner 140 may include electro-mechanical components, such as a lead screw actuator, a linear motor, piezo, or linear voice coil actuator. In other embodiments, fluid actuators that use gas or fluids maybe used to provide fore and aft motion of the probe 1. In some embodiments, the positioner 140 may be considered to be a part of the probe 1 itself. In other embodiments, the positioner 140 may be considered to be a separate component from the probe 1. In any of the embodiments, it may be desirable to have position sensors to report the current position of the probe 1. Probe position may be ascertained using optical, magnetic, capacitive, inductive, or mechanical sensors or encoders.

Figure 63:
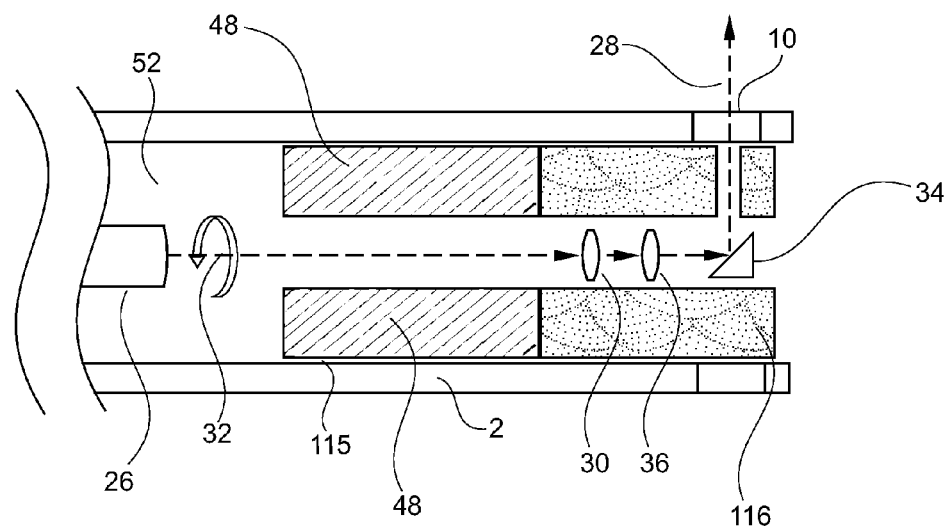
FIGS. 63-71 illustrate different imaging probes in different embodiments, wherein each rotor has a first portion for interacting with a magnetic coil, and a second portion for housing one or more optical components.

As similarly discussed with reference to FIGS. 46 and 47, the rotor 48 may have a first portion for interacting with the magnetic field of the coil(s) 46, and a second portion for housing one or more optical components. FIGS. 63-71 illustrate different embodiments of the imaging probe 1 that includes a rotor 48 with two portions 115, 116, wherein imaging probe 1 also includes different optical components as similarly discussed with reference to FIGS. 53-61. FIG. 63 illustrates an imaging probe 1 that is the same as that shown in FIG. 53, except that the rotor 48 includes a first portion 115 for interacting with magnetic field from the coil(s) 46, and a second portion 116 for housing the optical components 30, 36, 34. The beam director 34 is mechanically coupled to the rotor 48 so that the turning of the rotor 48 will cause the beam director 34 and the lenses 30, 36 to turn as well. During use, the optical waveguide 26 provides a light beam 28 that is optically processed by the optical components 30, 36, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 64:
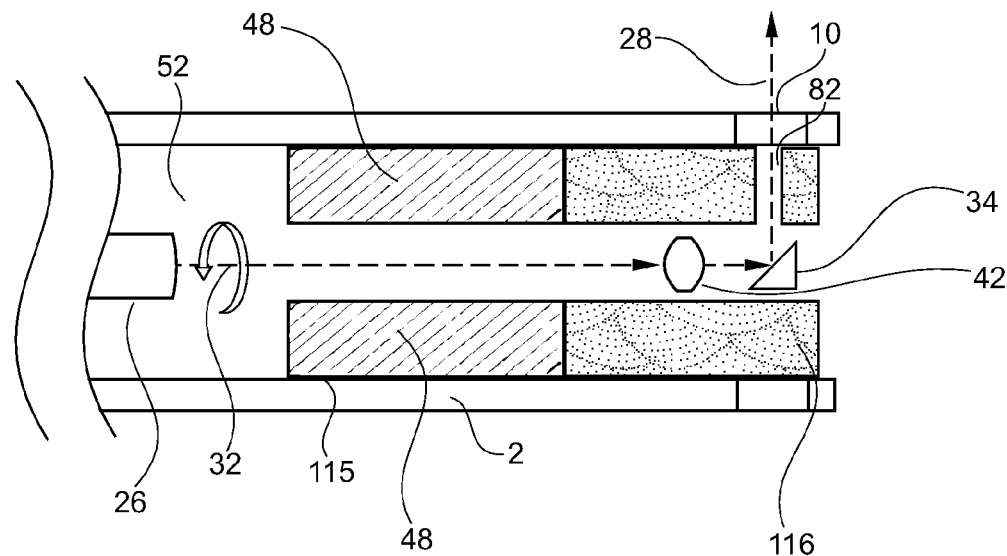

FIG. 64 illustrates an imaging probe 1 that is the same as that shown in FIG. 54, except that the rotor 48 includes a first portion 115 for interacting with magnetic field from the coil(s) 46, and a second portion 116 for housing the optical components 42, 34. The beam director 34 is mechanically coupled to the rotor 48 so that the turning of the rotor 48 will cause the beam director 34 and the lens 42 to turn as well. During use, the optical waveguide 26 provides a light beam 28 that is optically processed by the optical component 42, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 65:
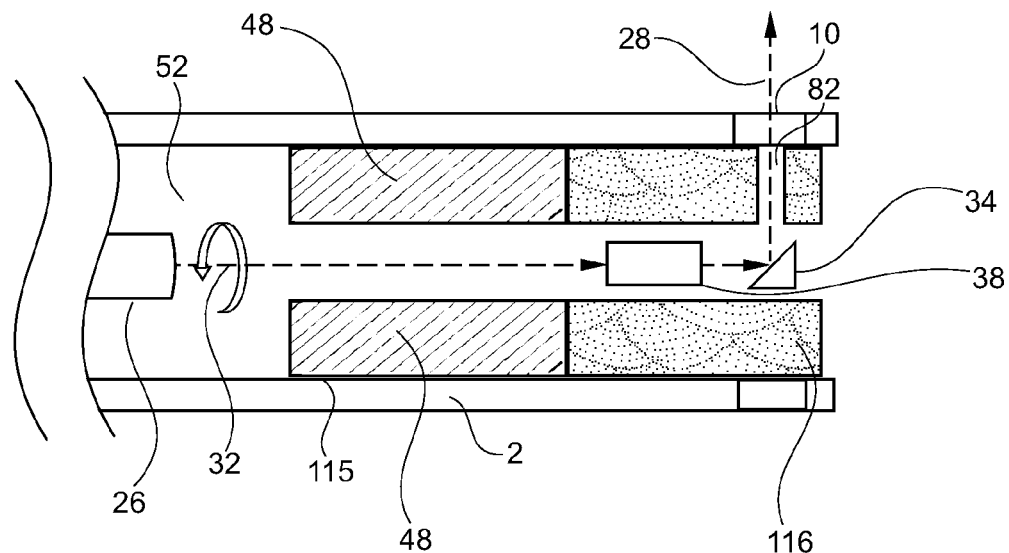

FIG. 65 illustrates an imaging probe 1 that is the same as that shown in FIG. 55, except that the rotor 48 includes a first portion 115 for interacting with magnetic field from the coil(s) 46, and a second portion 116 for housing the optical components 38, 34. The beam director 34 is mechanically coupled to the rotor 48 so that the turning of the rotor 48 will cause the beam director 34 and the lens 38 to turn as well. During use, the optical waveguide 26 provides a light beam 28 that is optically processed by the optical component 38, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 66:
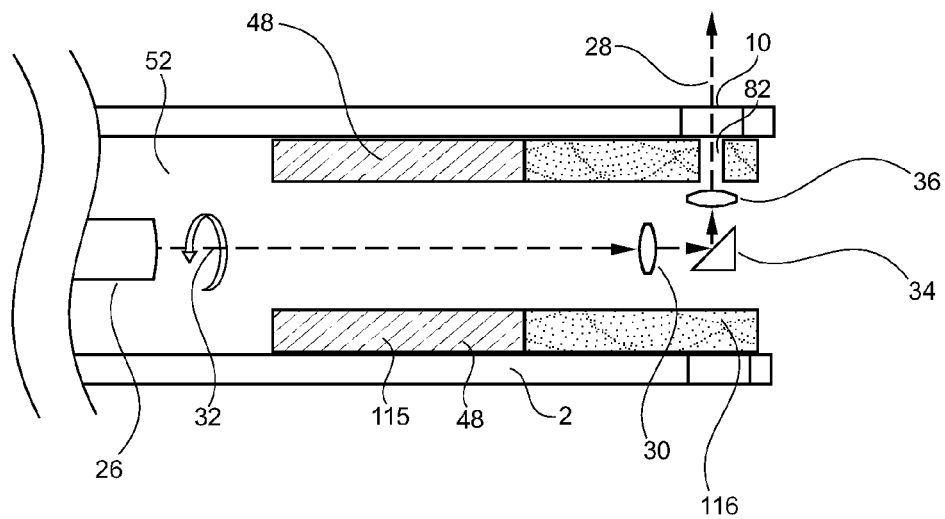

FIG. 66 illustrates an imaging probe 1 that is the same as that shown in FIG. 56, except that the rotor 48 includes a first portion 115 for interacting with magnetic field from the coil(s) 46, and a second portion 116 for housing the optical components 20, 36, 34. The beam director 34 is mechanically coupled to the rotor 48 so that the turning of the rotor 48 will cause the beam director 34 and the lenses 20, 36 to turn as well. During use, the optical waveguide 26 provides a light beam 28 that is optically processed by the optical components 20, as similarly discussed. The light beam 28 is then directed by the beam director 34 towards the focusing lens 36, and exits from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 67:
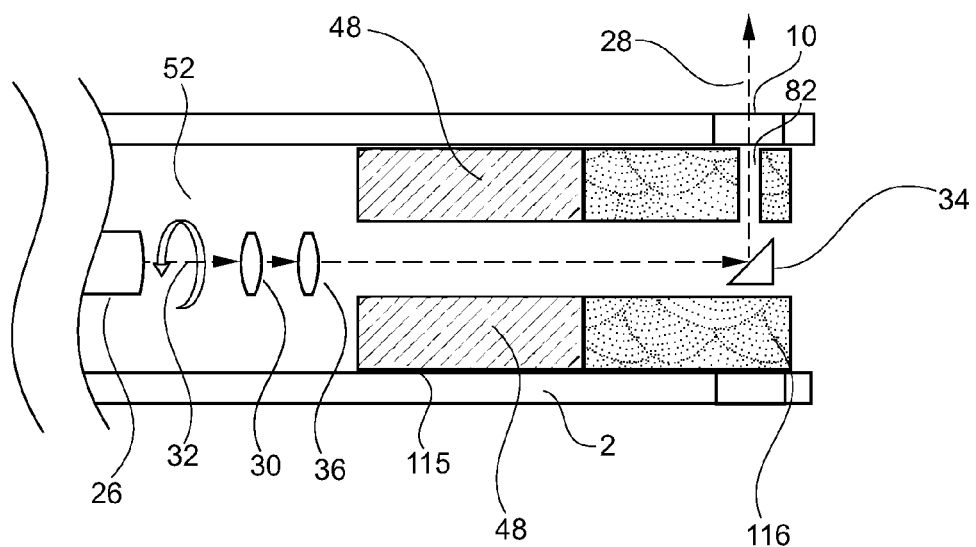

FIG. 67 illustrates an imaging probe 1 that is the same as that shown in FIG. 57, except that the rotor 48 includes a first portion 115 for interacting with magnetic field from the coil(s) 46, and a second portion 116 for housing the optical component 34. The beam director 34 is mechanically coupled to the rotor 48 so that the turning of the rotor 48 will cause the beam director 34 to turn as well. During use, the optical waveguide 26 provides a light beam 28 that is optically processed by the optical components 30, 36, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 68:
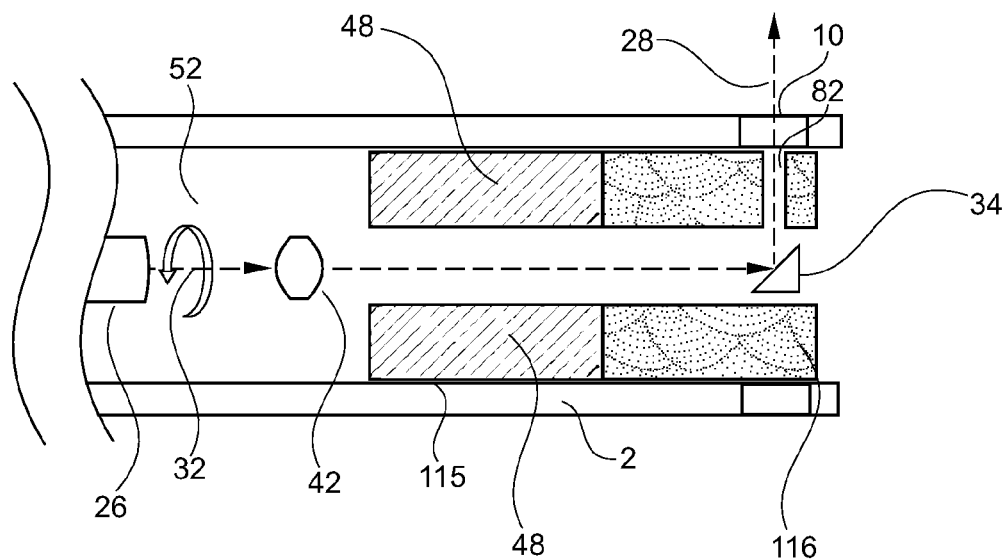

FIG. 68 illustrates an imaging probe 1 that is the same as that shown in FIG. 58, except that the rotor 48 includes a first portion 115 for interacting with magnetic field from the coil(s) 46, and a second portion 116 for housing the optical component 34. The beam director 34 is mechanically coupled to the rotor 48 so that the turning of the rotor 48 will cause the beam director 34 to turn as well. During use, the optical waveguide 26 provides a light beam 28 that is optically processed by the optical component 42 as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 69:
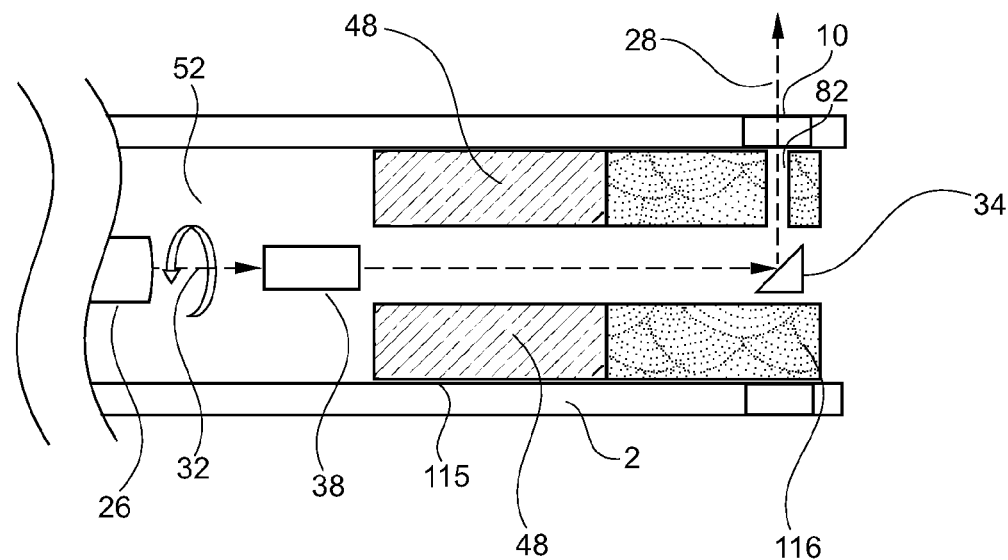

FIG. 69 illustrates an imaging probe 1 that is the same as that shown in FIG. 59, except that the rotor 48 includes a first portion 115 for interacting with magnetic field from the coil(s) 46, and a second portion 116 for housing the optical component 34. The beam director 34 is mechanically coupled to the rotor 48 so that the turning of the rotor 48 will cause the beam director 34 to turn as well. During use, the optical waveguide 26 provides a light beam 28 that is optically processed by the optical component 38 as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 70:
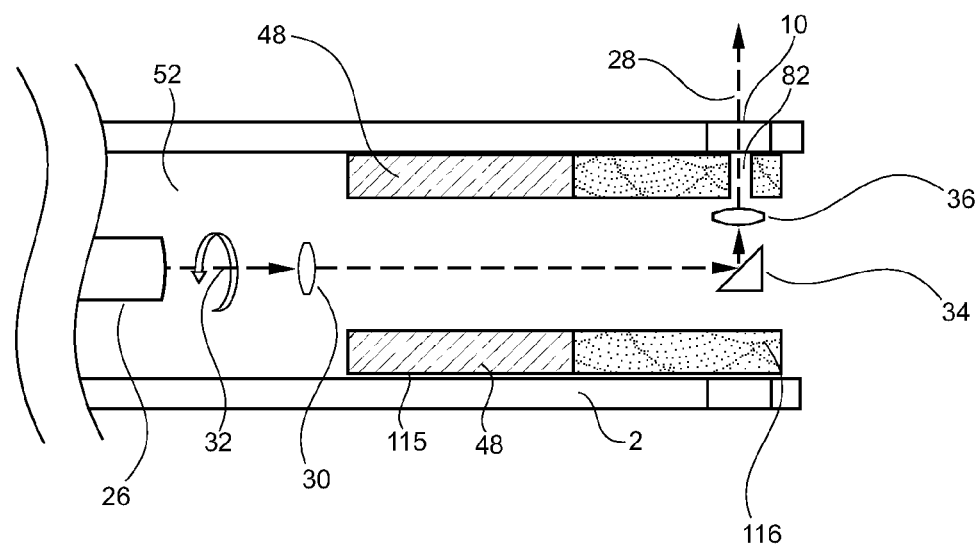

FIG. 70 illustrates an imaging probe 1 that is the same as that shown in FIG. 60, except that the rotor 48 includes a first portion 115 for interacting with magnetic field from the coil(s) 46, and a second portion 116 for housing the optical components 36, 34. The beam director 34 is mechanically coupled to the rotor 48 so that the turning of the rotor 48 will cause the beam director 34 and the lens 36 to turn as well. During use, the optical waveguide 26 provides a light beam 28 that is optically processed by the optical component 20, as similarly discussed. The light beam 28 is then directed by the beam director 34 to exit from the side port 82 of the rotor 48 and out of the region 10 of the imaging probe 1. The output light impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 71:
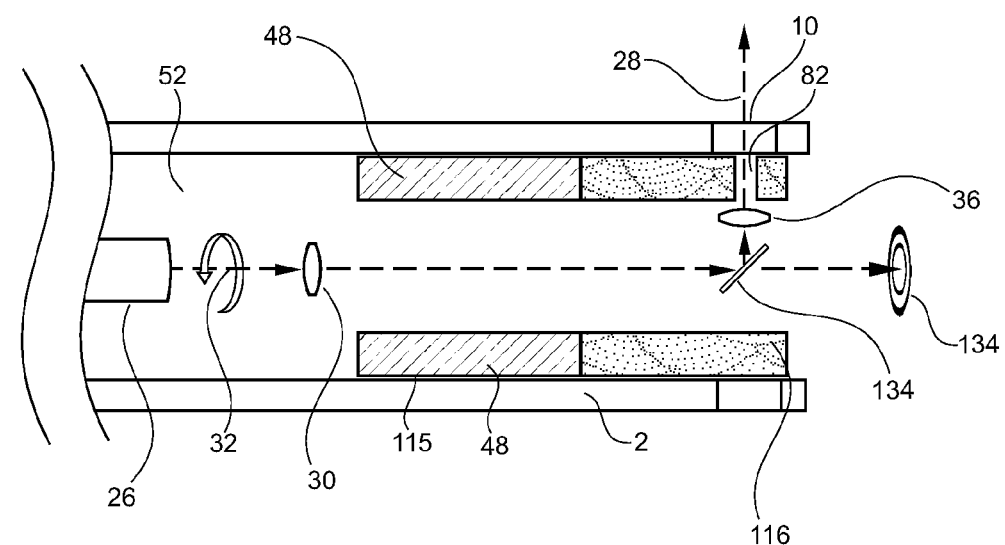

FIG. 71 illustrates an imaging probe 1 that is the same as that shown in FIG. 61, except that the rotor 48 includes a first portion 115 for interacting with magnetic field from the coil(s) 46, and a second portion 116 for housing the optical components 134, 36. The beam splitter 134 is mechanically coupled to the rotor 48 so that the turning of the rotor 48 will cause the beam splitter 134 and the lens 36 to turn as well. During use, the optical waveguide 26 provides a light beam 28 that is optically processed by the optical components 20, as similarly discussed. The light beam 28 is then separated into a first beam and a second beam by the beam splitter 134. The first beam is directed towards the focusing lens 36, and then exits from the side port 82 of the rotor 48 and out of the region 10 of the imaging probe 1. The second beam is transmitted to the array 130, which converts the light into energy, and then provides the energy for energizing the coil(s) 46 (not shown for clarify). The output light from the region 10 impinges against a tissue inside a body, and is reflected back towards the imaging probe 1. The reflected light enters through the region 10 and into the side port 82 of the rotor 48. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 72:
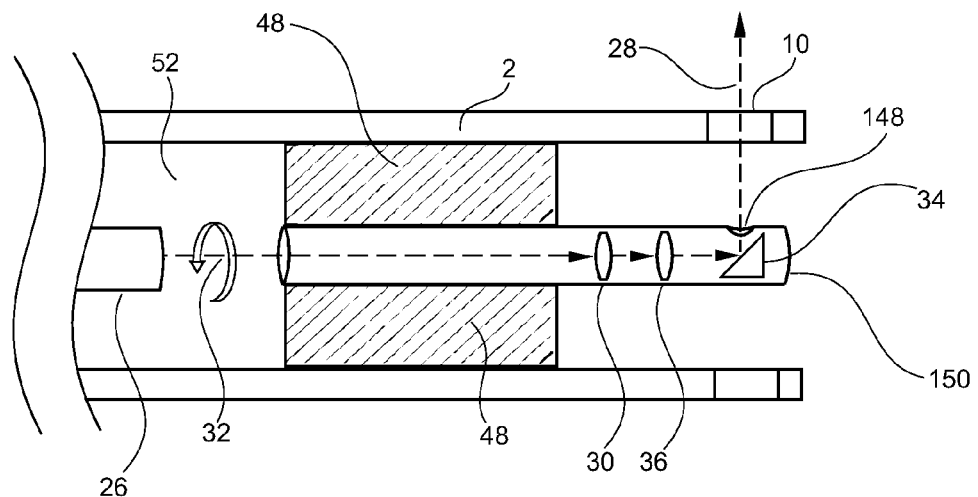
FIGS. 72-80 illustrate different imaging probes in different embodiments, particularly showing each probe having a tube that extends through a rotor for housing one or more optical components.

FIG. 72 illustrates an imaging probe 1 in other embodiments. The imaging probe 1 is the same as that described in FIG. 53, except that the optical components 30, 36, 34 are carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 and lenses 30, 36 within it) to turn as well. During use, the optical waveguide 26 provides a light beam 28 that is optically processed by the optical components 30, 36, as similarly discussed. The light beam 28 is then directed by the beam director 34 in the tube 150 to exit from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 73:
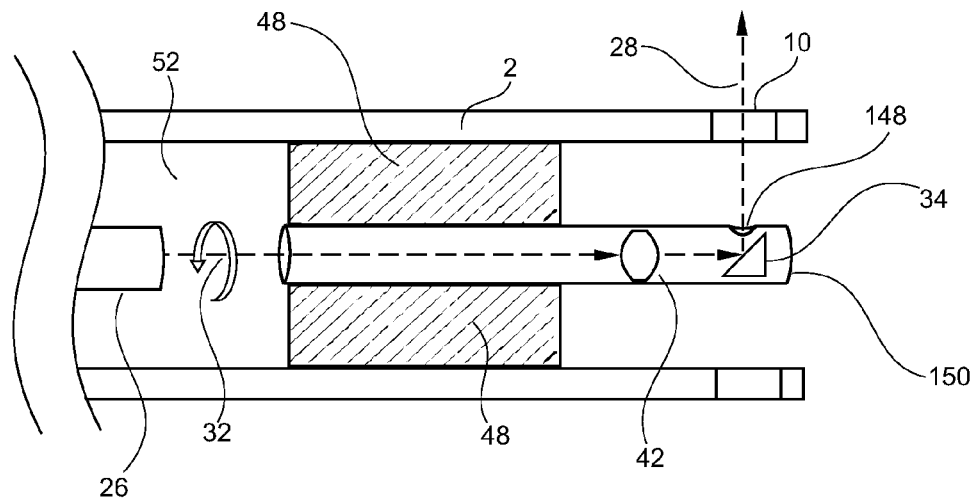

FIG. 73 illustrates an imaging probe 1 in other embodiments. The imaging probe 1 is the same as that described in FIG. 54, except that the optical components 42, 34 are carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 and lens 42 within it) to turn as well. During use, the optical waveguide 26 provides a light beam 28 that is optically processed by the optical component 42, as similarly discussed. The light beam 28 is then directed by the beam director 34 in the tube 150 to exit from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 74:
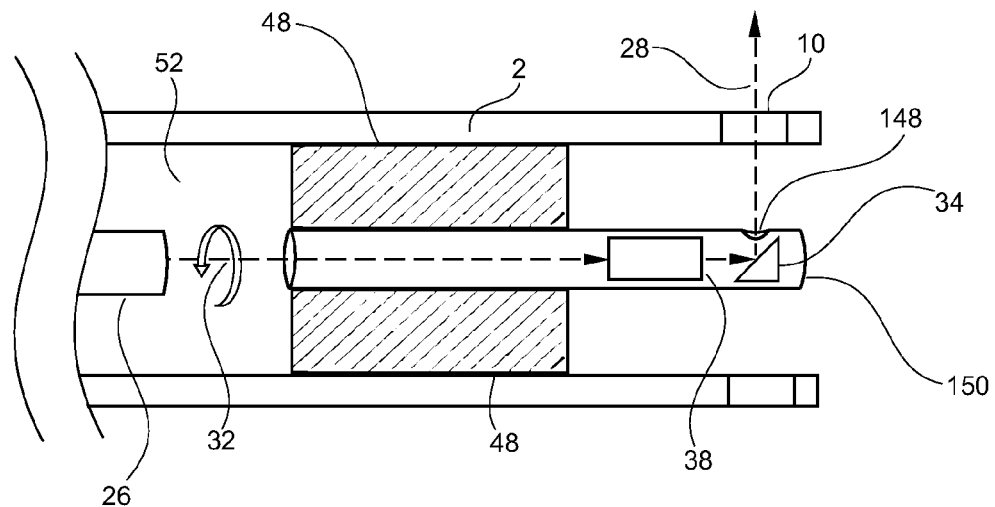

FIG. 74 illustrates an imaging probe 1 in other embodiments. The imaging probe 1 is the same as that described in FIG. 75, except that the optical components 38, 34 are carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 and lens 38 within it) to turn as well. During use, the optical waveguide 26 provides a light beam 28 that is optically processed by the optical component 38 as similarly discussed. The light beam 28 is then directed by the beam director 34 in the tube 150 to exit from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 75:
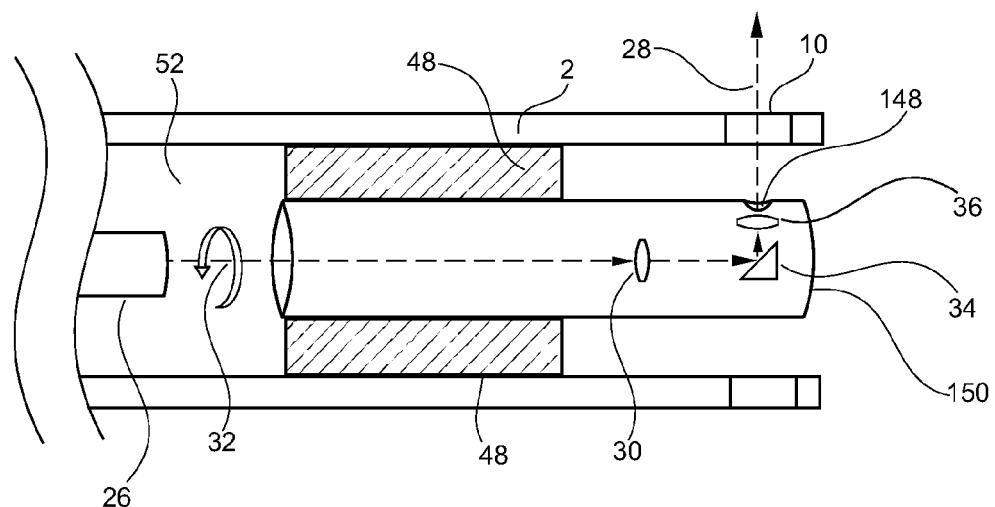

FIG. 75 illustrates an imaging probe 1 in other embodiments. The imaging probe 1 is the same as that described in FIG. 56, except that the optical components 30, 36, 34 are carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 and lenses 30, 36 within it) to turn as well. During use, the optical waveguide 26 provides a light beam 28 that is optically processed by the optical component 30, as similarly discussed. The light beam 28 is then directed by the beam director 34 towards the focusing lens 36 that focuses the light beam 28. The light beam 28 then exits from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 76:
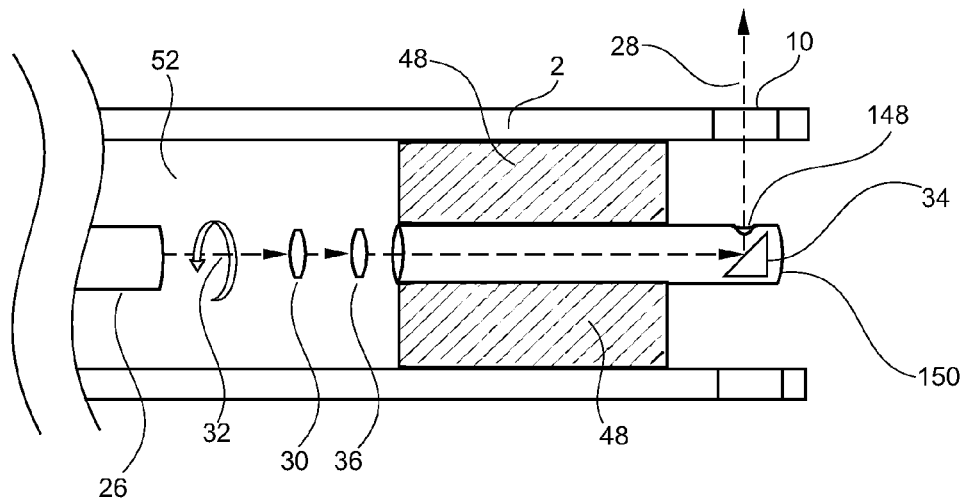

FIG. 76 illustrates an imaging probe 1 in other embodiments. The imaging probe 1 is the same as that described in FIG. 57, except that the optical component 34 is carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 within it) to turn as well. During use, the optical waveguide 26 provides a light beam 28 that is optically processed by the optical components 30, 36, as similarly discussed. The light beam 28 is then directed by the beam director 34 in the tube 150 to exit from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 77:
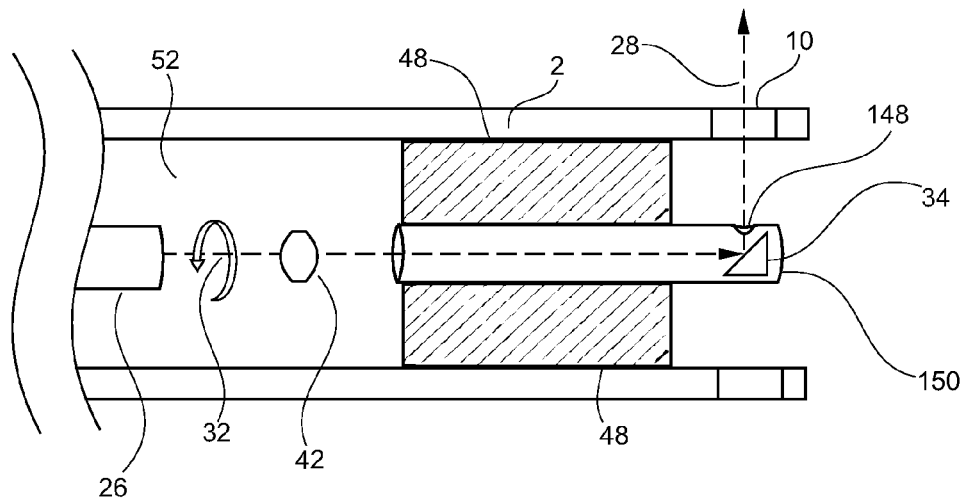

FIG. 77 illustrates an imaging probe 1 in other embodiments. The imaging probe 1 is the same as that described in FIG. 58, except that the optical component 34 is carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 within it) to turn as well. During use, the optical waveguide 26 provides a light beam 28 that is optically processed by the optical component 42, as similarly discussed. The light beam 28 is then directed by the beam director 34 in the tube 150 to exit from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 78:
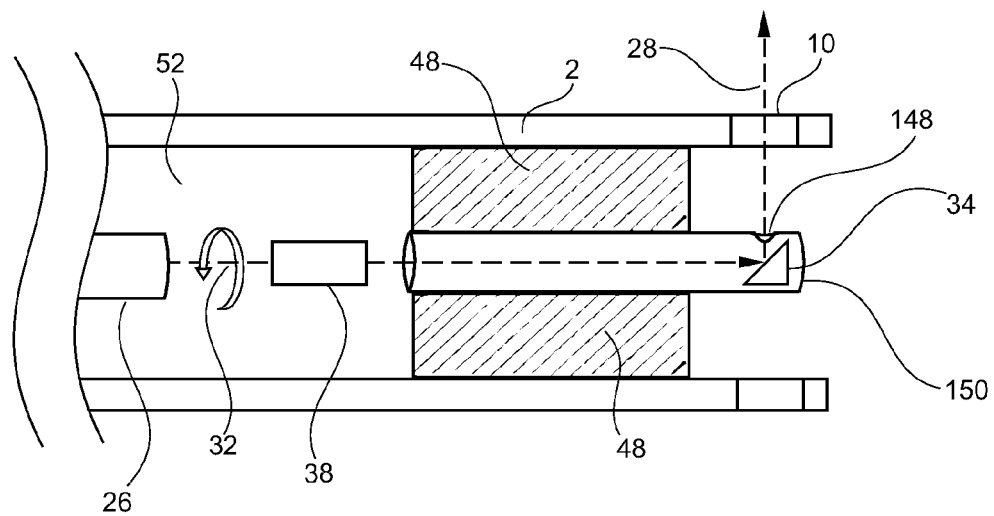

FIG. 78 illustrates an imaging probe 1 in other embodiments. The imaging probe 1 is the same as that described in FIG. 59, except that the optical component 34 is carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 within it) to turn as well. During use, the optical waveguide 26 provides a light beam 28 that is optically processed by the optical component 38, as similarly discussed. The light beam 28 is then directed by the beam director 34 in the tube 150 to exit from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 79:
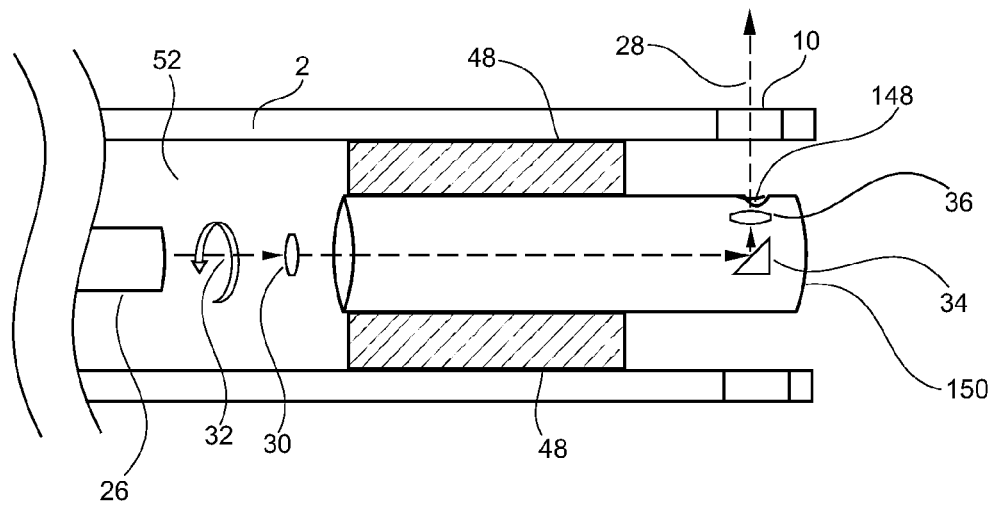

FIG. 79 illustrates an imaging probe 1 in other embodiments. The imaging probe 1 is the same as that described in FIG. 60, except that the optical components 36, 34 are carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam director 34 and lens 36 within it) to turn as well. During use, the optical waveguide 26 provides a light beam 28 that is optically processed by the optical component 30, as similarly discussed. The light beam 28 is then directed by the beam director 34 towards the focusing lens 36, which focuses the light beam 28. The light beam 28 then exits from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose.

Figure 80:
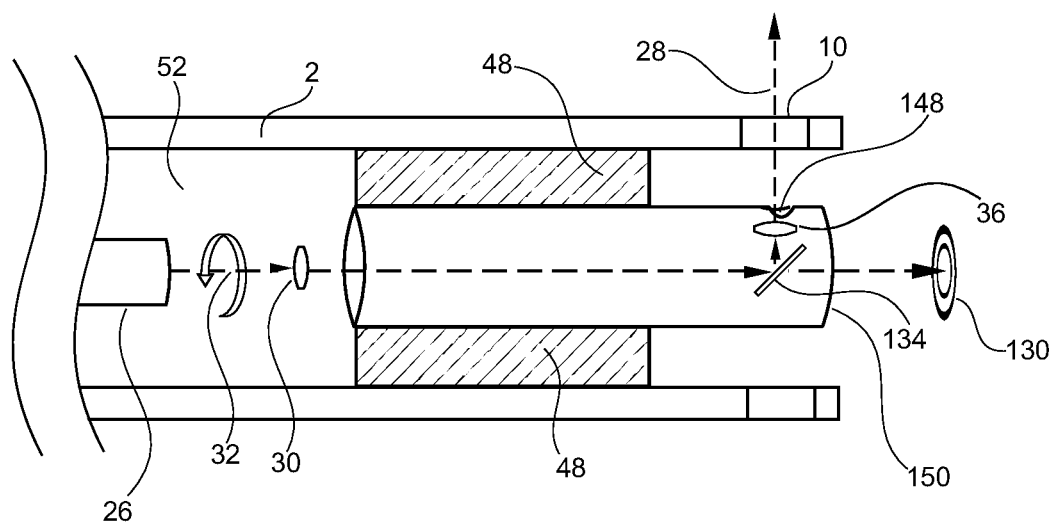

FIG. 80 illustrates an imaging probe 1 in other embodiments. The imaging probe 1 is the same as that described in FIG. 61, except that the optical components 36, 134 are carried in a tube 150 that mechanically couples to the rotor 48. The tube 150 has a side port 148 for allowing light to pass therethrough. Also, unlike the embodiments of FIG. 53, the rotor 48 does not include the side port 82. The turning of the rotor 48 will cause the tube 150 (and the beam splitter 134 and lens 36 within it) to turn as well. During use, the optical waveguide 26 provides a light beam 28 that is optically processed by the optical component 30, as similarly discussed. The light beam 28 is then separated by the beam splitter 134 into a first light beam and a second light beam. The first light beam is directed towards the focusing lens 36, which focuses the light beam 28. The light beam 28 then exits from the side port 148 of the tube 150 and out of the region 10 of the imaging probe 1. The output light impinges against a tissue inside a body, and is reflected back towards the imaging probe 1. The reflected light enters through the region 10 and into the side port 148 of the tube 150. The reflected light is optically processed by the optical components of the imaging probe 1, and is transmitted back to the optical waveguide 26. The optical waveguide 26 transmits the light signals to component 7 for processing the light signals, and the processed light signals may be displayed in the user interface 13. A user may look at the information at the user interface 13 for medical diagnostic purpose and/or treatment purpose. The second light beam travels downstream and reaches the light sensitive array 130, which converts the light to energy, and transmits the energy to energize the coil(s) 46 (not shown for clarity).

Figure 81A:
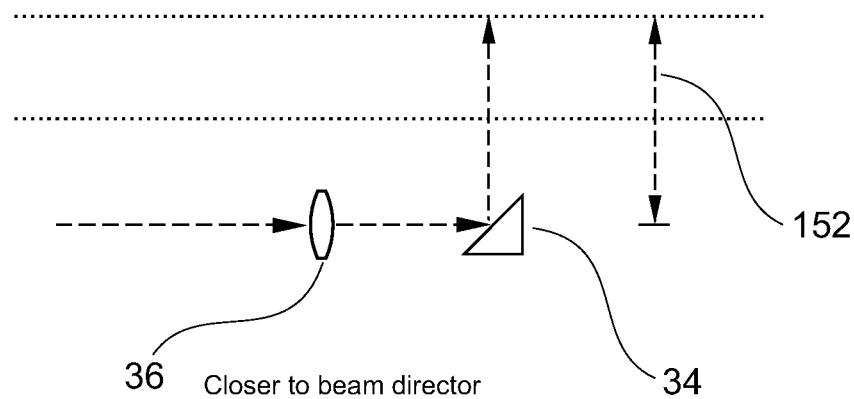
FIG. 81 illustrates a concept of auto-focusing that may be implemented in any of the embodiments of the imaging probe described herein.
Figure 81B:
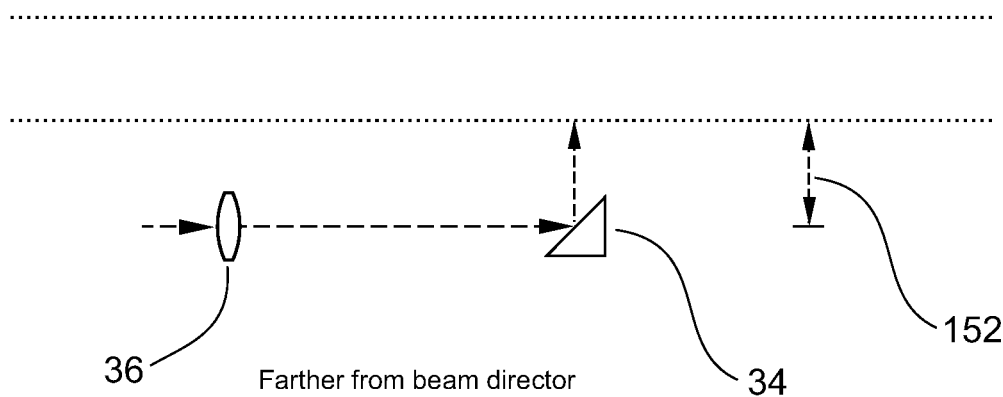

In any of the embodiments described herein, the imaging probe 1 may include an auto-focusing feature, which automatically focuses the light beam 28. FIG. 81 illustrates a concept of auto-focusing, which may be implemented in any of the embodiments of the imaging probe 1 described herein. As shown in the FIG. 81A, the lens 36 may be moved towards the beam director 34 to provide a relatively longer focusing length 152 so that light beam 28 from the beam director 34 will focus at tissue that is relatively further away from the beam director 34. On the other hand, as shown in the FIG. 81B, the lens 36 may be moved away from the beam director 34 to provide a relatively shorter focusing length 152 so that light beam 28 from the beam director 34 will focus at tissue that is relatively closer to the beam director 34. Although lens 36 is shown in the example, other optical components described herein may be moved as well in other embodiments to change a focusing length of the light beam 28.

Figure 82:
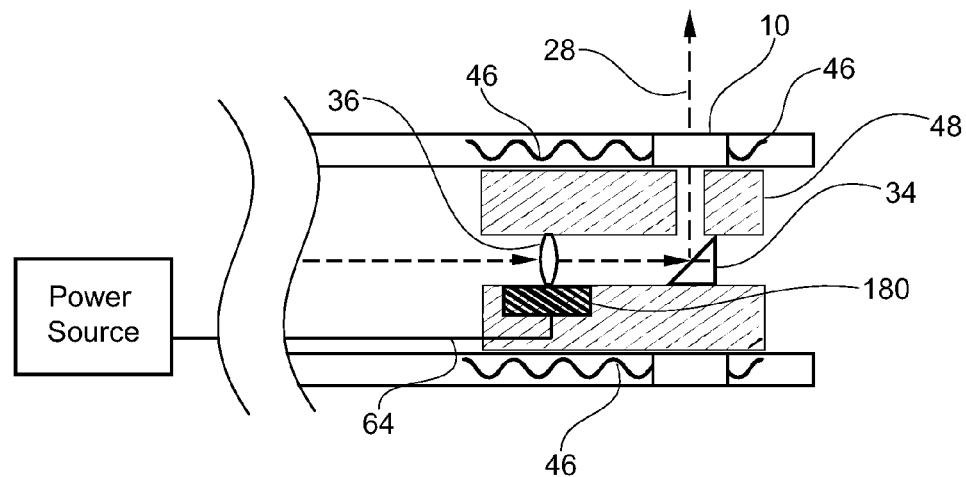
FIG. 82 illustrates a rotor and auto-focusing components in accordance with some embodiments, wherein the rotor and the auto-focusing components may be used in any of the embodiments of the image probe described herein.

FIG. 82 illustrates an imaging probe 1 having an auto-focusing feature in accordance with some embodiments. As shown in the figure, the imaging probe 1 has a rotor 48, which may be any of the embodiments of the rotor 48 described herein. The rotor 48 includes a positioner 180 for moving the lens 36 inside the rotor 48. Power may be provided to the positioner 180 using an electrical conductor 64. The positioner 180 may move the lens 36 distally or proximally to adjust the focusing distance of the light beam 28. In some embodiments, the conductor 64 may be a flexible set of one or more wires, or other device(s) to transmit electrical energy to the positioner 180. The conductor 64 is flexible so that the rotor 48 can rotate at least 360 degree.

Figure 83:
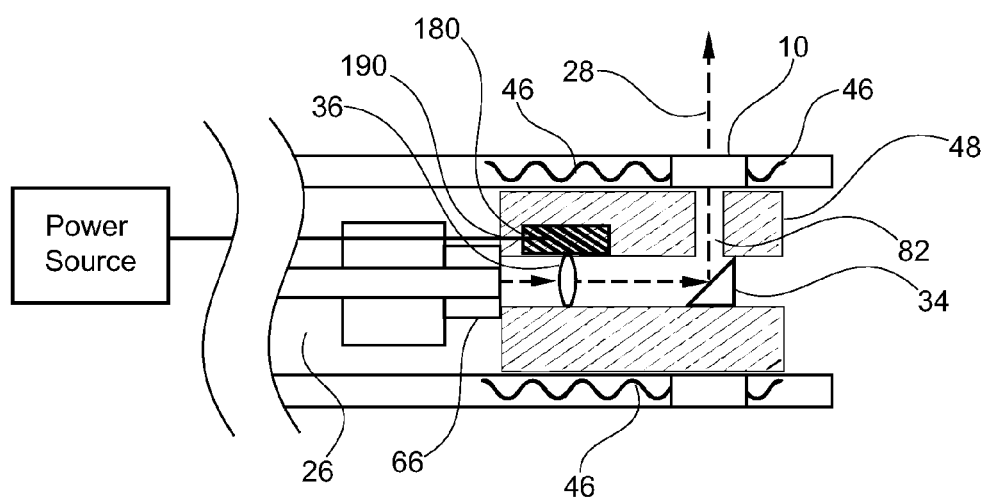
FIG. 83 illustrates a rotor and auto-focusing components in accordance with other embodiments, wherein the rotor and the auto-focusing components may be used in any of the embodiments of the image probe described herein.

In other embodiments, the imaging probe 1 may include a ring conductor 66 in contact with the conductor 190 in the rotor 48 (FIG. 83). The ring conductor 66 is electrically coupled to a power source for providing power to drive the positioner 180. The shown configuration is advantageous because regardless of the position of the rotor 48, the conductor 190 in the rotor 48 will be in contact with the ring conductor 66, thereby allowing a current to be delivered to the positioner 180. Such configuration is also advantageous because no matter how many times the rotor 48 turns, then will be no twisting of any wiring.

Figure 84:
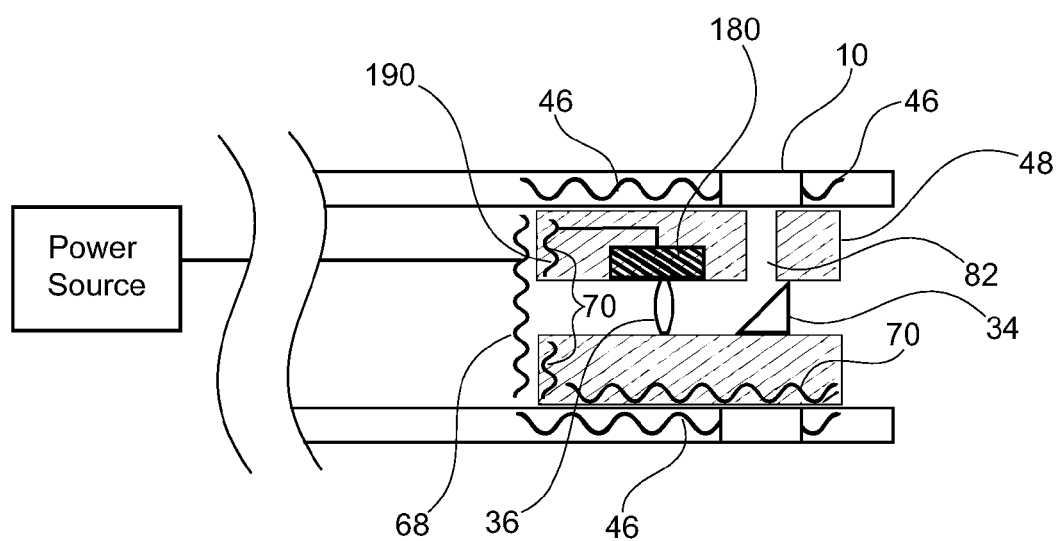
FIG. 84 illustrates a rotor and auto-focusing components in accordance with other embodiments, wherein the rotor and the auto-focusing components may be used in any of the embodiments of the image probe described herein.
Figure 85:
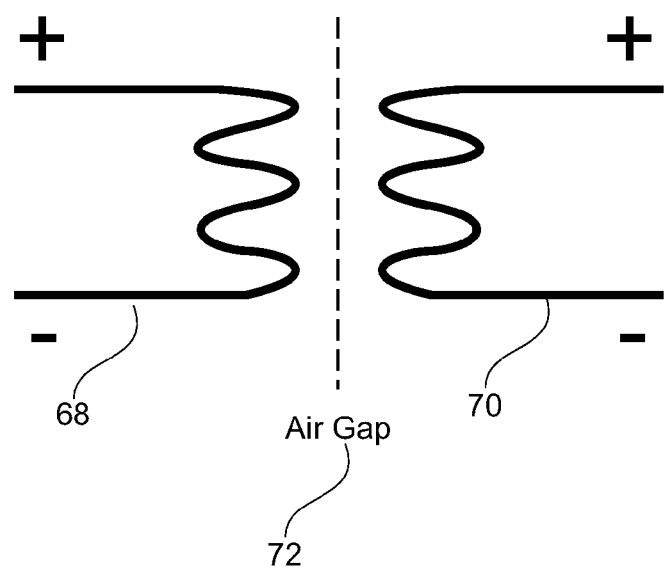
FIG. 85 is an exploded view of a part of the device of FIG. 84.

In further embodiments, the power for the positioner 180 may be provided using coils 68, 70 that are not in contact with each other (FIGS. 84, 85). Such configuration allows the rotor 48 to turn while providing power to the positioner 180. In the illustrated embodiments, the transmitting coil 68 and receiving coil 70 act similarly as a transformer whereby electrical energy is transmitted by magnetic fields. Such configuration allows air transmission of magnetic energy to the receiving coil 70 located at the rotor 48, where the magnetic energy is received and converted back to electrical energy.

In further embodiments, electrical energy may be transmitted to the positioner 180 at the rotor 48 without contact by using an optical transmitter, such as an optical fiber, to a photosensitive device at the rotor 48. The photosensitive device at the rotor 48 may be a photodiode, photovoltaic cell, or similar device, that can convert optical energy to electrical energy for use by the positioner 180. In such cases, the wavelength of the optical energy may be selected such that it does not interfere with the probe's ability to transmit optical radiation, and/or the probe's ability to receive optical radiation, and does not interfere with the optical radiation received by the probe 1.

In any of the embodiments described herein, the auto-focusing feature may be implemented using a voice coil, which allows for a rapid mechanical response, and therefore a rapid ability to autofocus. It is also possible to have position sensors to locate the point of focus in other embodiments. Finding a focal point may entail the use of optical, magnetic, capacitive, inductive, or mechanical sensors or encoders.

As discussed, in some embodiments, the elongated tube 2 of the imaging probe may be flexible. In other embodiments, the elongated tube 2 of any of the embodiments of the imaging probe 1 described herein may have a variable stiffness along the length of the imaging probe 1. For example, in some embodiments, the stiffness of the imaging probe 1 where the rotor 48 is located may be higher than the stiffness of the section of the imaging probe 1 that is proximal to the rotor 48. In other embodiments, the stiffness of the probe 1 between the proximal and distal ends 4, 6 may be varied to allow or restrict flexibility of the probe 1 to advantageously gain additional nimbleness or control in positioning the probe 1 in narrow and curved voids such as vascular lumens or the GI tract of the human body. In further embodiments, the elongated tube 2 of the imaging probe 1 may be rigid.

The stiffness variation of a probe 1 may be implemented in a variety of methods, such as by varying the elasticity of the probe material, and/or by placing braiding or fiber reinforcement within the wall of the probe 1 at certain desired location(s). In any of the embodiments described herein, the probe 1 may be made from a flexible material or polymer material, but may also be made from metal or glass if desired and reinforced with metal or polymer fibers. At the region 10 where the motor (the rotor 48 and the coil(s) 46) is located on the probe 1, the material is transparent to the light waves to be directed and detected radially. In some embodiments, a different material may be joined together at this section to enable light waves to pass through the probe 1.

Also, in any of the embodiments of the imaging probe 1 described herein, silver active micro particles or nanoparticles may be coated on the surface of the imaging probe 1, or embedded into the wall of the probe 1, such that silver ions are released free from the catheter probe 1, or are present at the probe's surface to provide for anti-bacterial properties. In other embodiments, the probe 1 may be coated with an antibiotic coating to prevent bacterial infection. This antibiotic coating may have a single antibiotic agent, or a combination of antibiotics to prevent an array of different types of bacterial infections.

Also, in any of the embodiments of the imaging probe 1 described herein, the rotor 48 may be magnetic. In some embodiments, the magnetic rotor 48 may be formed from a magnetic powder and polymer matrix. The rotor 48 may be injection molded, micro injection molded, cast, or it may be made by sintering various materials that exhibit magnetic properties to form the magnetic rotor 48. In some embodiments, for applications requiring high rotational speed, the magnetic rotor 48 may be hollowed out to reduce moment of inertia. The magnetic rotor 48 may be reinforced further to prevent centripetal forces from causing the rotor 48 to "explode" by using a reinforcing materials such as microfibers of polymers fibers, metal fibers, composite fibers (such as carbon, Kevlar, or aramid fibers), or carbon nanotubes which exhibit extremely high strength. In such cases, the reinforcing components may be oriented such that their highest directional strength be used to carry the centripetal forces from the rotating rotor 48. Also, in some embodiments, the rotor 48 may strategically have certain material removed, or have certain shape, so as to provide multi-axis balancing of the rotor 48 to prevent undesirable vibration. Also, the rotor 48 may have material removed to form the opening 110 for allowing passing of light down the rotor axis, and optionally to form the side port for allowing light to pass through radially outward of the rotor 48. The magnetic rotor 48 may be made from a bulk magnetic material that is homogenous or heterogeneous, and machined or processed to the desired shape. In any of the embodiments described herein, the rotor 48 may have a circular cross section, or other cross sectional shapes.

Furthermore, in any of the embodiments described herein, one or more optical components may be directly mounted to the rotor 48 using adhesive, epoxy, over molding, a connector, etc. Alternatively, there may be an intermediate structure that is attached to the rotor 48, wherein the one or more optical components may be coupled to the rotor 48 indirectly through the intermediate structure. The intermediate structure transmits the rotational torque and motion from the rotor 48 to the desired optical component(s).

The optical waveguide 26 that transmits light to the probe 1 may be a single mode or multimode fiber. It is possible that there can be many of these optical fibers arranged in a bundle. Similarly, it is further possible to use optical waveguide(s), or photonic crystalline fiber (PCF)—also known as Holley fibers. These PCF or Holley fibers can be used since they can exhibit endlessly single mode properties over a wide wavelength ranges of light. Furthermore it is also possible to use double clad, triple clad, quadruple, or "many" clad fibers within the imaging probe 1 as well.

Also, in any of the embodiments of the imaging probe 1 described herein, the collimation lens may be implemented using micro optic(s), fiber lens, other any of other known devices, to collimate the beam. As discussed herein, the collimation optics may be located in the axis that is coincident with the axis of the transmitted light provided by the optical waveguide 26. The collimation optics may be located within the rotor 48, or external to it. Also, in any of the embodiments of the imaging probe 1 described herein, the focusing optics may be located in line with the collimation optics, or may be located 90 degrees (or at other angles relative) to the emitted light axis from the optical waveguide 26. The focusing optics may be in the rotor 48, or distal to the rotor 48. Furthermore, in any of the embodiments of the imaging probe 1 described herein, the beam director 34 may include a concave mirror, which not only direct the light beam at a certain angle (e.g., 90°), but also to focus it as well. In still further embodiments, any of the embodiments of the imaging probe 1 may include optical device(s) that function as filter(s), such as notch, shortpass, longpass, bandpass, fiber Bragg gratings, optical gratings. Such optical device(s) may be placed in line with the optics described herein to further provide optical manipulation of the light as it is emitted or detected by the probe 1 for optical enhancement. In any of the embodiments of the imaging probe 1 described herein, the optical components in the probe 1 may be configured (e.g., positioned, placed, arranged, etc.) to allow bidirectional coupling of light to and from the proximal and distal ends of the probe 1.

Also, in any of the embodiments described herein, the coils 46 for providing magnetic field should not be limited to the examples of configuration described. The magnetic coils 46 may be placed in close proximity of the magnetic rotor 48 such that the magnetic force generated by the coil 46 results in a rotational motion of the magnetic rotor 48. The coil 46 may be formed or embossed from electrically conductive materials or wire that is inside, outside, or embedded in the wall of the probe 1. In other embodiments, the coil 46 may be made from a printed flexible circuit that is wrapped around the probe 1, embedded in the wall of the probe 1, or placed circumferentially in the lumen of the probe 1. In other embodiments, the coil 46 may be formed by coating the probe 1 with a conductive material, and then etching a coil pattern onto the probe 1. The pattern of the coil 46 may resemble a wire that is wrapped around an object. The pattern of the coil 46 may also be optimized such that the coil 46 provides a maximal force to turn the rotor 48. Furthermore, as discussed, multiple coils 46 may be used in some embodiments to optimize rotational speed and torque. The coils 46 maybe connected in series, in parallel, or a combination of both. They may also be operated independently, but activated in a sequenced manner that provides the desired rotational motion in the appropriate direction and angular displacement.

Also, in any of the embodiments described herein, electrical conductor(s) for providing power to the coil(s) 46 may be housed in the lumen of the elongated tube 2. In some embodiments, materials that are more semitransparent may be used for the electrical conductor(s), such as indium trioxide (ITO), conductive polymers, or conductive nanotubes.

As illustrated in the above embodiments, the imaging probe 1 is advantageous because it obviates the need to use a motor at a proximal end to rotate a light transmitting and/or receiving device at the distal end. By using a motor at the distal end of the imaging probe 1, the turning of the light transmitting and/or receiving device at the distal end may be performed in a more controlled and predictable manner. Such configuration also prevents the probe 1 from twisting inside the patient, and prevents any optical components inside the probe 1 from twisting, thereby preventing or reducing image distortion. Embodiments of the imaging probe 1 described herein are also advantageous because by providing a motor inside the distal end of the imaging probe 1, no external motor is needed at the distal end either. Such configuration allows the imaging probe 1 to be made very small—in some cases, as small as 100 micron. In some cases, embodiments of the imaging probe 1 described herein allows a rotational speed of the rotor 48 that is anywhere from 0-500,000 rpm. Also, embodiments of the rotor 48 described herein allows a brushless motor to be integrated at the distal end of the imaging probe 1, which prevents many problems associated with brush-motors.

In the above embodiments, the probe 1 has been described as having a light source for imaging. In other embodiments, the probe 1 may have other components for providing other types of imaging. For example, in other embodiments, the probe 1 may include an ultrasound transducer for emitting acoustic signals. The ultrasound transducer may be coupled to the rotor 48 so that the ultrasound transducer can rotate together with the rotor 48. In some embodiments, the ultrasound transducer is coupled to the rotor 48 and is housed within the probe 1 within the distal end of the probe 1. For example, the ultrasound transducer may be coupled to the proximal end of the rotor 48, the distal end of the rotor 48, or be placed inside the rotor 48 (in which case, the rotor 48 will have the side port 82 for allowing ultrasound signal to be delivered therethrough.

Although embodiments of the imaging probe 1 has been described as having an imaging function, in other embodiments, the imaging probe 1 may have treatment functionality. Thus, as used in this specification, the term "imaging probe" or similar terms, should not be limited to a device that can only performing imaging. For example, in other embodiments, the imaging probe 1 may be a laser surgical probe. In other embodiments, the probe 1 can transmit and receive optical radiation as previously described, but the probe 1 may also transmit optical energy having an energy that is enough to ablate tissue or cells within a narrow passageway such as an artery, vein, esophagus, colon, intestines, or other parts of the body. In any of the embodiments of the probe 1 described herein, the probe's detected optical radiation may be used by a processor as feedback to control the laser ablative source. The laser providing ablative power may be operated in constant wave (CW), pulsed, modelocked, or q-switched, or quasi-modelocked/q-switched.

Also, in further embodiments, the imaging probe 1 may be used outside the medical field. For example, in other embodiments, the imaging probe 1 may be an industrial inspection probe. In such cases, the probe 1 may be used to examine and ablate materials inside narrow passage ways, such as machine bores and holes, or to perform inspection of different objects.

Also, it should be noted that although embodiments of the probe 1 have been described as having imaging capability, in other embodiments, the probe 1 may be configured to perform treatment. For example, in other embodiments, the light beam provided by the probe 1 may have an energy level that is sufficient to treat tissue (e.g., for ablation). Also, in other embodiments, instead of coupling one or more optical components to the rotor 48, the probe 1 may include an energy delivery device that is coupled to the rotor 48, thereby allowing the energy delivery device to rotate together with the rotor 48. By means of non-limiting examples, the energy delivery device may be an ultrasound transducer, a heat emitting device, etc. In some embodiments, the energy delivery device is coupled to the rotor 48 and is housed within the probe 1 within the distal end of the probe 1. For example, the energy delivery device may be coupled to the proximal end of the rotor 48, the distal end of the rotor 48, or be placed inside the rotor 48 (in which case, the rotor 48 will have the side port 82 for allowing energy to be delivered therethrough.

Computer System Architecture

Figure 86:
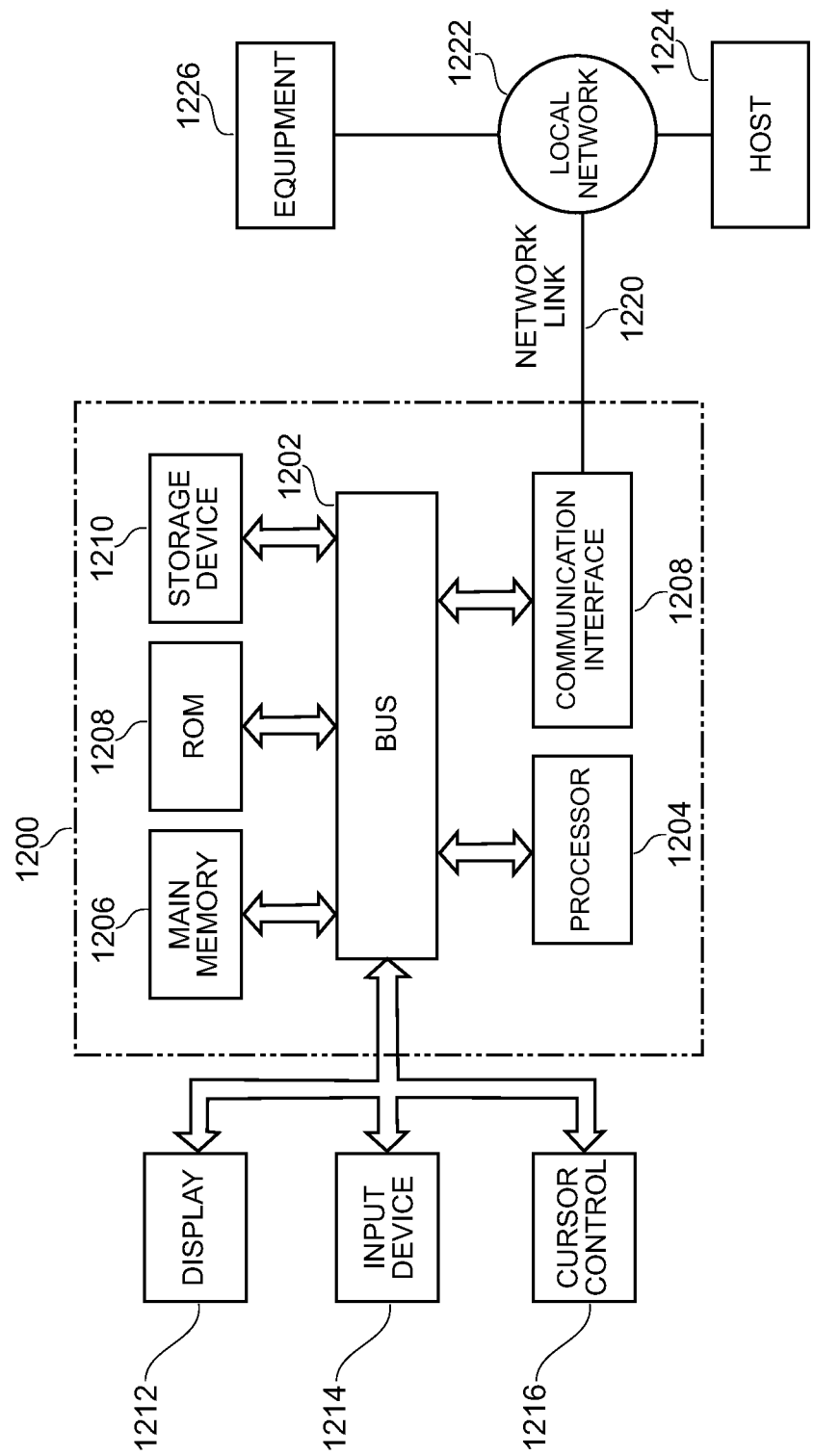
FIG. 86 is a block diagram of a computer system architecture in accordance with some embodiments.

FIG. 86 is a block diagram that illustrates an embodiment of a computer system 1200 upon which an embodiment of the user interface 13 may be implemented. Computer system 1200 includes a bus 1202 or other communication mechanism for communicating information, and a processor 1204 coupled with the bus 1202 for processing information. The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT), for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions (e.g., calculation) in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium is an example of a non-transitory medium. Volatile media includes dynamic memory, such as the main memory 1206. A volatile medium is another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A medical device, comprising:
an elongate member having a proximal end, a distal end, a body extending between the proximal end and the distal end, and a lumen located within the body; and
a rotor located inside lumen and rotatably supported in the lumen, the rotor having an opening for allowing light to enter therein, wherein the rotor is rotatable about an axis that extends through the opening;
wherein the elongate member further has a region for allowing an output light to exit therethrough.

2. The device of claim 1, wherein the elongate member is flexible.

3. The device of claim 2, further comprising a steering mechanism for steering the distal end of the elongate member.

4. The device of claim 1, wherein the region has an arc or ring configuration.

5. The device of claim 1, wherein the rotor has a plurality of teeth.

6. The device of claim 5, wherein each of the teeth has a spiral configuration extending along a length of the rotor.

7. The device of claim 1, wherein the rotor comprises a plurality of disks that are stacked together.

8. The device of claim 1, wherein the rotor further includes a port that is in communication with the opening, and wherein the port is configured to allow light passing through the opening to exit theretherough, and
wherein the opening (1) defines and empty space or (2) accommodates an optical component, for receiving the light.

9. The device of claim 8, wherein the port has a port axis that forms an angle relative to the axis, the angle having a value that is larger than zero and smaller than 180 degree.

10. The device of claim 9, further comprising a beam director in the rotor, the beam director configured for directing at least some of the light that has passed through the opening to exit the port, the at least some of the light being the output light.

11. The device of claim 1, further comprising an optical waveguide for providing the light.

12. The device of claim 1, further comprising a first lens for changing a characteristic of the light.

13. The device of claim 12, wherein the first lens is located outside the rotor.

14. The device of claim 12, wherein the first lens is located inside the rotor.

15. The device of claim 12, wherein the first lens comprises a focusing lens, a plano convex lens, a bi-convex lens, a gradient index lens, or a finite conjugate lens.

16. The device of claim 12, further comprising a second lens in the lumen of the elongate body.

17. The device of claim 16, wherein the second lens is configured for focusing the output light before the output light exits the region.

18. The device of claim 16, wherein the second lens is aligned with the first lens along the axis.

19. The device of claim 16, wherein the rotor further includes a port that is in communication with the opening, the port having a port axis that forms an angle relative to the axis, and wherein the second lens is located within the port of the rotor.

20. The device of claim 16, wherein the second lens is located within the opening of the rotor.

21. The device of claim 1, further comprising:
a first lens for changing a characteristic of the light; and
a beam director for directing at least some of the light to provide the output light.

22. The device of claim 21, wherein the first lens comprises a focusing lens, a plano convex lens, a bi-convex lens, a gradient index lens, or a finite conjugate lens.

23. The device of claim 21, wherein the first lens and the beam director are located outside the rotor.

24. The device of claim 21, wherein the first lens is located in the rotor, and the beam director is located outside the rotor.

25. The device of claim 21, wherein the first lens is located outside the rotor, and the beam director is located inside the rotor.

26. The device of claim 21, wherein the first lens and the beam director are located inside the rotor.

27. The device of claim 21, further comprising:
a tube that aligns with the opening of the rotor;
wherein one or both of the first lens and the beam director are located within the tube.

28. The device of claim 27, wherein the tube has an optical port for allowing the output light to exit therethrough.

29. The device of claim 28, further comprising:
a beam splitter located in the tube; and
a light sensitive array that aligns with the tube;
wherein the beam splitter is configured for providing the output light, and a split light; and
wherein the tube has a distal end that is at least partially transparent for outputting the split light.

30. The device of claim 27, wherein at least part of the tube is extended into the opening of the rotor.

31. The device of claim 21, further comprising a second lens in the lumen of the elongate body.

32. The device of claim 31, wherein the second lens is for focusing the output light.

33. The device of claim 31, wherein the second lens aligns with the first lens along the axis.

34. The device of claim 31, wherein the second lens is outside the rotor.

35. The device of claim 31, wherein the second lens is inside the rotor.

36. The device of claim 35, wherein the rotor further includes a port that is in communication with the opening, the port having a port axis that forms an angle relative to the axis.

37. The device of claim 36, wherein the second lens is inside the port.

38. The device of claim 36, wherein the second lens is inside the rotor and outside the port.

39. The device of claim 31, further comprising:
a tube that aligns with the opening of the rotor;
wherein one or a combination of the first lens, the beam director, and the second lens is located within the tube.

40. The device of claim 39, wherein the tube has an optical port for allowing the output light to exit therethrough.

41. The device of claim 40, further comprising:
a beam splitter located in the tube; and
a light sensitive array that aligns with the tube;
wherein the beam splitter is configured for providing the output light, and a split light; and
wherein the tube has a distal end that is at least partially transparent for outputting the split light.

42. The device of claim 39, wherein at least part of the tube is extended into the opening of the rotor.

43. The device of claim 1, further comprising one or more coils disposed around the rotor.

44. The device of claim 43, wherein the one or more coils are located in the lumen of the elongate body.

45. The device of claim 43, wherein the one or more coils are located in a wall of the elongate body.

46. The device of claim 43, wherein the rotor has a first portion for interacting with the one or more coils, and a second portion for housing one or more optical devices.

47. The device of claim 46, wherein the one or more optical devices comprises one or more of a collimation lens, a gradient index lens, a finite conjugate lens, a focusing lens, a mirror, a prism, a plano convex lens, a bi-convex lens, and a beam splitter.

48. The device of claim 1, further comprising a sheath surrounding at least a part of the elongate body, wherein the elongate body is slidable relative to the sheath.

49. The device of claim 1, further comprising one or more sensors for sensing one or more of a position, a velocity, an acceleration, and jerk, of the rotor.

50. The device of claim 1, further comprising an optical device located in the lumen of the elongate member, the optical device being in alignment with the opening of the rotor.

51. The device of claim 1, wherein the distal end of the elongate member comprises a closed end.

52. The device of claim 1, wherein the elongate member is configured to prevent a distal-most part of the rotor from exiting the lumen of the elongate member.

* * * * *